US012687131B2

(12) United States Patent
Oehrle et al.

(10) Patent No.: US 12,687,131 B2
(45) Date of Patent: Jul. 21, 2026

(54) GAS TURBINE ENGINE

(71) Applicant: General Electric Company, Evendale, OH (US)

(72) Inventors: Daniel John Oehrle, West Chester, OH (US); Randy M. Vondrell, Newport, KY (US); David Justin Brady, Rockport, MA (US); Michael Joseph Murray, Wyoming, OH (US); Thomas Bradley Kenney, Lynn, MA (US); Victor Moreno Patan, Queretaro (MX); William James Mailander, Lynn, MA (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 19/091,227

(22) Filed: Mar. 26, 2025

(65) Prior Publication Data

US 2025/0223927 A1 Jul. 10, 2025

Related U.S. Application Data

(63) Continuation-in-part of application No. 18/824,100, filed on Sep. 4, 2024, which is a continuation of (Continued)

(51) Int. Cl.
*F02C 7/32* (2006.01)
*B64D 27/12* (2006.01)

(52) U.S. Cl.
CPC .............. *F02C 7/32* (2013.01); *B64D 27/12* (2013.01)

(58) Field of Classification Search
None
See application file for complete search history.

(56) References Cited

U.S. PATENT DOCUMENTS 5,715,674 A 2/1998 Reuter et al.
5,806,300 A 9/1998 Veilleux, Jr. et al.
(Continued)

FOREIGN PATENT DOCUMENTS

WO WO2004/092568 A2 10/2004

OTHER PUBLICATIONS

Air transportation safety investigation A14Q0068, Bombardier Inc., Transportation Safety Board of Canada, May 29, 2014, 54 Pages.
(Continued)

*Primary Examiner* — David P. Olynick
(74) *Attorney, Agent, or Firm* — Dority & Manning, P.A.

(57) ABSTRACT

A gas turbine engine includes an unducted primary fan, a core engine including a combustor casing enclosing a combustor and defining an outer surface, a core cowl surrounding the core engine. A fuel system provides fuel to the combustor with a variable displacement pump. The outer surface of the core cowl defines a peak cowl diameter (D). The outer surface of the combustor casing defines a maximum combustor casing diameter (d). The core engine defines an overall core axial length (L) and an under-core cowl axial length (L1). The engine defines a core cowl diameter ratio (CDR) equal to the peak cowl diameter (D) divided by the maximum combustor casing diameter (d) and a core cowl length ratio (CLR) equal to the under-core cowl axial length (L1) divided by the overall core axial length (L). The CDR is between 2.7 and 3.5 and the CLR is between 0.25 and 0.50.

20 Claims, 22 Drawing Sheets

Related U.S. Application Data application No. 17/972,720, filed on Oct. 25, 2022, now Pat. No. 12,104,539.

(56) References Cited

U.S. PATENT DOCUMENTS

| | | | |
|---|---|---|---|
| 6,943,699 B2 | 9/2005 | Ziarno | |
| 6,962,485 B2 | 11/2005 | Bennett et al. | |
| 7,010,906 B2 | 3/2006 | Cazenave et al. | |
| 8,166,765 B2 | 5/2012 | Baker et al. | |
| 8,607,578 B2 | 12/2013 | Fert | |
| 8,789,353 B2 | 7/2014 | Bickley | |
| 8,961,114 B2 | 2/2015 | Ruthemeyer | |
| 9,259,808 B2 | 2/2016 | Broughton et al. | |
| 9,562,828 B2 | 2/2017 | Broughton | |
| 9,611,047 B2 | 4/2017 | Kohn et al. | |
| 9,677,501 B2 | 6/2017 | Pierluissi et al. | |
| 9,788,447 B2 | 10/2017 | Dalton | |
| 9,845,768 B2 | 12/2017 | Pesyna et al. | |
| 9,863,366 B2 | 1/2018 | Froemming et al. | |
| 10,125,732 B1 | 11/2018 | Nyzen | |
| 10,167,814 B2 | 1/2019 | Ferrier et al. | |
| 10,190,506 B2 | 1/2019 | Ruberte Sanchez | |
| 10,264,688 B2 | 4/2019 | Richardson et al. | |
| 10,787,996 B2 | 9/2020 | Kupratis et al. | |
| 11,066,179 B2 | 7/2021 | Ramlaoui et al. | |
| 11,781,484 B2 | 10/2023 | Cocks et al. | |
| 2004/0117102 A1 | 6/2004 | Weir et al. | |
| 2009/0301575 A1 | 12/2009 | Arnett | |
| 2010/0251814 A1 | 10/2010 | Baker et al. | |
| 2012/0067022 A1 | 3/2012 | Futa et al. | |
| 2016/0201574 A1 | 7/2016 | Kelly et al. | |
| 2017/0306856 A1 | 10/2017 | Bickley | |
| 2018/0340531 A1 | 11/2018 | Ni et al. | |
| 2021/0301827 A1 | 9/2021 | Stretton et al. | |
| 2021/0310417 A1 | 10/2021 | Hrubec et al. | |
| 2022/0049911 A1 | 2/2022 | Djelassi et al. | |
| 2022/0055760 A1 | 2/2022 | Schmitter et al. | |
| 2022/0372941 A1 | 11/2022 | Susca et al. | |
| 2022/0372967 A1 | 11/2022 | Susca et al. | |
| 2022/0372968 A1 | 11/2022 | O'Rorke et al. | |
| 2023/0023310 A1 | 1/2023 | Goy | |
| 2025/0067217 A1 | 2/2025 | Brady et al. | |

OTHER PUBLICATIONS

Analysis: The PW1100 GTF Engine and the Airbus A320NEO, Sahifa, Bangalore Aviation, Jan. 20, 2017, 9 Pages. Retrieved from: https://www.bangaloreaviation.com/2017/01/analysis-pw1100-gtf-engine-airbus-a320neo.html.

Atsushi et al., Development of PW1100G-JM Turbofan Engine, IHI Engineering Review, vol. 47, No. 1, 2014, 6 Pages.

Aviation Investigation—4 Docket Items—ENG19IA029, NTSB National Transportation Safety Board, Jan. 13, 2021, 85 Pages. Retrieved from: https://data.ntsb.gov/Docket/?NTSBNumber=ENG19IA029#.

Dorsey et al., Design Space Exploration of Future Open Rotor Configurations, AIAA 2020-3680, Cycle Performance and MDAO, 2020. (Abstract Only) Retrieved from: https://arc.aiaa.org/doi/10.2514/6.2020-3680.

"E00063EN", General Electric Company, U.S. Department of Transportation, Federal Aviation Administration Type Certification Data Sheet, Revision 8, Nov. 22, 2016, 12 Pages.

"E00070EN", General Electric Company, U.S. Department of Transportation, Federal Aviation Administration Type Certification Data Sheet, Revision 13, Jul. 14, 2021, 10 Pages.

"E00076EN", General Electric Company, U.S. Department of Transportation, Federal Aviation Administration Type Certification Data Sheet, Revision 21, Aug. 19, 2021, 22 Pages.

"E00087EN", General Electric Company, U.S. Department of Transportation, Federal Aviation Administration Type Certification Data Sheet, Revision 6, May 6, 2019, 9 Pages.

"E00088EN", General Electric Company, U.S. Department of Transportation, Federal Aviation Administration Type Certification Data Sheet, Revision 5, 04NOV20191, 11 Pages.

"E00089EN", General Electric Company, U.S. Department of Transportation, Federal Aviation Administration Type Certification Data Sheet, Revision 7, Feb. 7, 2019, 17 Pages.

"E00090EN", General Electric Company, U.S. Department of Transportation, Federal Aviation Administration Type Certification Data Sheet, Revision 10, Jun. 2, 2022, 8 Pages.

"E00091EN", General Electric Company, U.S. Department of Transportation, Federal Aviation Administration Type Certification Data Sheet, Revision 2, Mar. 18, 2019, 9 Pages.

"E00095EN", General Electric Company, U.S. Department of Transportation, Federal Aviation Administration Type Certification Data Sheet, Revision 2, Apr. 2, 2021, 9 Pages.

Gliebe et al., Ultra-High Bypass Engine Aeroacoustic Study, NASA/CR-2003-212525, NASA, 2003, 109 pages.

Halliwell et al., Fuel Burn Benefits of a Variable-Pitch Geared Fan Engine, AIAA 2012-3912, 48th AIAA/ASME/SAE/ASEE Joint Propulsion Conference & Exhibit, Atlanta, GA. (Abstract Only) Retrieved from: https://arc.aiaa.org/doi/10.2514/6.2012-3912.

Jackson, Optimisation of Aero and Industrial Gas Turbine Design for the Environment, Thesis Cranfield University, 2009. (Abstract Only) Retrieved from http://hdl.handle.net/1826/4316.

Pratt and Whitney, PW1100G Geared Turbofan Engine, The Flying Engineer, Technically and Operationally Commercial Aviation, Nov. 26, 2013, 24 Pages. Retrieved from: https://theflyingengineer.com/flightdeck/pw1100g-gtf/.

GAS TURBINE ENGINE

CROSS-REFERENCE TO RELATED APPLICATIONS

This application is a continuation-in-part of U.S. patent application Ser. No. 18/824,100, filed Sep. 4, 2024, which is a continuation of U.S. patent application Ser. No. 17/972,720 (now U.S. Pat. No. 12,104,539), filed Oct. 25, 2022, both of which are hereby incorporated by reference in their entireties.

FIELD

The present disclosure relates to a gas turbine engine, such as an aeronautical gas turbine engine.

BACKGROUND

A gas turbine engine generally includes a turbomachine. The turbomachine includes several engine accessories such as controllers, pumps, heat exchangers and the like that are necessary for operation. These engine accessories and engine systems may be mounted to the turbomachine.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
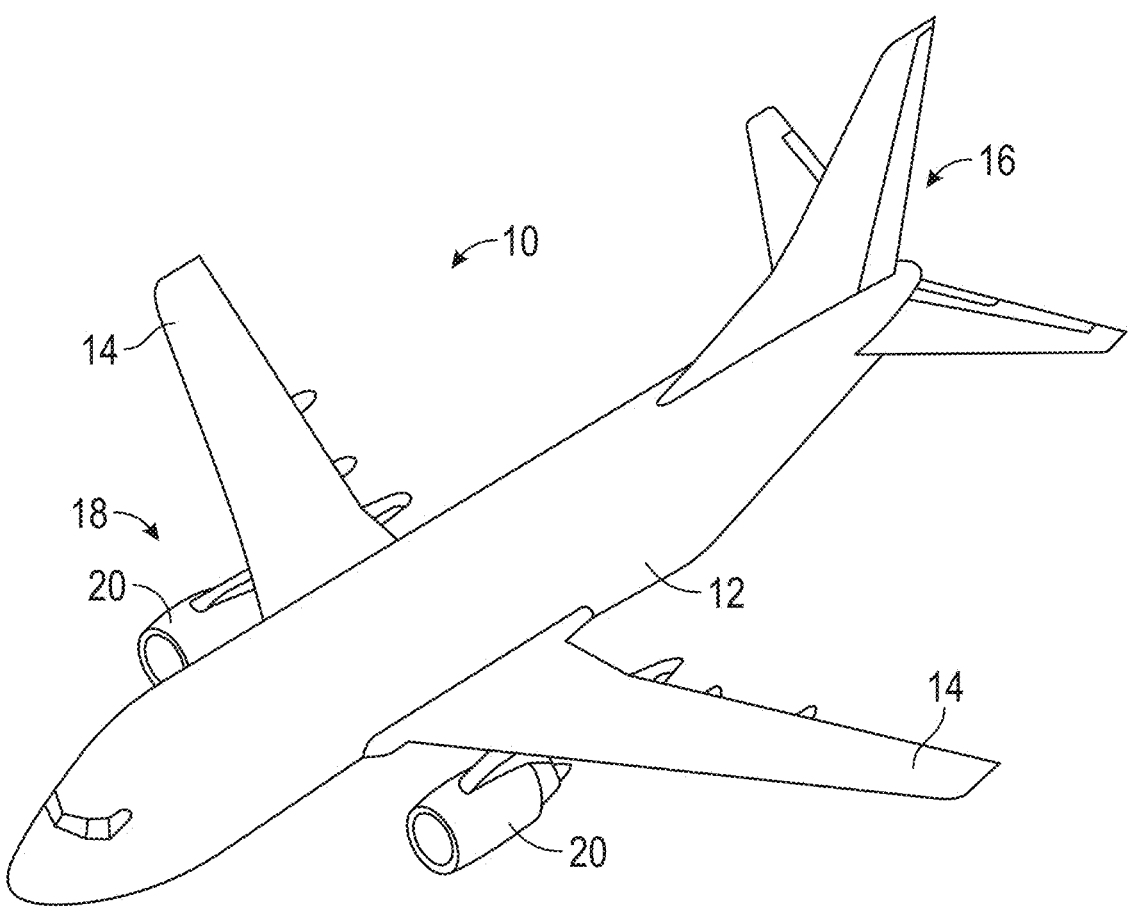
FIG. 1 is perspective view of an exemplary aircraft in accordance with an exemplary embodiment of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first," "second," and "third" may be used interchangeably to distinguish one component from another and are not intended to signify location or importance of the individual components.

The terms "forward" and "aft" refer to relative positions within a gas turbine engine or aircraft and refer to the normal operational attitude of the gas turbine engine or aircraft. More particularly, forward and aft are used herein with reference to a direction of travel of the aircraft and a direction of propulsive thrust of the gas turbine engine.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

As used herein, the term "adjacent to" can otherwise be defined as "near to," "within," or "coupled to."

The singular forms "a," "an," and "the" include plural references unless the context clearly dictates otherwise.

As used herein, the terms "axial" and "axially" refer to directions and orientations that extend substantially parallel to a centerline of the gas turbine engine. Moreover, the terms "radial" and "radially" refer to directions and orientations that extend substantially perpendicular to the centerline of the gas turbine engine. In addition, as used herein, the terms "circumferential" and "circumferentially" refer to directions and orientations that extend arcuately about the centerline of the gas turbine engine.

All directional references (e.g., radial, upper, lower, upward, downward, left, right, lateral, front, back, top, bottom, above, below, vertical, horizontal, clockwise, counterclockwise) are only used for identification purposes to aid the reader's understanding of the disclosure, and do not create limitations, particularly as to the position, orientation, or use thereof. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order, and relative sizes reflected in the drawings attached hereto can vary.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

The term "cowl" includes a housing, casing, or other structure that at least partially encases or surrounds a portion of a turbomachine or gas turbine engine.

The phrases "from X to Y" and "between X and Y" each refers to a range of values inclusive of the endpoints (i.e., refers to a range of values that includes both X and Y).

The term "propulsive efficiency" refers to an efficiency with which the energy contained in an engine's fuel is converted into kinetic energy for the vehicle incorporating the engine, to accelerate it, or to replace losses due to aerodynamic drag or gravity.

As used herein, the term "rated speed" with reference to a gas turbine engine refers to a maximum rotational speed that the gas turbine engine may achieve while operating properly. For example, the gas turbine engine may be operating at the rated speed during maximum load operations, such as during takeoff operations.

The term "standard day operating condition" refers to ambient conditions of sea level altitude, 59 degrees Fahrenheit, and 60 percent relative humidity.

A "third stream" as used herein means a non-primary air stream capable of increasing fluid energy to produce a minority of total propulsion system thrust. A pressure ratio of the third stream may be higher than that of the primary propulsion stream (e.g., a bypass or propeller driven propulsion stream). The thrust may be produced through a dedicated nozzle or through mixing of an airflow through the third stream with a primary propulsion stream or a core air stream, e.g., into a common nozzle.

In certain exemplary embodiments an operating temperature of the airflow through the third stream may be less than a maximum compressor discharge temperature for the engine, and more specifically may be less than 350 degrees Fahrenheit (such as less than 300 degrees Fahrenheit, such as less than 250 degrees Fahrenheit, such as less than 200 degrees Fahrenheit, and at least as great as an ambient temperature). In certain exemplary embodiments these operating temperatures may facilitate heat transfer to or from the airflow through the third stream and a separate fluid stream. Further, in certain exemplary embodiments, the airflow through the third stream may contribute less than 50% of the total engine thrust (and at least, e.g., 2% of the total engine thrust) at a takeoff condition, or more particularly while operating at a rated takeoff power at sea level, at a static flight speed, and/or at 86 degree Fahrenheit ambient temperature operating conditions.

Furthermore in certain exemplary embodiments, aspects of the airflow through the third stream (e.g., airstream, mixing, or exhaust properties), and thereby the aforementioned exemplary percent contribution to total thrust, may passively adjust during engine operation or be modified purposefully through use of engine control features (such as fuel flow, electric machine power, variable stators, variable inlet guide vanes, valves, variable exhaust geometry, or fluidic features) to adjust or optimize overall system performance across a broad range of potential operating conditions.

Conventional turbofan engine design practice has been to provide an outer nacelle surrounding the fan to provide relatively efficient thrust for the turbofan engine at high fan speeds (compared with an unducted fan). Such a configuration may generally limit a permissible size of the fan (i.e., a diameter of the fan). Generally, a turbofan engine includes a fan to provide a desired amount of thrust without overloading the fan blades (i.e., without increasing a disk loading of the fan blades of the fan beyond a certain threshold), and therefore to maintain a desired overall propulsive efficiency for the turbofan engine. The inventors of the present disclosure seek to drive the fan diameter higher, thereby to reduce fan pressure ratio while maintaining the same level of thrust to improve fuel efficiency. By increasing the fan diameter, however, an installation of the turbofan engine becomes more difficult. In addition, if an outer nacelle is maintained, the outer nacelle may become weight prohibitive with some larger diameter fans.

The inventors of the present disclosure found that for a three-stream gas turbine engine having an unducted primary fan (the outer nacelle removed) and a ducted secondary fan, with the secondary fan providing an airflow to a third stream of the gas turbine engine, an overall propulsive efficiency of the gas turbine engine that results from providing a high diameter fan may be maintained at a high level, while reducing the size of the primary fan. Such a configuration may maintain a desired overall propulsive efficiently for the gas turbine engine, or unexpectedly, may in fact increase the overall propulsive efficiency of the gas turbine engine. Further, by including a third stream, an axial length of the core engine may be reduced relative to the overall engine axial length by allowing for a portion of the airflow through the engine to flow through the third stream. This reduces an overall weight of the engine. However, the core engine must maintain a sufficient size to produce enough power to drive the primary fan and the ducted secondary fan.

Further, removing the outer nacelle and reducing the overall axial length of the core engine significantly reduces engine accessory storage space. A diameter of a core cowl may be increased to make room for the accessories between an engine casing and an inner surface of the core cowl, however, the core cowl diameter cannot be too large due to potential performance penalties such as excessive drag and installation difficulties.

The inventors proceeded in the manner of designing a gas turbine engine with a given core cowl diameter, core diameter, core axial length, and overall engine axial length; checking the propulsive efficiency of the designed gas turbine engine; redesigning the gas turbine engine with varying core cowl diameters, core diameters, core axial lengths, and overall engine axial lengths; rechecking the propulsive efficiency of the redesigned gas turbine engine; and then making accommodations when, for example, it was found that subsystem sizes increased due to certification requirements and/or power requirements, or servicing needs impacted where to locate things during the design of several different types of gas turbine engines, including the gas turbine engine described below with reference to, e.g., FIGS. 4 through 8.

During the course of this practice of studying and evaluating various cowl diameters, core diameters, core length, and engine length considered feasible for best satisfying mission requirements, it was discovered that certain relationships exist between a core cowl diameter ratio (which is equal to a peak cowl diameter divided by a maximum combustor casing diameter) and a core cowl length ratio (which is equal to an under-core cowl axial length divided by an overall core axial length). In particular, the inventors of the present disclosure have found that these ratios can be thought of as an indicator of the ability of a gas turbine engine to provide sufficient packaging space between the core engine combustor casing and the core cowl for packaging/mounting various accessories and/or engine systems, while also having a core engine capable of producing sufficient power to drive primary and secondary fans, particularly in more complex engine designs. In some embodiments, the inventors found that selectively coupling one or more engine components such as an engine accessory or system component to one of the core cowl or to the engine improves accessibility for inspection, repair, and maintenance and improves weigh loads on the core engine.

Referring now to the drawings, FIG. 1 is a perspective view of an exemplary aircraft 10 that may incorporate at least one exemplary embodiment of the present disclosure. As shown in FIG. 1, the aircraft 10 has a fuselage 12, wings 14 attached to the fuselage 12, and an empennage 16. The aircraft 10 further includes a propulsion system 18 that produces a propulsive thrust to propel the aircraft 10 in flight, during taxiing operations, etc. Although the propulsion system 18 is shown attached to the wing(s) 14, in other embodiments it may additionally or alternatively include one or more aspects coupled to other parts of the aircraft 10, such as, for example, the empennage 16, the fuselage 12, or both. The propulsion system 18 includes at least one engine. In the exemplary embodiment shown, the aircraft 10 includes a pair of gas turbine engines 20. Each gas turbine engine 20 is mounted to the aircraft 10 in an under-wing configuration. Each gas turbine engine 20 is capable of selectively generating a propulsive thrust for the aircraft 10. The gas turbine engines 20 may be configured to burn various forms of fuel including, but not limited to unless otherwise provided, jet fuel/aviation turbine fuel, and hydrogen fuel.

Figure 2:
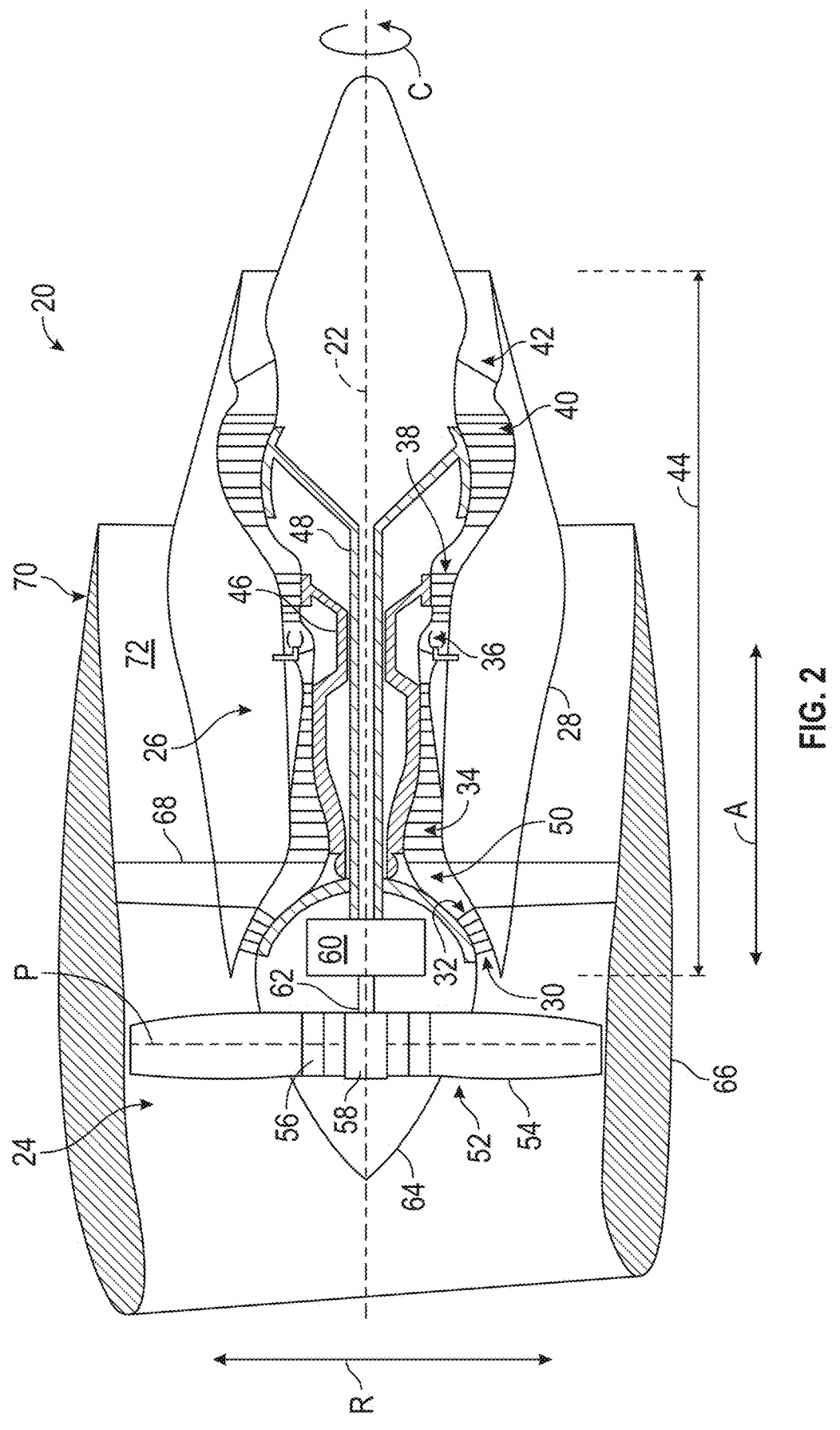
FIG. 2 is a schematic, cross-sectional view of a ducted turbofan gas turbine engine in accordance with an exemplary embodiment of the present disclosure.

FIG. 2 is a cross-sectional side view of a gas turbine engine 20 in accordance with an exemplary embodiment of the present disclosure. More particularly, for the embodiment of FIG. 2, the gas turbine engine 20 is a multi-spool, high-bypass turbofan jet engine, sometimes also referred to as a "turbofan engine." As shown in FIG. 2, the gas turbine engine 20 defines an axial direction A (extending parallel to a longitudinal centerline axis 22 provided for reference), a radial direction R, and a circumferential direction C extending about the longitudinal centerline axis 22. In general, the gas turbine engine 20 includes a fan section 24 and a turbomachine 26 disposed downstream from the fan section 24.

The exemplary turbomachine 26 depicted generally includes an engine housing, casing, or core cowl 28 that defines a core inlet 30 that is annular. The core cowl 28 at least partially encases, in serial flow relationship, a compressor section including a booster or low-pressure compressor 32 and a high-pressure compressor 34, a combustion section 36, a turbine section including a high-pressure turbine 38 and a low-pressure turbine 40, and at least a portion of a jet exhaust nozzle 42. Together, these components or sections make up a core engine 44 of the turbomachine 26.

A high-pressure shaft 46 drivingly connects the high-pressure turbine 38 to the high-pressure compressor 34. A low-pressure shaft 48 drivingly connects the low-pressure turbine 40 to the low-pressure compressor 32. The compressor section, combustion section 36, turbine section, and jet exhaust nozzle 42 together define a working gas flow path 50 through the gas turbine engine 20.

For the embodiment depicted, the fan section 24 includes a fan 52 having a plurality of fan blades 54 coupled to a disk 56 in a spaced apart manner. As depicted, the fan blades 54 extend outwardly from disk 56 generally along the radial direction R. Each fan blade 54 is rotatable with the disk 56 about a pitch axis P by virtue of the fan blades 54 being operatively coupled to a pitch change mechanism 58 configured to collectively vary the pitch of the fan blades 54, e.g., in unison. The fan blades 54, disk 56, and pitch change mechanism 58 are together rotatable about the longitudinal centerline axis 22 by the low-pressure shaft 48.

In an exemplary embodiment, as shown in FIG. 2, the gas turbine engine 20 further includes a power gearbox or gearbox 60. The gearbox 60 includes a plurality of gears for adjusting a rotational speed of the fan 52 relative to a rotational speed of the low-pressure shaft 48, such that the fan 52 and the low-pressure shaft 48 may rotate at more efficient relative speeds. The gearbox 60 may be any type of gearbox suitable to facilitate coupling the low-pressure shaft 48 to the fan 52 while allowing each of the low-pressure turbine 40 and the fan 52 to operate at a desired speed. For example, in some embodiments, the gearbox 60 may be a reduction gearbox. Utilizing a reduction gearbox may enable the comparatively higher speed operation of the low-pressure turbine 40 while maintaining fan speeds sufficient to provide for increased air bypass ratios, thereby allowing for efficient operation of the gas turbine engine 20. Moreover, utilizing a reduction gearbox may allow for a reduction in turbine stages that would otherwise be present (e.g., in direct drive engine configurations), thereby providing a reduction in weight and complexity of the engine.

Referring still to the exemplary embodiment of FIG. 2, the disk 56 is connected to the gearbox 60 via a fan shaft 62.

The disk 56 is covered by a rotatable front hub 64 of the fan section 24 (sometimes also referred to as a "spinner"). The front hub 64 is aerodynamically contoured to promote an airflow through the plurality of fan blades 54. Additionally, the fan section 24 includes an annular fan casing or a nacelle 66 that circumferentially surrounds the fan 52 and/or at least a portion of the turbomachine 26. The nacelle 66 is supported relative to the turbomachine 26 by a plurality of circumferentially spaced struts or outlet guide vanes 68 in the embodiment depicted. Moreover, a downstream section 70 of the nacelle 66 extends over an outer portion of the turbomachine 26 to define a bypass airflow passage 72 therebetween.

Figure 3:
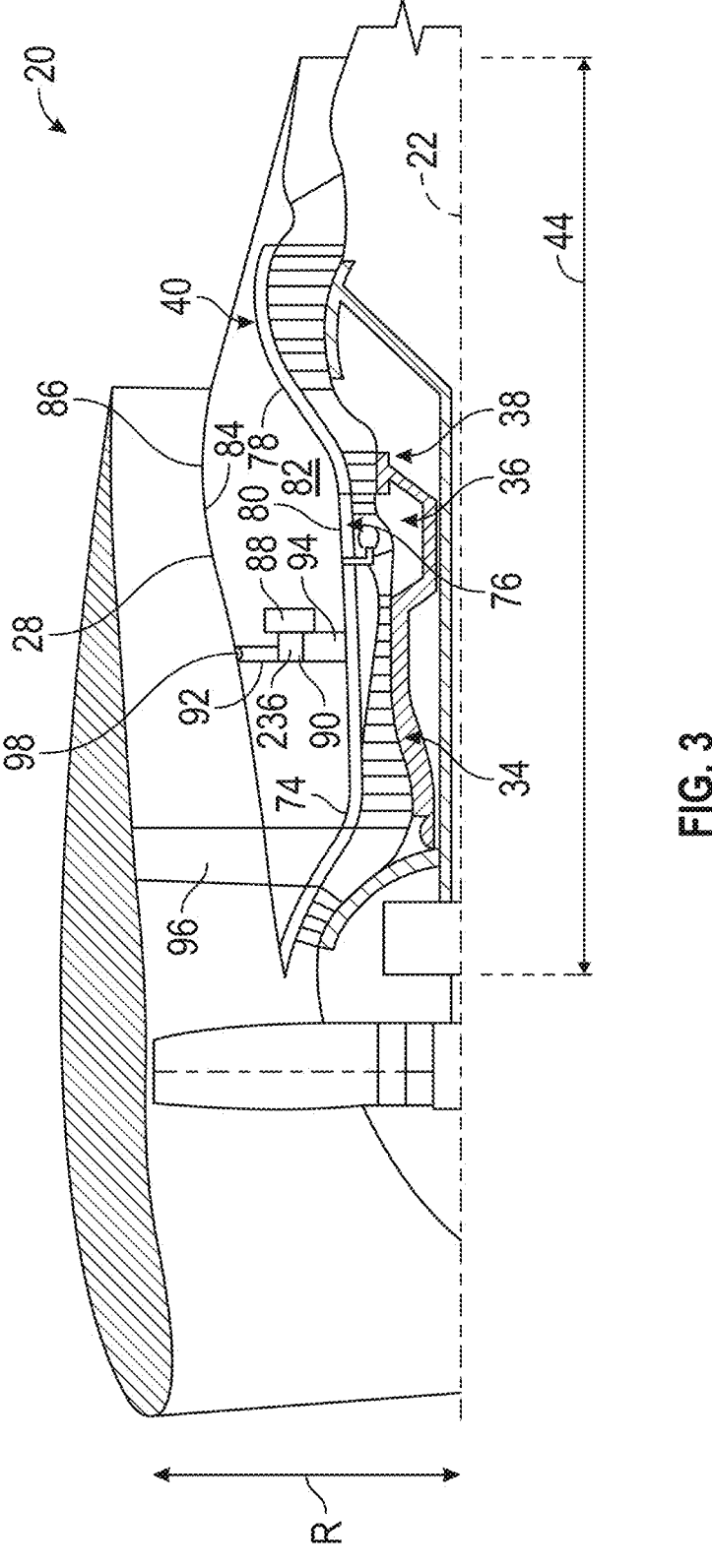
FIG. 3 is a schematic, cross-sectional view of a portion of the ducted turbofan gas turbine engine shown in FIG. 2, in accordance with an exemplary embodiment of the present disclosure.

FIG. 3 is a schematic, cross-sectional view of a portion of the core engine 44 of the gas turbine engine 20 as shown in FIG. 2, according to an exemplary embodiment of the present disclosure. As shown in FIG. 3, the high-pressure compressor 34 is encased within a compressor casing 74. The combustion section 36 is encased within a combustor casing 76. The high-pressure turbine 38 and the low-pressure turbine 40 are encased within one or more turbine casing(s) 78. The combustor casing 76 defines an outer surface 80. A void or a space 82 is defined between an inner surface 84 of the core cowl 28 and the outer surface 80 of the combustor casing 76. The core cowl 28 further includes an outer surface 86 radially spaced from the inner surface 84 with respect to radial direction R. In exemplary embodiments, at least one engine component 88 is coupled to the core cowl 28 inner surface 84. The at least one engine component 88 may include but is not limited to valves, electronics including engine and system controllers, fire and overheat detection system components, fire extinguisher components, heat exchangers, pumps, a generator, etc.

In exemplary embodiments, the engine component 88 is selectively coupled to the core engine 44 or the core cowl 28. When the engine component 88 is coupled to the core cowl 28, the engine component 88 travels with the core cowl 28 when pivoted away from the core engine 44. When the engine component 88 is coupled to the core engine 44, the engine component 88 stays coupled to the core engine 44 when the core cowl 28 is pivoted away from the core engine 44. In exemplary embodiments, and as previously presented, the engine component 88 is one of a heat exchanger, a sensor, a controller, a pump, a duct, a valve, fire and overheat detection system components, fire extinguisher components, or a generator. This list is not all inclusive of possible engine components that may be selectively coupled to the core cowl 28 or the core engine 44.

In exemplary embodiments, the engine component 88 is selectively coupled to the core engine 44 or the core cowl 28 via a fastener 90. As shown in FIG. 3, the fastener 90 may be disposed between a core cowl structure 92 such as a strut or a bracket, and a core engine structure 94 such as a strut, a casing, or a bracket. The core cowl structure 92 may be fixedly coupled to the core cowl 28, such that the core cowl structure 92 moves with the core cowl 28, as described below. By contrast, the core engine structure 94 is not moveable with the core cowl 28 and instead may be fixedly coupled to a stationary and structural component of the core engine 44, such as the compressor casing 74 (as in the embodiment depicted), or one or more of the combustor casing 76, the turbine casing 78, or a support frame such as a compressor frame 96, a mid-frame, or a rear support frame or turbine frame, etc.

The fastener 90 may be fixedly connected to the engine component 88. The fastener 90 may comprise a cam lock type fitting, a bayonet fitting, a quarter-turn fastener, or other mechanical or electromechanical fastener or device that allows selectively coupling the engine component 88 to the core cowl 28 or the core engine 44. In particular embodiments, the core cowl 28 defines, or includes, an access opening 98 or a hatch wherein the fastener 90 is accessible from the access opening 98.

Figure 4:
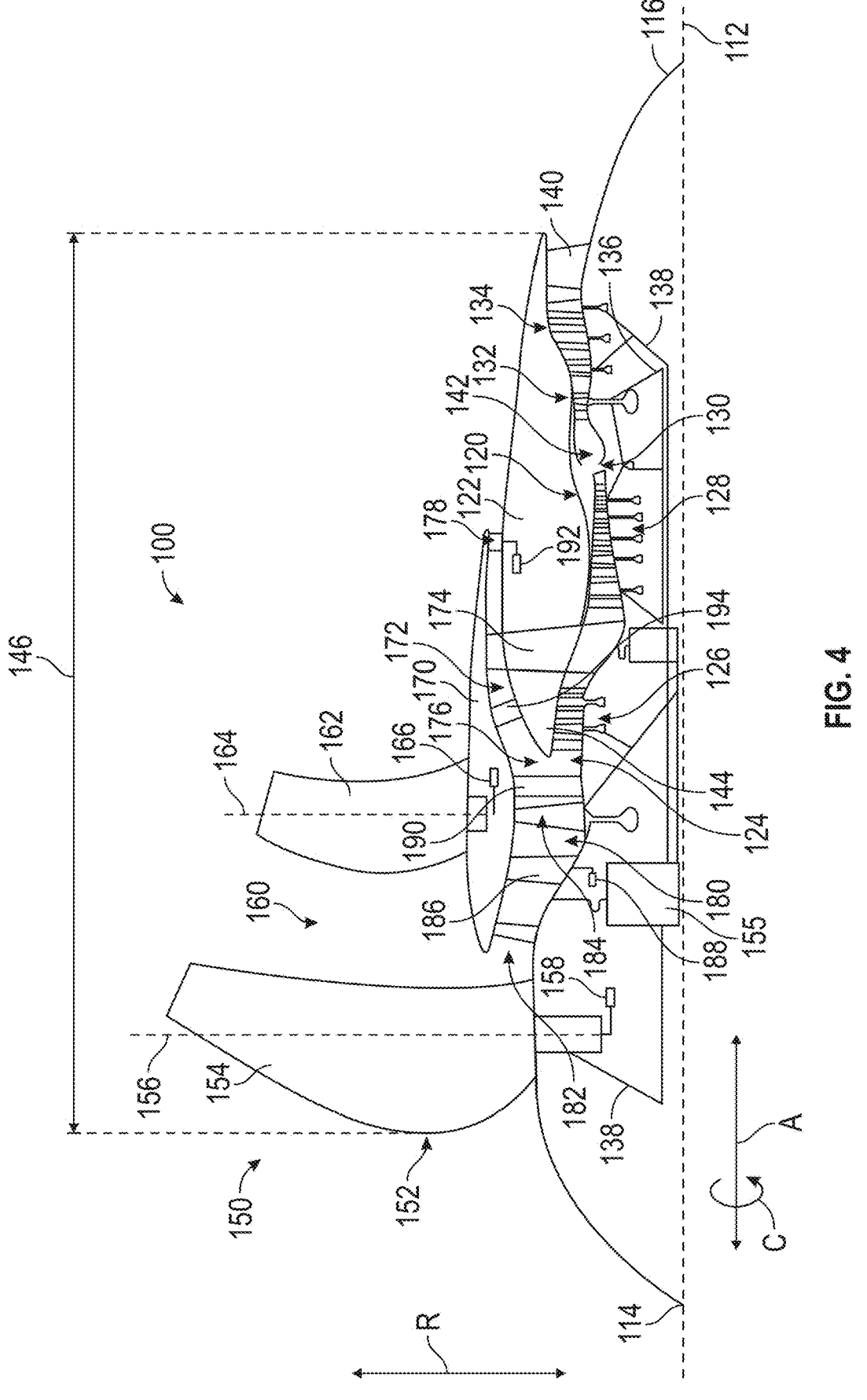
FIG. 4 is a schematic, cross-sectional view of a three-stream engine in accordance with an exemplary embodiment of the present disclosure.

The exemplary gas turbine engine 20, however, depicted in FIGS. 2 and 3 is provided by way of example only, and, in other exemplary embodiments, the gas turbine engine 20 may have other configurations. For example, FIG. 4 is a schematic cross-sectional view of a gas turbine engine 100 according to another example embodiment of the present disclosure. Particularly, FIG. 4 provides a turbofan engine having a rotor assembly with a single stage of unducted rotor blades. In such a manner, the rotor assembly may be referred to herein as an "unducted fan," or the entire gas turbine engine 100 may be referred to as an "unducted turbofan engine." In addition, the gas turbine engine 100 of FIG. 4 includes a third stream extending from the compressor section to a rotor assembly flowpath over the turbomachine, as will be explained in more detail below.

For reference, the gas turbine engine 100 defines an axial direction A, a radial direction R, and a circumferential direction C. Moreover, the gas turbine engine 100 defines an axial centerline, also referred to as a longitudinal centerline axis 112, that extends along the axial direction A. In general, the axial direction A extends parallel to the longitudinal centerline axis 112, the radial direction R extends outward from and inward to the longitudinal centerline axis 112 in a direction orthogonal to the axial direction A, and the circumferential direction extends three hundred sixty degrees (360°) around the longitudinal centerline axis 112. The gas turbine engine 100 extends between a forward end 114 and an aft end 116, e.g., along the axial direction A.

As shown in FIG. 4, the gas turbine engine 100 includes a turbomachine 120 having a fan section 150 that is positioned upstream thereof. Generally, the turbomachine 120 includes, in serial flow order, a compressor section, a combustion section, a turbine section, and an exhaust section. Particularly, as shown in FIG. 4, the turbomachine 120 includes a housing or a core cowl 122 that defines a core inlet 124 that is annular. The core cowl 122 further encloses at least in part a low-pressure system and a high-pressure system. For example, the core cowl 122 depicted encloses and supports at least in part a booster or a low-pressure ("LP") compressor 126 for pressurizing the air that enters the turbomachine 120 through the core inlet 124. A high-pressure ("HP"), multi-stage, axial-flow compressor 128 receives pressurized air from the LP compressor 126 and further increases the pressure of the air. The pressurized air stream flows downstream to a combustor 130 of the combustion section where fuel from a fuel system (e.g., any of the fuel systems detailed below) is injected into the pressurized air stream and ignited to raise the temperature and the energy level of the pressurized air.

As used herein, the terms "high/low speed" and "high/low-pressure" are used with respect to the high-pressure/high speed system and low-pressure/low speed system interchangeably. Further, the terms "high" and "low" are used in this same context to distinguish the two systems and are not meant to imply any absolute speed values or pressure values.

The high energy combustion products flow from the combustor 130 downstream to a high-pressure turbine 132. The high-pressure turbine 132 drives the high-pressure compressor 128 through a high-pressure shaft 136. In this regard, the high-pressure turbine 132 is drivingly coupled with the high-pressure compressor 128. The high energy combustion products then flow to a low-pressure turbine 134. The low-pressure turbine 134 drives the low-pressure compressor 126 and components of the fan section 150 through a low-pressure shaft 138. In this regard, the low-pressure turbine 134 is drivingly coupled with the low-pressure compressor 126 and the components of the fan section 150. The low-pressure shaft 138 is coaxial with the high-pressure shaft 136 in this example embodiment. After driving each of the high-pressure turbine 132 and the low-pressure turbine 134, the combustion products exit the turbomachine 120 through a rear support frame or a turbomachine exhaust nozzle 140. A core engine 146 of the gas turbine engine 100 is defined as the part of the gas turbine engine 100 that extends from the fan section 150 to the rear support frame or the turbomachine exhaust nozzle 140.

Accordingly, the turbomachine 120 defines a working gas flowpath or a core duct 142 that extends between the core inlet 124 and the rear support frame or the turbomachine exhaust nozzle 140. The core duct 142 is an annular duct positioned generally inward of the core cowl 122 along the radial direction R. The core duct 142 (e.g., the working gas flowpath through the turbomachine 120) may be referred to as a second stream. The fan section 150 includes a fan 152, which is the primary fan in this example embodiment. For the depicted embodiment of FIG. 4, the fan 152 is an open rotor or an unducted fan. In such a manner, the gas turbine engine 100 may be referred to as an open rotor engine. Moreover, the fan section 150 includes a single fan 152, and the fan 152 is the only unducted fan of the gas turbine engine 100 depicted.

As depicted, the fan 152 includes a plurality, or an array, of fan blades 154 (only one shown in FIG. 4). The fan blades 154 are rotatable, e.g., about the longitudinal centerline axis 112. As noted above, the fan 152 is drivingly coupled with the low-pressure turbine 134 via the low-pressure shaft 138. For the embodiments shown in FIG. 1, the fan 152 is coupled with the low-pressure shaft 138 via a speed reduction gearbox, also referred to as a gearbox 155, e.g., in an indirect-drive or geared-drive configuration.

Moreover, the array of fan blades 154 can be arranged in equal spacing around the longitudinal centerline axis 112. Each fan blade 154 has a root and a tip and a span defined therebetween. Each fan blade 154 defines a central blade axis 156. For this embodiment, each fan blade 154 of the fan 152 is rotatable about the central blade axis 156, e.g., in unison with one another. One or more actuators 158 are provided to facilitate such rotation and therefore may be used to change a pitch of the fan blades 154 about their respective central blades' axes 156.

The fan section 150 further includes a fan guide vane array 160 that includes fan guide vanes 162 (only one shown in FIG. 4) disposed around the longitudinal centerline axis 112. For this embodiment, the fan guide vanes 162 are not rotatable about the longitudinal centerline axis 112. Each fan guide vane 162 has a root and a tip and a span defined therebetween. The fan guide vanes 162 may be unshrouded as shown in FIG. 4 or, alternatively, may be shrouded, e.g., by an annular shroud spaced outward from the tips of the fan guide vanes 162 along the radial direction R or attached to the fan guide vanes 162.

Each fan guide vane 162 defines a central blade axis 164. For this embodiment, each fan guide vane 162 of the fan guide vane array 160 is rotatable about the central blade axis 164, e.g., in unison with one another. One or more actuators 166 are provided to facilitate such rotation and therefore may be used to change a pitch of the fan guide vane 162 about the central blade axis 164. However, in other embodiments, each fan guide vane 162 may be fixed or unable to be pitched about the central blade axis 164. The fan guide vanes 162 are mounted to a fan housing or fan cowl 170.

As shown in FIG. 4, in addition to the fan 152, which is unducted, a ducted fan 184 is included aft of the fan 152, such that the gas turbine engine 100 includes both a ducted and an unducted fan which both serve to generate thrust through the movement of air without passage through at least a portion of the turbomachine 120 (e.g., without passage through the HP compressor 128 and the combustion section for the embodiment depicted). The ducted fan 184 is rotatable about the same axis (e.g., the longitudinal centerline axis 112) as the fan blade 154. The ducted fan 184 is, for the embodiment depicted, driven by the low-pressure turbine 134 (e.g., coupled to the low-pressure shaft 138). In the embodiment depicted, as noted above, the fan 152 may be referred to as the primary fan, and the ducted fan 184 may be referred to as a secondary fan. The terms "primary" and "secondary" are terms of convenience, and do not imply any particular importance, power, or the like.

The ducted fan 184 includes a plurality of fan blades (not separately labeled in FIG. 4) arranged in a single stage, such that the ducted fan 184 may be referred to as a single stage fan. The fan blades of the ducted fan 184 can be arranged in equal circumferential spacing around the longitudinal centerline axis 112. Each blade of the ducted fan 184 has a root and a tip and a span defined therebetween.

The fan cowl 170 annularly encases at least a portion of the core cowl 122 and is generally positioned outward of at least a portion of the core cowl 122 along the radial direction R. Particularly, a downstream section of the fan cowl 170 extends over a forward portion of the core cowl 122 to define a fan duct flowpath, or simply a fan duct 172. According to this embodiment, the fan flowpath or fan duct 172 may be understood as forming at least a portion of the third stream of the gas turbine engine 100.

Incoming air may enter through the fan duct 172 through a fan duct inlet 176 and may exit through a fan exhaust nozzle 178 to produce propulsive thrust. The fan duct 172 is an annular duct positioned generally outward of the core duct 142 along the radial direction R. The fan cowl 170 and the core cowl 122 are connected together and supported by a plurality of substantially radially extending and circumferentially spaced stationary struts 174 (only one shown in FIG. 4).

The stationary struts 174 may each be aerodynamically contoured to direct air flowing thereby. Other struts in addition to the stationary struts 174 may be used to connect and support the fan cowl 170 or the core cowl 122. In many embodiments, the fan duct 172 and the core duct 142 may at least partially co-extend (generally axially) on opposite sides (e.g., opposite radial sides) of the core cowl 122. For example, the fan duct 172 and the core duct 142 may each extend directly from a leading edge 144 of the core cowl 122 and may partially co-extend generally axially on opposite radial sides of the core cowl 122.

The gas turbine engine 100 shown in FIG. 4 also defines or includes an inlet duct 180. The inlet duct 180 extends between the engine inlet 182 and the core inlet 124 and the fan duct inlet 176. The engine inlet 182 is defined generally at the forward end of the fan cowl 170 and is positioned between the fan 152 and the fan guide vane array 160 along the axial direction A. The inlet duct 180 is an annular duct that is positioned inward of the fan cowl 170 along the radial direction R. Air flowing downstream along the inlet duct 180 is split, not necessarily evenly, into the core duct 142 and the fan duct 172 by a fan duct splitter or the leading edge 144 of the core cowl 122. In the embodiment depicted, the inlet duct 180 is wider than the core duct 142 along the radial direction R. The inlet duct 180 is also wider than the fan duct 172 along the radial direction R.

Notably, for the embodiment depicted, the gas turbine engine 100 includes one or more features to increase an efficiency of a third-stream thrust, Fn3S (e.g., a thrust generated by an airflow through the fan duct 172 exiting through the fan exhaust nozzle 178, generated at least in part by the ducted fan 184). In particular, the gas turbine engine 100 further includes an array of inlet guide vanes 186 positioned in the inlet duct 180 upstream of the ducted fan 184 and downstream of the engine inlet 182. The array of inlet guide vanes 186 are arranged around the longitudinal centerline axis 112. For this embodiment, the inlet guide vanes 186 are not rotatable about the longitudinal centerline axis 112.

Each inlet guide vanes 186 defines a central blade axis (not labeled for clarity), and is rotatable about its respective central blade axis, e.g., in unison with one another. In such a manner, the inlet guide vanes 186 may be considered a variable geometry component. One or more actuators 188 are provided to facilitate such rotation and therefore may be used to change a pitch of the inlet guide vanes 186 about their respective central blade axes. However, in other embodiments, each inlet guide vanes 186 may be fixed or unable to be pitched about its central blade axis.

Further, located downstream of the ducted fan 184 and upstream of the fan duct inlet 176, the gas turbine engine 100 includes an array of outlet guide vanes 190. As with the array of inlet guide vanes 186, the array of outlet guide vanes 190 are not rotatable about the longitudinal centerline axis 112. However, for the embodiment depicted, unlike the array of inlet guide vanes 186, the array of outlet guide vanes 190 are configured as fixed-pitch outlet guide vanes.

Further, for the embodiment depicted, the fan exhaust nozzle 178 of the fan duct 172 is configured as a variable geometry exhaust nozzle. In such a manner, the gas turbine engine 100 includes one or more actuators 192 for modulating the variable geometry exhaust nozzle. For example, the variable geometry exhaust nozzle may be configured to vary a total cross-sectional area (e.g., an area of the nozzle in a plane perpendicular to the longitudinal centerline axis 112) to modulate an amount of thrust generated based on one or more engine operating conditions (e.g., a temperature, a pressure, a mass flowrate, etc. of an airflow through the fan duct 172). A fixed geometry exhaust nozzle may also be adopted.

The combination of the array of inlet guide vanes 186 located upstream of the ducted fan 184, the array of outlet guide vanes 190 located downstream of the ducted fan 184, and the fan exhaust nozzle 178 may result in a more efficient generation of the third-stream thrust, Fn3S, during one or more engine operating conditions. Further, by introducing a variability in the geometry of the inlet guide vanes 186 and the fan exhaust nozzle 178, the gas turbine engine 100 may be capable of generating more efficient third-stream thrust, Fn3S, across a relatively wide array of engine operating conditions, including takeoff and climb (where a maximum total engine thrust FnTotal, is generally needed) as well as cruise (where a lesser amount of total engine thrust, FnTotal, is generally needed).

Moreover, referring still to FIG. 4, in exemplary embodiments, air passing through the fan duct 172 may be relatively cooler (e.g., lower temperature) than one or more fluids utilized in the turbomachine 120. In this way, one or more heat exchangers 194 may be positioned in thermal communication with the fan duct 172. For example, one or more heat exchangers 194 may be disposed within the fan duct 172 and utilized to cool one or more fluids from the core engine 146 with the air passing through the fan duct 172, as a resource for removing heat from a fluid, e.g., compressor bleed air, oil, or fuel.

Although not depicted in detail, the heat exchanger 194 may be an annular heat exchanger extending substantially 360 degrees in the fan duct 172 (e.g., at least 300 degrees, such as at least 330 degrees). In such a manner, the heat exchanger 194 may effectively utilize the air passing through the fan duct 172 to cool one or more systems of the gas turbine engine 100 (e.g., lubrication oil systems, compressor bleed air, electrical components, etc.). The heat exchanger 194 uses the air passing through the fan duct 172 as a heat sink and correspondingly increases the temperature of the air downstream of the heat exchanger 194 and exiting the fan exhaust nozzle 178.

Figure 5:
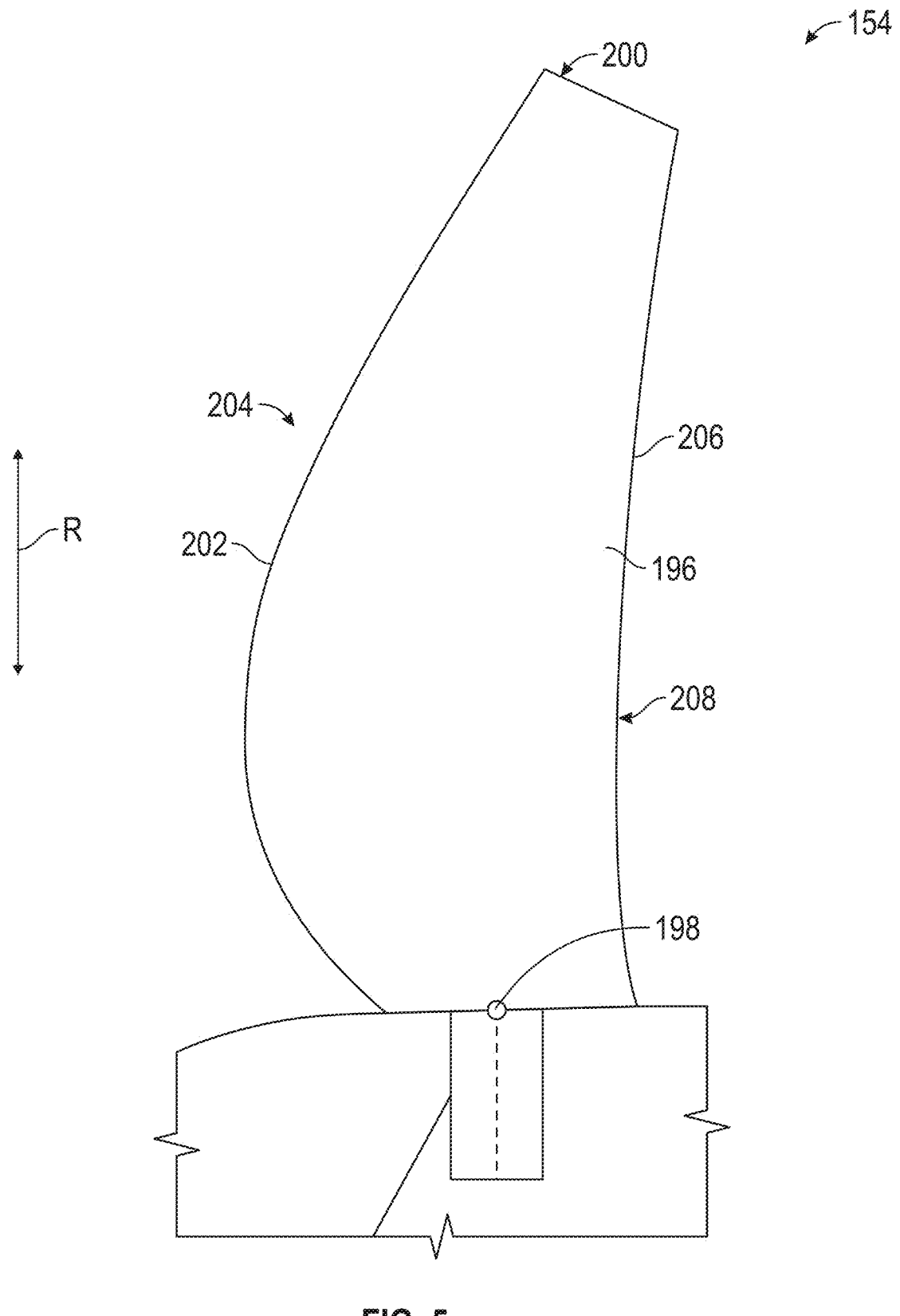
FIG. 5 is an enlarged view of an exemplary fan blade according to exemplary embodiments of the present disclosure.

FIG. 5 is an enlarged view of an exemplary fan blade 154 of the plurality or the array of fan blades 154 as shown in FIG. 4, according to exemplary embodiments of the present disclosure. As previously presented, each fan blade 154 has an airfoil or blade body 196. The blade body 196 spans in the radial direction R between a root 198 and a tip 200 of the blade body 196. The blade body 196 includes a leading edge 202 that extends along the span between the root 198 and the tip 200 along an upstream or a forward portion 204 of the fan blade 154. The blade body 196 further includes a trailing edge 206 that extends along the span between the root 198 and the tip 200 along a downstream or aft portion 208 of the fan blade 154.

Figure 6:
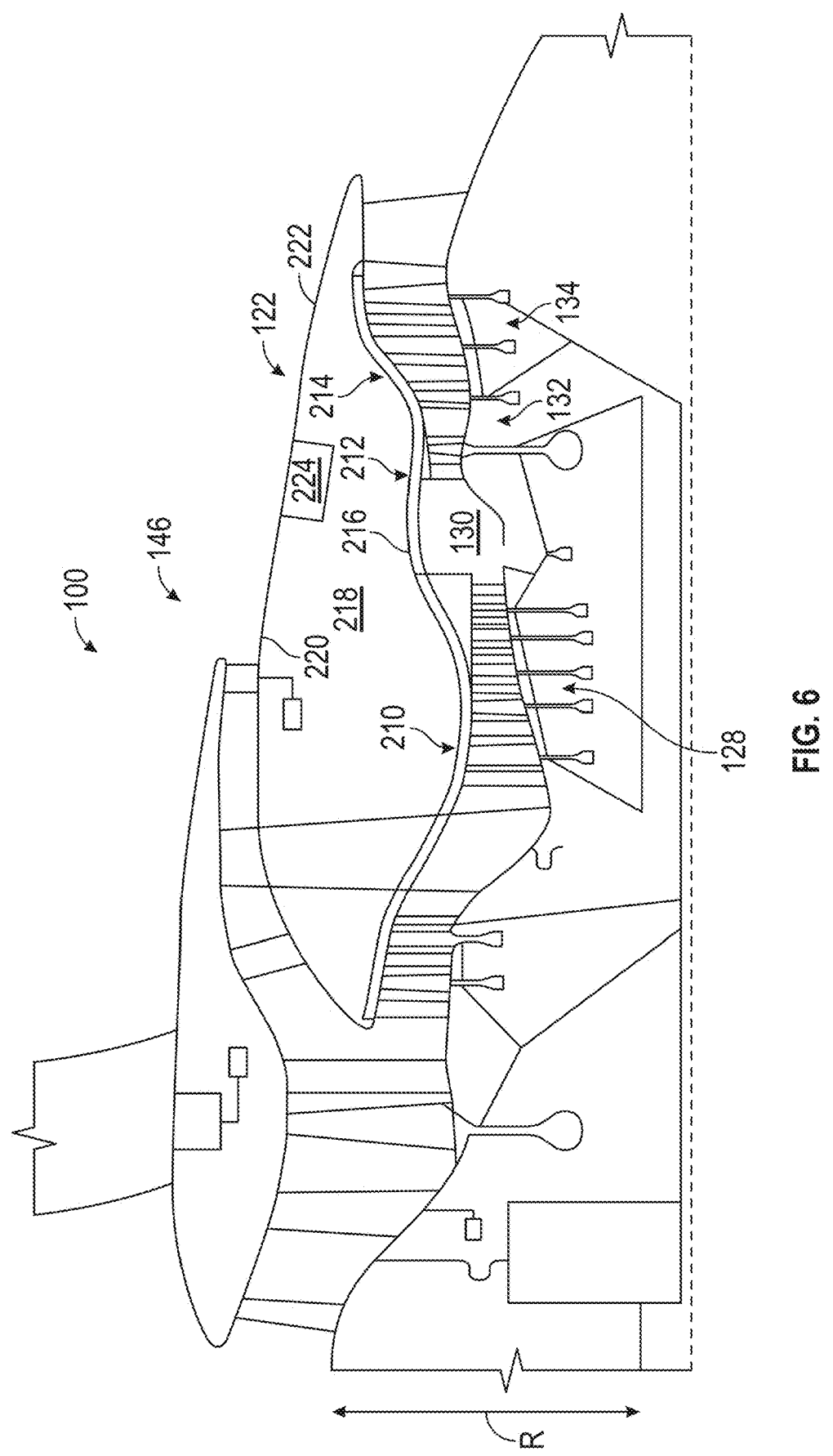
FIG. 6 is a schematic, cross-sectional view of a portion of a core engine of the gas turbine engine as shown in FIG. 4, according to an exemplary embodiment of the present disclosure.

FIG. 6 is a schematic, cross-sectional view of a portion of the core engine 146 of the gas turbine engine 100 as shown in FIG. 4, according to an exemplary embodiment of the present disclosure. As shown in FIG. 6, the high-pressure compressor 128 is encased within a compressor casing 210. The combustor 130 is encased within a combustor casing 212. The high-pressure turbine 132 and the low-pressure turbine 134 are encased within one or more turbine casing(s) 214. The combustor casing 212 defines an outer surface 216. A void or a space 218 is defined between an inner surface 220 of the core cowl 122 and the outer surface 216 of the combustor casing 212. The core cowl 122 further includes an outer surface 222 radially spaced from the inner surface 220 with respect to radial direction R. In exemplary embodiments, at least one engine component 224 is attached to the core cowl 122 inner surface 220. The at least one engine component 224 may include, but is not limited to, valves, electronics including engine and system controllers, fire and overheat detection system components, fire extinguisher components, heat exchangers, pumps, generator, etc.

Figure 7:
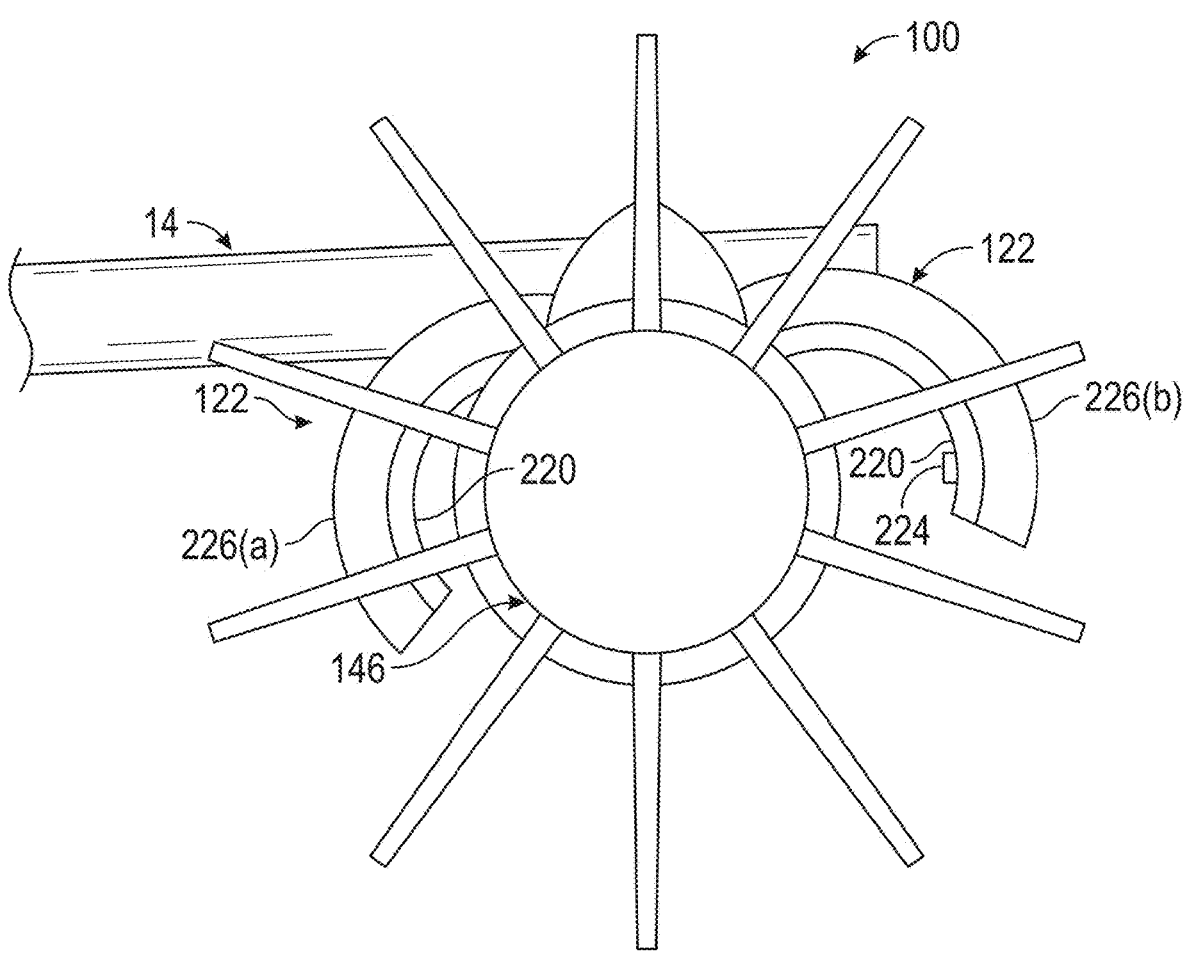
FIG. 7 is a front view of a portion of the gas turbine engine as shown in FIGS. 4 and 6, mounted to a portion of an exemplary wing according to exemplary embodiments of the present disclosure.

FIG. 7 is a front view of a portion of the gas turbine engine 100 as shown in FIGS. 4 and 6, mounted to a portion of an exemplary wing 14 according to exemplary embodiments of the present disclosure. The fan section 150 (shown in FIG. 4) is not shown in FIG. 7 for clarity. As shown in FIG. 7, the core cowl 122 is formed from at least two shells 226(a), 226(b). The core cowl 122 shown in FIG. 7 may also be representative of the core cowl 28 shown in FIGS. 2 and 3. The shells 226(a), 226(b) are pivotally mounted to the gas turbine engine 100 to allow the shells 226(a), 226(b) to swing upward and away from the core engine 146, thereby exposing several engine accessories and systems of the core engine 146 such as engine component 224 or the engine component 88 from FIG. 3, for inspection, repair, and maintenance. The shells 226(a), 226(b) are shown in FIG. 7 in an at least partially open state. When coupled to the inner surface 220 of the core cowl 122, the one or more engine accessories or engine systems will move with the core cowl 122 when the shells 226(a) and 226(b) are moved between open and closed positions.

Figure 8:
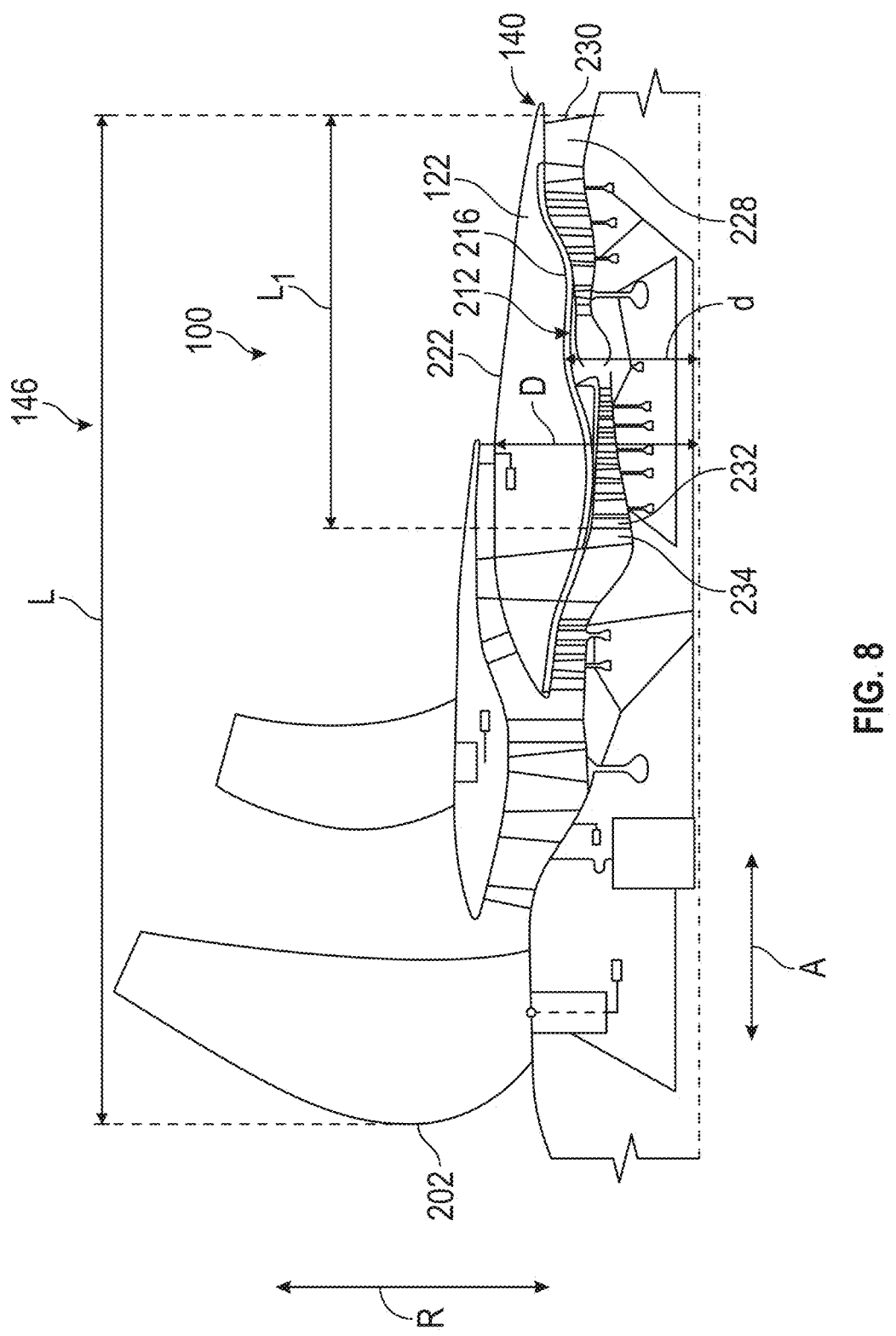
FIG. 8 is a schematic, cross-sectional view of the gas turbine engine as shown in FIG. 4, according to an exemplary embodiment of the present disclosure.

FIG. 8 is a schematic cross-sectional view of the gas turbine engine 100 as shown in FIG. 4, according to an exemplary embodiment of the present disclosure. As shown in FIG. 8, the outer surface 222 of the core cowl 122 defines a peak cowl diameter (D) in the radial direction R with respect to the longitudinal centerline axis 112. The outer surface 216 of the combustor casing 212 defines a maximum combustor casing diameter (d) along the radial direction R with respect to the longitudinal centerline axis 112. The core engine 146 defines an overall core axial length (L) along the axial direction A with respect to the longitudinal centerline axis 112. An under-core cowl axial length (L1) is defined along the axial direction A with respect to the longitudinal centerline axis 112.

In exemplary embodiments, as shown in FIG. 8, the turbomachine rear support frame or the turbomachine exhaust nozzle 140 includes a strut 228 having a trailing edge 230 within a working gas flowpath of the gas turbine engine 100. The overall core axial length (L) is measured from a forward-most portion of the leading edge 202 of a respective fan blade 154 to an aft-most portion of the trailing edge 230 of the strut 228. The gas turbine engine 100 further includes a high-pressure compressor inlet guide vane 232 having a leading edge 234 where the under-core cowl axial length (L1) along the axial direction is measured from the leading edge 234 of the high-pressure compressor inlet guide vane 232 to the trailing edge of the strut 228.

Figure 9:
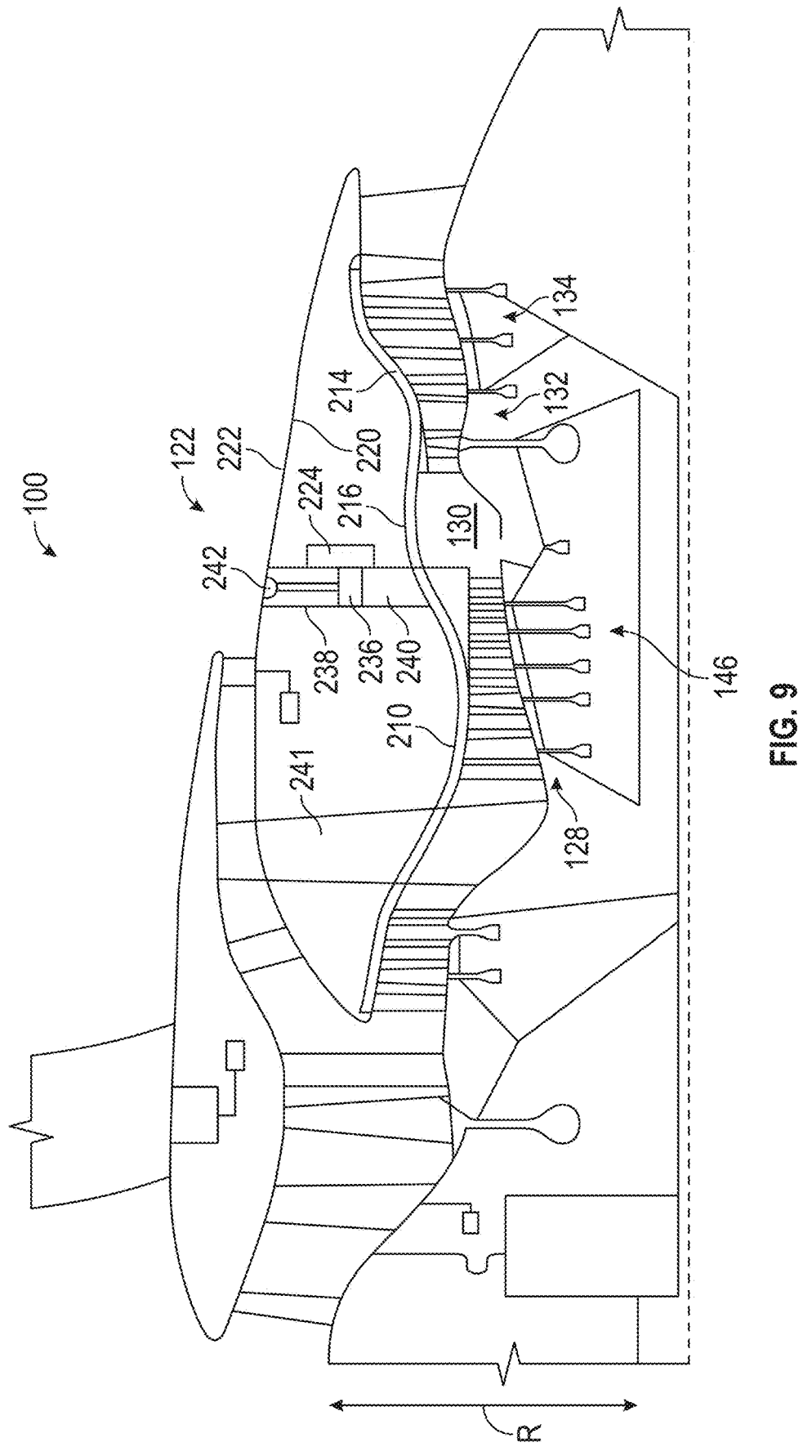
FIG. 9 is a schematic, cross-sectional view of the gas turbine engine as shown in FIG. 4, according to an exemplary embodiment of the present disclosure.

FIG. 9 is a schematic, cross-sectional view of the gas turbine engine 100 as shown in FIG. 4, according to an exemplary embodiment of the present disclosure. In exemplary embodiments, the engine component 224 is selectively coupled to the core engine 146 or the core cowl 122. When the engine component 224 is coupled to the core cowl 122, the engine component 224 travels with the core cowl 122 when pivoted away from the core engine 146. When the engine component 224 is coupled to the core engine 146, the engine component 224 stays coupled to the core engine 146 when the core cowl 122 is pivoted away from the core engine 146. In exemplary embodiments, and as previously presented, the engine component 224 is one of a heat exchanger, a sensor, a controller, a pump, a duct, a valve, fire and overheat detection system components, fire extinguisher components, or a generator. This list is not all inclusive of possible engine components that may be selectively coupled to the core cowl 122 or the core engine 146.

In particular, in at least certain exemplary embodiments, the engine component 224 may be the controller, such as an engine controller, such as a full authority digital engine control ("FADEC") controller. The gas turbine engine 100 depicted includes an unducted fan (see, e.g., unducted fan 152 in FIG. 4). In such a manner, the gas turbine engine 100 does not include a nacelle surrounding the fan (see, e.g., the nacelle 66 surrounding fan 52 in FIG. 2). Without the nacelle, the engine controller may need to be located within the core cowl 122 of the gas turbine engine 100. However, the environment within the core cowl 122 may be much hotter than within a nacelle, particularly closer to the turbomachinery components (e.g., the HP compressor, combustor, and HP turbine). Accordingly, positioning the engine controller outwardly along the radial direction R from the turbomachinery components and, e.g., selectively coupled to the core cowl 122 may reduce a temperature of the engine controller during operation of the gas turbine engine 100 to maintain a temperature of the engine controller below a maximum threshold for the electronics of the engine controller (e.g., below 200 degrees Fahrenheit), and allow for positioning of the engine controller within the core cowl 122. Briefly, a ratio of the peak cowl diameter (D) in the radial direction R and maximum combustor casing diameter (d) along the radial direction R may further facilitate such a positioning of the engine controller.

In other embodiments, however, the engine component 224 may additionally, or alternatively, be any other suitable component traditionally found within a nacelle of a ducted gas turbine engine, such as a lubrication oil tank, a lubrication oil pump, power electronics (e.g., inverters), electric machines, etc. Moreover, although the engine controller is described as being positioned within the core cowl 122 above, in other embodiments, the engine controller or one or more other suitable components traditionally found within a nacelle of a ducted gas turbine engine may be positioned within a pylon used to mount the gas turbine engine to an aircraft (such as to a wing or a fuselage of the aircraft).

In exemplary embodiments, the engine component 224 is selectively coupled to the core engine 146 or the core cowl 122 via a fastener 236. As shown in FIG. 9, the fastener 236 may be disposed between a core cowl structure 238 such as a strut or a bracket, and a core engine structure 240 such as a strut, a casing, or a bracket. The core cowl structure 238 may be fixedly coupled to the core cowl 122, such that the core cowl structure 238 moves with the core cowl 122, as described below. By contrast, the core engine structure 240 is not moveable with the core cowl 122 and instead may be fixedly coupled to a stationary and structural component of the core engine 146, such as the compressor casing 210 (as in the embodiment depicted), or one or more of the combustor casing 212, the turbine casings 214, or a support frame such as a compressor frame 241, a mid-frame, or rear support frame (not shown) or the turbomachine exhaust nozzle 140 (FIG. 2), etc.

The fastener 236 may be fixedly connected to the engine component 224. The fastener 236 may comprise a cam lock type fitting, a bayonet fitting, a quarter-turn fastener, or other mechanical or electromechanical fastener or device that allows selectively coupling the engine component 224 to the core cowl 122 or the core engine 146. In particular embodiments, the core cowl 122 defines or includes an access opening 242 or a hatch wherein the fastener 236 is accessible from the access opening 242.

Figures 10, 11:
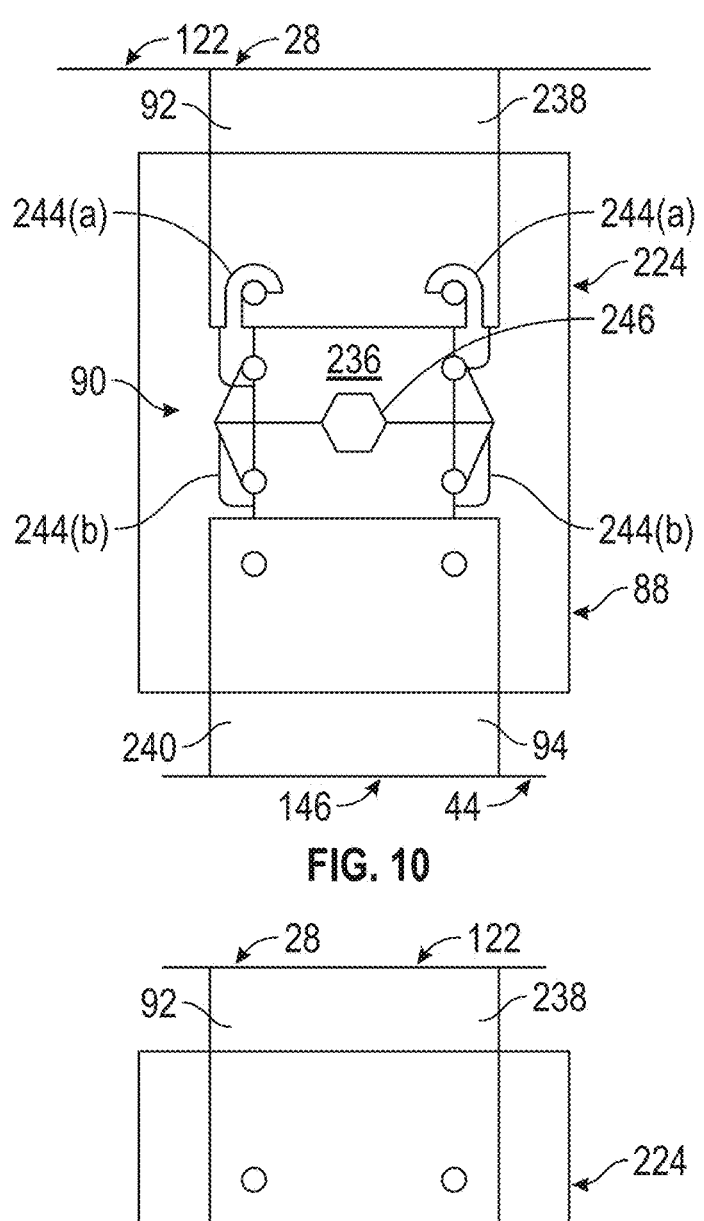
FIG. 10 is a schematic illustration including an engine component, a portion of a core cowl structure, an exemplary fastener, and a portion of a core engine structure according to exemplary embodiments of the present disclosure.
FIG. 11 is a schematic illustration including an engine component, a portion of a core cowl structure, an exemplary fastener, and a portion of a core engine structure according to exemplary embodiments of the present disclosure.

FIGS. 10 and 11 are schematic illustrations including the engine component 224 or the engine component 88, a portion of the core cowl structure 238 or the core cowl structure 92, a fastener 236 or the fastener 90, and a portion of the core engine structure 240 or the core engine structure 94, according to the present disclosure. In at least one embodiment, as shown in FIG. 10, the fastener 236, 90 includes a first plurality of tabs 244(a) and a second plurality of tabs 244(b). The tabs 244(a), 244(b) may be articulated about a pivot point 246 via a key or a tool (not shown). The key or the tool may be inserted through the access opening 242, 98 shown in FIGS. 9 and 3.

In an exemplary embodiment, as show in FIG. 10, when in a first position the first plurality of tabs 244(a) engages with the core cowl structure 238, 92 and the second plurality of tabs 244(b) disengage from the core engine structure 240, 94, thereby coupling the engine component 224, 88 to the core cowl 122, 28 and decoupling the engine component 224, 88 from the core engine 146, 44. In this configuration, the engine component 224, 88 will travel with the core cowl 122, 28 when it is opened and rotated outward from the core engine 146, 44. In addition, in this configuration, the core cowl 122, 28 may carry the weight load of the engine component 224, 88 during operation of the gas turbine engine 100.

As shown in FIG. 11, when in a second position the first plurality of tabs 244(*a*) are disengaged from the core cowl structure 238, 92 and the second plurality of tabs 244(*b*) are engaged with the core engine structure 240, 94 thereby coupling the engine component 224, 88 to the core engine 146, 44, and decoupling the engine component 224, 88 from the core cowl 122, 28. In this configuration, the engine component 224, 88 will be rigidly coupled to the core engine 146, 44 whether the core cowl 122, 28 is opened or closed.

Figures 12, 13:
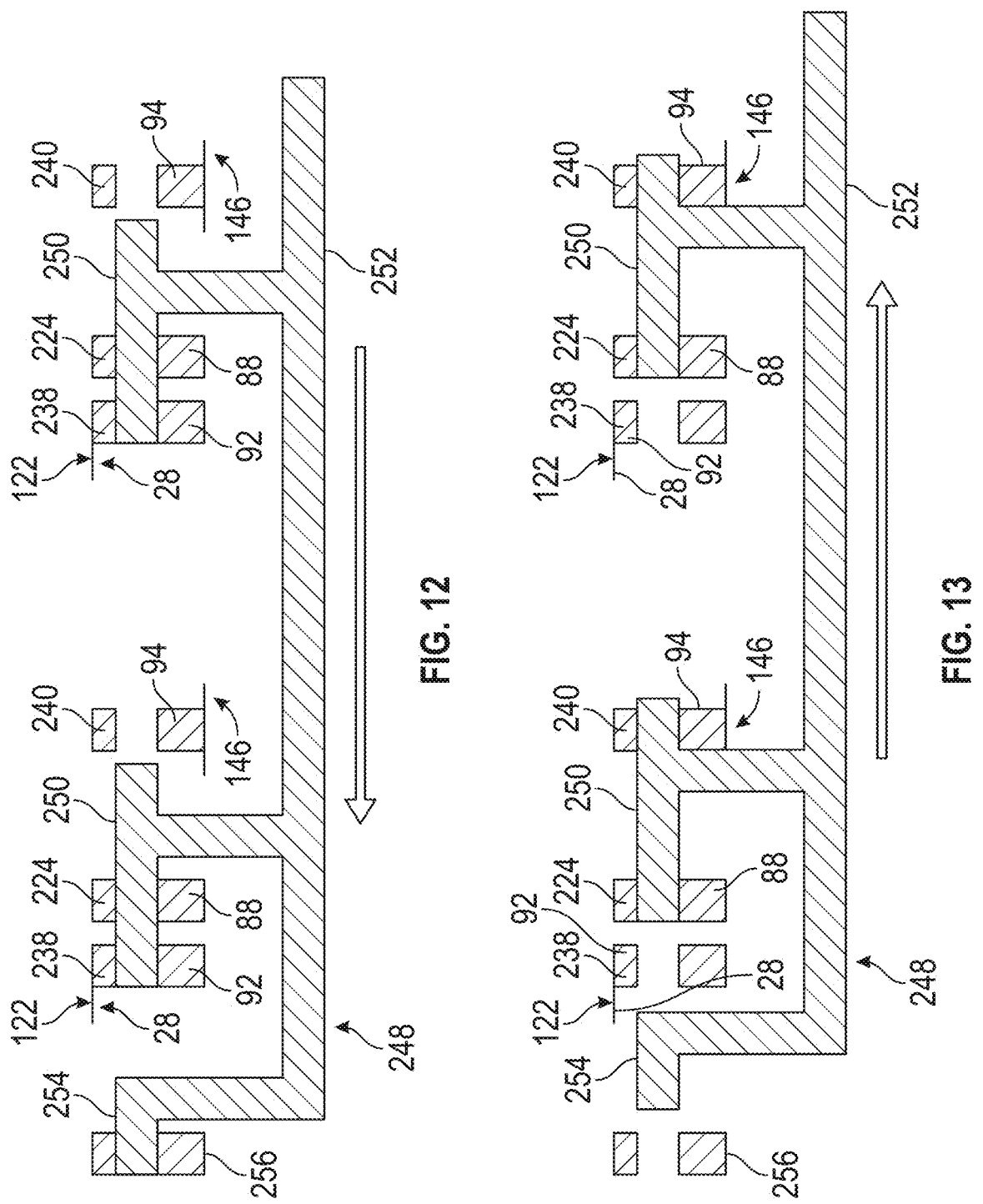
FIG. 12 is a schematic illustration including an engine component, a portion of a core cowl structure, a push-pull mechanism, and a portion of a core engine structure according to exemplary embodiments of the present disclosure.
FIG. 13 is a schematic illustration including an engine component, a portion of a core cowl structure, a push-pull mechanism, and a portion of a core engine structure according to exemplary embodiments of the present disclosure.

FIGS. 12 and 13 are schematic illustrations including the engine component 224, 88, a portion of core cowl structure 238, 92, a push-pull mechanism 248, and a portion of the core engine structure 240, 94 according to exemplary embodiments of the present disclosure. In various embodiments, as shown in FIGS. 12 and 13, the engine component 224, 88 is selectively coupled to the core cowl 122, 28 (FIG. 12) or the core engine 146 (FIG. 13) via a push-pull mechanism 248. The push-pull mechanism 248 includes at least one protrusion or at least one pin 250 fixed to a slidable rod 252. In a first position, as shown in FIG. 12, the pin(s) 250 engage(s) with the engine component 224, 88 and the core cowl 122, 28 via the core cowl structure 238, 92 and are disengaged from the core engine 146. In a second position, as shown in FIG. 13, the pin(s) 250 engage(s) with the with the engine component 224, 88 and the core engine 146, 44 via the core engine structure 240, 94 and are disengaged or decoupled from the core cowl 122, 28. In exemplary embodiments, the slidable rod 252 may be manipulated between the first position and the second position by a technician manually. In other embodiments, the slidable rod 252 may be manipulated between the first position and the second position hydraulicly or electrically. The slidable rod 252 will be movable while the core cowl 122, 28 is in a closed or at least partially closed state.

In exemplary embodiments as shown in FIGS. 12 and 13, the push-pull mechanism includes a second pin 254. As shown in FIG. 12 the second pin 254 engages with a door counterbalance mechanism 256 or a door counterbalance system when the first pin(s) 250 is/are engaged with the core cowl 122, 28 and the engine component 244, 88. In exemplary embodiments, the door counterbalance mechanism 256 includes either a spring, or pressurized gas strut to counterbalance the weight of the core cowl 122, 28 as it is manipulated between open and closed states.

As alluded to earlier, the inventors discovered, unexpectedly, during the course of gas turbine engine design—i.e., designing gas turbine engines having a variety of different primary fan and secondary fan characteristics—and evaluating an overall propulsive efficiency, significant relationships exist in a ratio of a core cowl diameter ratio (CDR), equal to the peak cowl diameter (D) divided by the maximum combustor casing diameter (d), and a core cowl length ratio (CLR), equal to the under-core cowl axial length (L1) divided by the overall core axial length (L). These relationships can be thought of as an indicator of the ability of a gas turbine engine to provide sufficient packaging space between the core engine combustor casing and the core cowl for packaging/mounting various accessories and/or engine systems, while also having a core engine capable of producing sufficient power to drive primary and secondary fans, particularly in more complex engine designs.

As engines become more complex (e.g., hybrid electric/load sharing between shafts, closed-loop thermal management systems, hot fuel, unducted, etc.), a reduction in core cowl size is concomitantly desired for greater overall engine performance. This, along with, in the case of an open rotor design (FIG. 4), the elimination of an outer nacelle enclosing a primary fan of the engine, has posed a significant challenge with engine accessory and engine support system packaging design that was not previously present in earlier engine designs. It will also be appreciated that a reduction in overall core engine axial length results in a reduction in space for packaging various engine accessories and support system components which are typically coupled to the outer nacelle, the core engine casings, or to various support frames of the gas turbine engine, generally beneath the core cowl.

It will be appreciated that a larger core cowl diameter is preferred to accommodate the packaging needs of a particular gas turbine engine design. However, if the core cowl diameter is too large various issues such as excess drag and weight may affect overall engine performance or propulsion efficiency. In addition, or in the alternative, if the core cowl is too large for a particular gas turbine engine design, issues with mounting and installing the engine occur. It will also be appreciated that a smaller core length for a given engine design provides various benefits, including but not limited to, reduced overall engine weight. This particular design is enabled at least in part by the three-stream engine design described above which provides less flow through the engine core for a given thrust output. However, it is to be appreciated that the engine length cannot be too small because of the power required to drive primary and mid-fans of the three-stream engine.

It will moreover be appreciated that elements that previously were previously mounted to nacelle and that are temp sensitive, i.e., electronics, FADEC, have more limited/restricted areas where they can reside within the engine. For example, it was found that for the 3-stream engine embodiment that the FADEC is preferably located in the space located between third stream and outer nacelle, or forward of the compressor.

It will moreover be appreciated that the inventors considered placement alternatively within the aircraft pylon supporting the engine (not shown in drawings). The discovery, below (Expression (1) and (2)) may be equally insightful and define the packaging size in those cases where some of the engine components normally housed in nacelle are moved to pylon, and where those components are located within the core cowl.

Notably, however, an engine having a core cowl diameter ratio (CDR) within the ranges described herein, particularly when also having a core engine length ratio (CLR) within the ranges described herein, may be particularly suited for mounting one or more of the components traditionally found within a nacelle of a ducted gas turbine engine within the core cowl of the gas turbine engine. For example, an engine having a core cowl diameter ratio (CDR) within the ranges described herein, particularly when also having a core engine length ratio (CLR) within the ranges described herein, may have a sufficient amount of room for these components, and further may have a sufficient amount of separation from hot turbomachinery during operation to allow positioning of one or more of these components within the core cowl, for example, power electronics and a Full Authority Digital Engine Control (FADEC), temperature-sensitive sensors, power cables.

As noted above, the inventors of the present disclosure discovered bounding the relationships defined by the core cowl diameter ratio (CDR) to the core engine length ratio (CLR) can result in a gas turbine engine maintaining or even improving upon a desired propulsive efficiency, while also taking into account the gas turbine engine's packaging concerns, weight concerns, and power requirements. The relationship discovered, infra, can identify an improved engine configuration suited for a particular mission requirement, one that takes into account installation, packaging and loading, power requirements, and other factors influencing the optimal choice for an engine configuration.

In addition to yielding an improved gas turbine engine, as explained in detail above, utilizing this relationship, the inventors found that the number of suitable or feasible gas turbine engine designs incorporating a primary fan and a secondary fan, and defining a third stream, capable of meeting both the propulsive efficiency requirements and packaging, weight could be greatly diminished, thereby facilitating a more rapid down selection of designs to consider as a gas turbine engine is being developed. Such a benefit provides more insight to the requirements for a given gas turbine engine well before specific technologies, integration and system requirements are developed fully. Such a benefit avoids late-stage redesign.

The desired relationships providing for the improved gas turbine engine, discovered by the inventors, are expressed as:

$$CDR = D/d \qquad (1)$$

$$CLR = L1/L \qquad (2)$$

where CDR is maximum core cowl diameter D to maximum combustor casing diameter ratio d, and CLR is under-core cowl axial length L1 divided by overall core axial length L.

Values for various parameters of the influencing characteristics of an engine defined by Expressions (1) and (2) are set forth below in TABLE 1:

TABLE 1

| Symbol | Description | Ranges appropriate for using Expression (1) |
|--------|-------------|---------------------------------------------|
| D/d | Core Cowl Diameter Ratio (CDR) | 2.7 to 3.5, such as 2.8 to 3.3, such as 2.9 to 3.1 |
| L1/L | Core Cowl Length Ratio (CLR) | 0.25 to 0.50, such as 0.3 to 0.45, such as 0.35 to 0.45, such as .40 to .45 |

Figure 14:
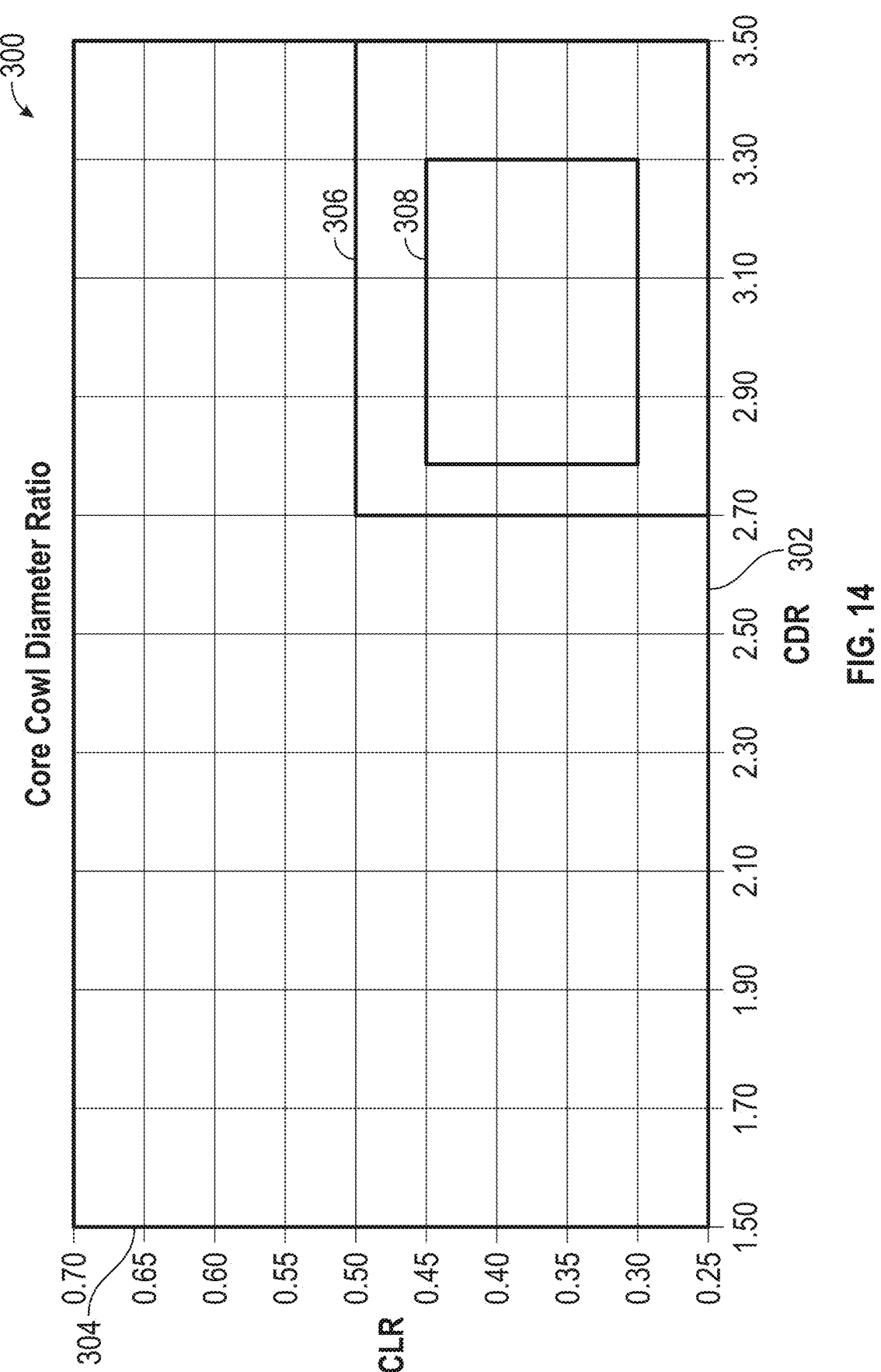
FIG. 14 is a graphical representation illustrating a relationship between CDR and CLR and showing relationships between the various parameters of Expressions (1) and (2) according to exemplary embodiments of the present disclosure.

FIG. 14 is a plot 300 illustrating the relationship between CDR and CLR and showing the relationships between the various parameters of Expressions (1) and (2). The plot 300 includes CDR values on an X-axis 302 and CLR values on a Y-axis 304. The plot 300 depicts an area 306 of CDR and CLR values where a gas turbine engine would provide sufficient packaging space between a core engine combustor casing and a core cowl for packaging/mounting various accessories and/or engine systems, while also having a core engine capable of producing sufficient power to drive primary and secondary fans. The plot 300 further depicts an area 308 of CDR and CLR values where a gas turbine engine may provide more desired packaging space between the core engine combustor casing and the core cowl for packaging/mounting various accessories and/or engine systems, while also having the core engine capable of producing sufficient power to drive primary and secondary fans. The exemplary gas turbine engine of FIG. 4 defines a CDR and a CLR within the area 308.

It will be appreciated that although the discussion above is generally relating to the gas turbine engine 100 (e.g., an open rotor engine) described above with reference to, e.g., FIG. 8, in various embodiments of the present disclosure, the relationships outlined above with respect to, e.g., Expressions (1) and (2) may be applied to any other suitable engine architecture.

Figure 15:
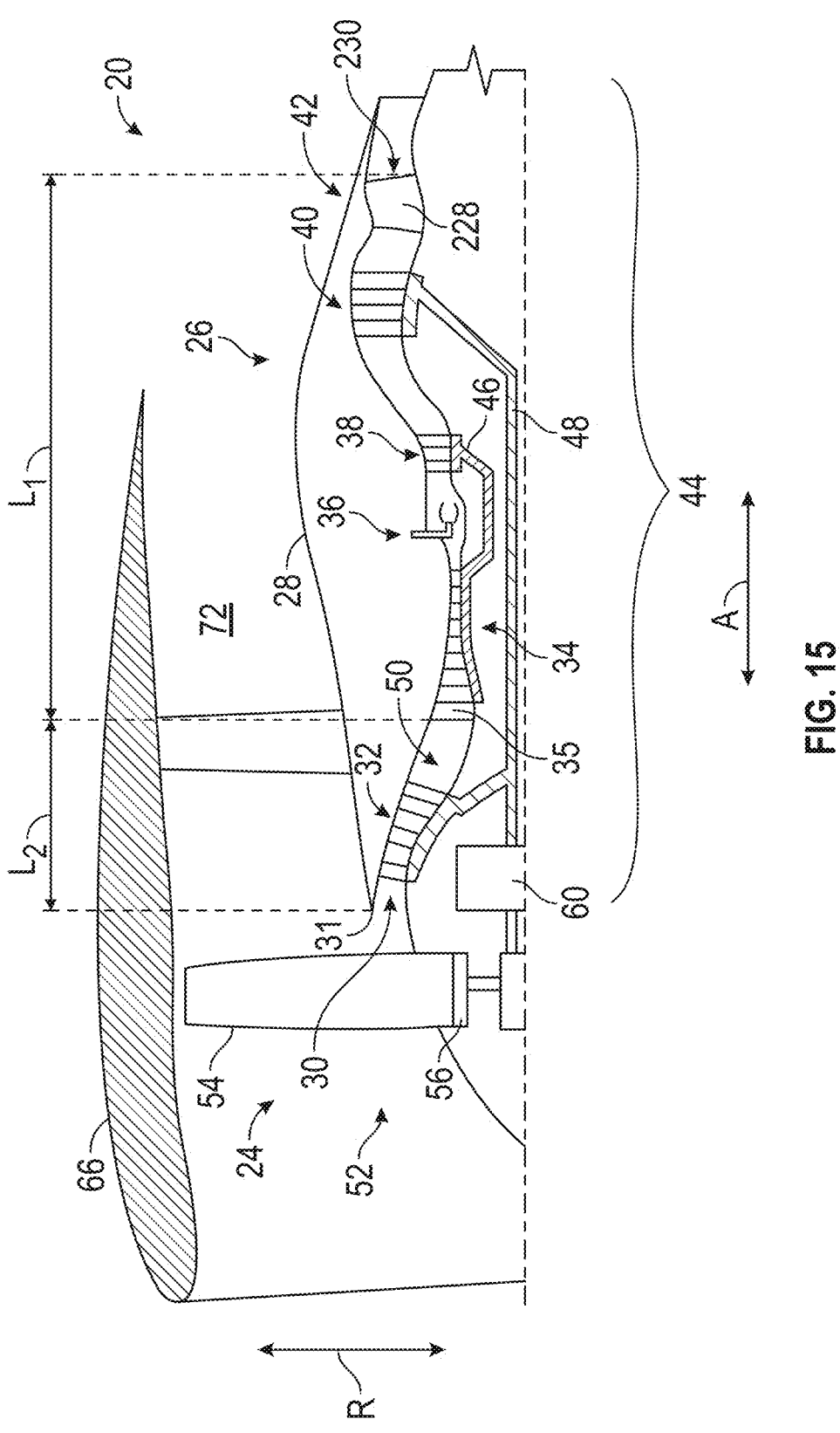
FIG. 15 is a schematic, cross-sectional view of a ducted turbofan engine in accordance with an exemplary embodiment of the present disclosure.

Referring now to FIG. 15, a gas turbine engine 20 in accordance with another exemplary aspect of the present disclosure is provided. The exemplary gas turbine engine of FIG. 15 is configured in a similar manner as the exemplary gas turbine engine 20 described above with reference to FIGS. 2 and 3. Accordingly, the exemplary gas turbine engine 20 of FIG. 15 is configured as a ducted gas turbine engine (i.e., includes a fan 52 with a nacelle 66 enclosing the fan 52). The same or similar numbers may refer to the same or similar parts.

For example, the gas turbine engine 20 generally includes a includes a fan section 24 and a turbomachine 26 disposed downstream from the fan section 24. The exemplary turbomachine 26 depicted generally includes an engine casing or core cowl 28 that defines a core inlet 30 that is annular. The core cowl 28 at least partially encases, in serial flow relationship, a compressor section including a booster or low-pressure compressor 32 and a high-pressure compressor 34, a combustion section 36, a turbine section including a high-pressure turbine 38 and a low-pressure turbine 40, and at least a portion of a jet exhaust nozzle 42. Together, these components or sections make up a core engine 44 of the turbomachine 26.

A high-pressure shaft 46 drivingly connects the high-pressure turbine 38 to the high-pressure compressor 34. A low-pressure shaft 48 drivingly connects the low-pressure turbine 40 to the low-pressure compressor 32. The compressor section, combustion section 36, turbine section, and jet exhaust nozzle 42 together define a working gas flow path 50 through the gas turbine engine 20.

For the embodiment depicted, the fan section 24 includes a fan 52 having a plurality of fan blades 54 coupled to a disk 56 in a spaced apart manner. As depicted, the fan blades 54 extend outwardly from disk 56 generally along the radial direction R. The fan blades 54 are rotatable about the longitudinal centerline axis 22 by the low-pressure shaft 48.

In an exemplary embodiment, as shown in FIG. 15, the gas turbine engine 20 further includes a gearbox 60. The gearbox 60 includes a plurality of gears for adjusting a rotational speed of the fan 52 relative to a rotational speed of the low-pressure shaft 48, such that the fan 52 and the low-pressure shaft 48 may rotate at more efficient relative speeds. The gearbox 60 may be any type of gearbox suitable to facilitate coupling the low-pressure shaft 48 to the fan 52 while allowing each of the low-pressure turbine 40 and the fan 52 to operate at a desired speed. For example, in some embodiments, the gearbox 60 may be a reduction gearbox.

More specifically, in some embodiments, the gearbox 60 may define a gear ratio of the input rotational speed (e.g., the low-pressure shaft 48) to the output rotational speed greater than 3 and less than 14. For example, in certain exemplary embodiments, the gearbox 60 may define a gear ratio greater than 4, such as greater than 5, such as greater than 6 and less than 12, such as less than 11. Inclusion of the gearbox 60 with a relatively high gear ratio may allow for a fan 52 with a relatively in combination with a low-pressure turbine 40 having a relatively high speed.

The gas turbine engine 20 defines an under-core cowl axial length (L1) along an axial direction A. More specifically, the gas turbine engine 20 includes a high-pressure compressor inlet guide vane 35 having a leading edge (not labeled), where the under-core cowl axial length (L1) is measured along the axial direction A from the leading edge of the high-pressure compressor inlet guide vane 35 to a trailing edge 230 of a strut 228 extending through the jet exhaust nozzle 42 (which may be a strut of a turbine rear frame). The under-core cowl axial length (L1) is therefore generally a measure along the axial direction A from the high-pressure compressor 34 to the exhaust of the gas turbine engine 20.

Further, the gas turbine engine 20 defines an initial compression axial length (L2) along the axial direction A. The initial compression axial length (L2) is measured along the axial direction A from a splitter 31 positioned at the core inlet 30 of the turbomachine 26 to the leading edge of the high-pressure compressor inlet guide vane 35. In the embodiment depicted, the low-pressure compressor 32 is located downstream of the splitter 31 and upstream of the leading edge of the high-pressure compressor inlet guide vane 35 (and is the only compressor within this axial location).

In other exemplary embodiments, however, the compressor section may have one or more intermediate stages of compression (e.g., an intermediate-pressure compressor in addition to the low-pressure compressor 32).

Further, the exemplary gas turbine engine 20 depicted in FIG. 15 may be configured as a narrow-body engine (i.e., an engine configured to provide thrust to a narrow-body aircraft). In such a manner, the gas turbine engine 20 may be configured to generate at least 18,000 pounds of thrust and less than 80,000 pounds of thrust during operation at a rated speed during standard day operating conditions, such as between 25,000 and 60,000 pounds of thrust during operation at a rated speed during standard day operating conditions, such as between 25,000 and 50,000 pounds of thrust during operation at a rated speed during standard day operating conditions.

Although the description of the under-core cowl axial length (L1) and the initial compression axial length (L2) is described above with reference to the gas turbine engine 20 of FIG. 15 (which includes a speed reduction device, i.e., reduction gearbox 60, for transmitting shaft power to the main or primary fan, a nacelle 66 enclosing the fan 52; and is a two stream engine, i.e., includes a bypass airflow passage 72 and a working gas flowpath 50, but not a third stream), in other embodiments, aspects of the present disclosure may be applied to other suitable gas turbine engines. For example, in other embodiments, the aspects described herein with respect to the under-core cowl axial length (L1) and the initial compression axial length (L2) (and the ICLR, as defined below), may apply to an unducted gas turbine engine (i.e., does not include a nacelle surrounding the primary fan; see, e.g., FIG. 4), a three stream gas turbine engine (i.e., includes a third stream; see, e.g., FIG. 4), etc. Notably, when applied to a three-stream gas turbine engine, the under-core cowl axial length (L1) may be defined from a splitter at an upstream-most inlet to a ducted portion of the engine, downstream of the primary fan (e.g., the splitter at the engine inlet 182 in FIG. 4) to the leading edge of the high-pressure compressor inlet guide vane 35.

As will be appreciated from the description herein, the inventors further discovered, unexpectedly, during the course of designing high bypass gas turbine engines (i.e., bypass ratio above 12) having a variety of turbomachine characteristics, a significant relationship exist in a ratio of the initial compression axial length (L2) to the under-core cowl axial length (L1). This ratio, referred to herein as an initial compression length ratio (ICLR), reflects a space available for packaging, including the portion of the under-cowl space available for locating more temperature-sensitive components for engines, and accounting for the less space available because the fan duct size and space typically chosen for storing accessories and power or communications equipment is limited or no longer available (as bypass ratio increases, the weight and drag associated with the fan duct correspondingly increases in size so as to becomes too prohibitive unless the fan duct storage volume is reduced in size, thereby mitigating the drag and weight associated with the higher bypass area).

In some embodiments, when combined with the CDR, it was unexpectedly found that an undercowl space was discovered that best balanced the need for accommodating a high-pressure compressor having 9, 10 or 11 stages; or a high-pressure compressor having less than 8 stages combined with a low-pressure compressor (or booster) having 4, 5 or 6 stages, while meeting a need for reducing a drag profile or skin friction of the engine casing as much as possible. In other embodiments, it was unexpectedly found that an undercowl space was discovered that best balanced the need for accommodating a low-pressure turbine having 4, 5 or 6 stages while balancing the need for reducing a drag profile or skin friction of the engine casing as much as possible. Importantly, in each of these examples the CDR and ICLR values also account for the packaging needed in the casing for components that may no longer be stored in the fan nacelle or when the fan nacelle is no longer present (e.g., as discussed earlier in connection with the open fan).

Compared to more traditional turbofan engines that have a relatively low diameter fan that rotate relatively quickly as a result of being driven directly from a low-pressure turbine of the turbofan engine (i.e., without a reduction gearbox), the inventors have found that by using a higher diameter fan driven through a reduction gearbox, the under-core cowl length (L1) may be reduced. In particular, such allows the primary fan to rotate at a lower angular rate relative to the low-pressure turbine, which efficiency can increase by rotating at a higher rate while maintaining a desired tip speed of the fan. Higher speeds of the low-pressure turbine may allow for less stages while extracting the same (or greater) amount of power. The lower speeds of the fan may allow for the fan to increase in diameter, which leads to a higher bypass ratio and lowered specific fuel consumption.

However, reduction of L1 may impose additional stress on high-pressure components (e.g., the high-pressure compressor and a high-pressure turbine). In particular, increases in initial compression length ratio (ICLR) may generally require the overall compressor ratio to be increased, which generally results in higher temperatures and pressures at an exit of the high-pressure compressor and at an inlet to the high-pressure turbine. Accordingly, increasing the initial compression length ratio (ICLR) too much may create an undesirable amount of stress (and premature wear) on the gas turbine engine.

In addition to yielding an improved turbofan engine, as explained in detail above, utilizing this relationship, the inventors found that the number of suitable or feasible turbofan engine designs capable of meeting both the propulsive efficiency requirements and limited stress and wear requirements could be greatly diminished, thereby facilitating a more rapid down selection of designs to consider as a turbofan engine is being developed. Such a benefit provides more insight to the requirements for a given turbofan engine well before specific technologies, integration and system requirements are developed fully. Such a benefit avoids late-stage redesign.

The desired relationships providing for the improved turbofan engine, discovered by the inventors, are expressed as:

$$ICLR = L2/L1 \qquad (3)$$

where ICLR is a ratio of the initial compression axial length (L2) to the under-core cowl axial length (L1).

Figure 16:
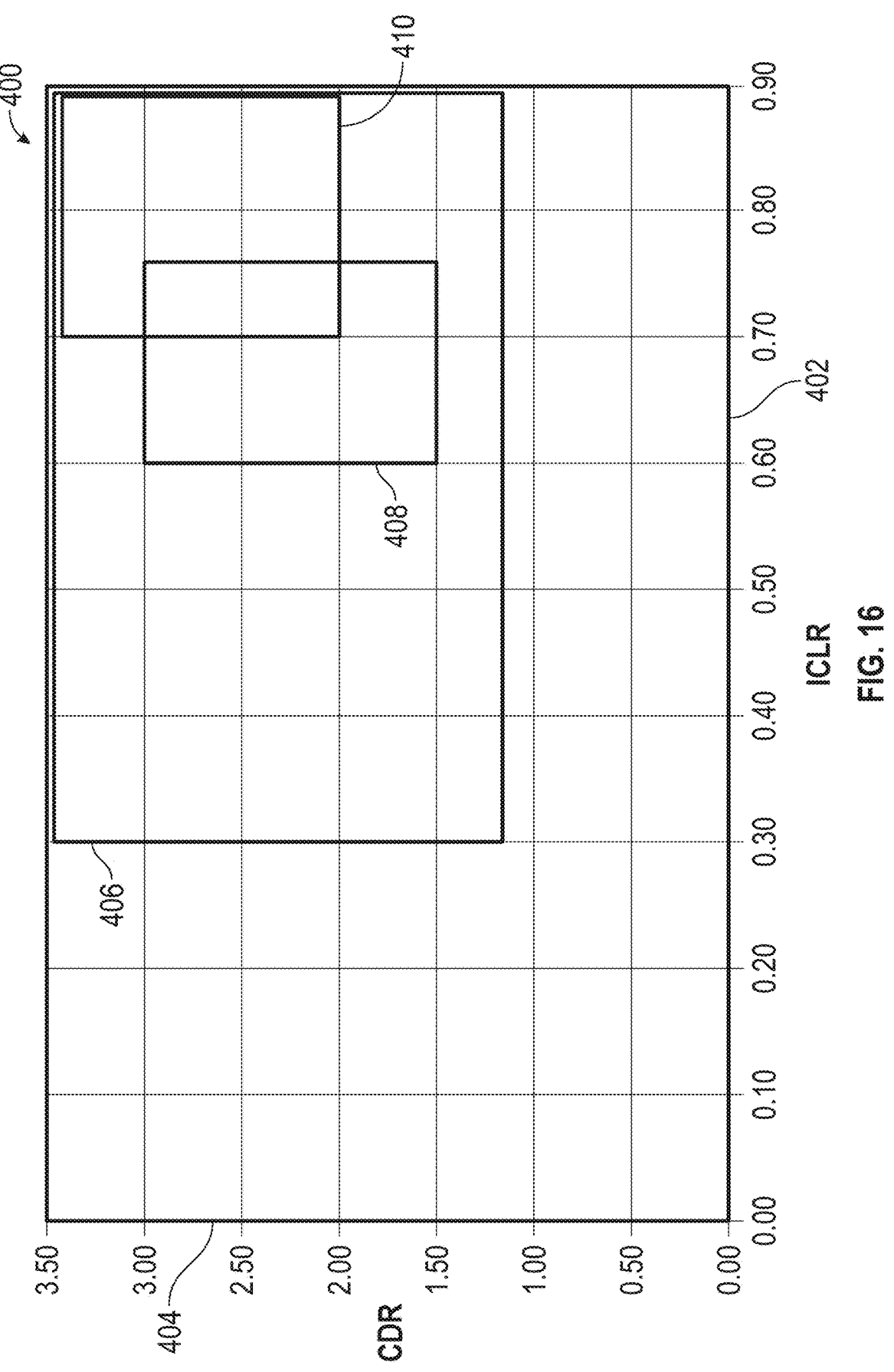
FIG. 16 is a graphical representation illustrating initial compression length ratio (ICLR) values for gas turbine engines in accordance with various exemplary embodiments of the present disclosure.

FIG. 16 is a plot 400 illustrating ICLR values, and more specifically, illustrating ICLR values along an X-axis 402 and CDR (Core Cowl Diameter Ratio) along the Y-axis 404. The plot 400 depicts an area 406 of ICLR values of a gas turbine engine in accordance with one or more aspects of the present disclosure where the gas turbine engine would provide desirable propulsive efficiency without overly stressing and wearing the gas turbine engine. The area 406 reflects ICLR values greater than or equal to 0.3 and less than or equal to 0.9, with CDR values greater than or equal to 1.24 and less than or equal to 3.5.

Referring still to the plot 400 of FIG. 16, the plot 400 further defines an area 408 of ICLR values of a gas turbine engine in accordance with one or more additional aspects of the present disclosure. The area 408 reflects ICLR values greater than or equal to 0.60 and less than or equal to 0.75, with CDR values greater than or equal to 1.5 and less than or equal to 3.0. The gas turbine engines of the present disclosure falling within the area 408 may be two stream turbofan engines (i.e., turbofan engines without a third stream), ducted turbofan engines, or both. As will be appreciated, two stream turbofan engines may not require as large of an initial compression axial length L2, and similarly ducted turbofan engines may be limited in maximum fan diameter (which as will be appreciated from the discussion above may similarly limit the ICLR). The exemplary gas turbine engine of FIG. 15 defines an ICLR and CDR within the area 408.

Referring still to the plot 400 of FIG. 16, the plot 400 further defines an area 410 of ICLR values of a gas turbine engine in accordance with one or more further aspects of the present disclosure. The area 410 reflects ICLR values greater than or equal to 0.70 and less than or equal to 0.89, with CDR values greater than or equal to 2.0 and less than or equal to 3.4. The gas turbine engines of the present disclosure falling within the area 410 may be three stream turbofan engines (i.e., turbofan engines including a third stream, such as the turbofan engines of FIGS. 4, 6, 8 and 9 having fan ducts 172), unducted turbofan engines, or both. As will be appreciated, three stream turbofan engines may include a larger initial compression axial length L2 (e.g., by virtue of the mid-fan), and similarly unducted turbofan engines may include a fan with a larger fan diameter (which as will be appreciated from the discussion above may allow for an increase in the ICLR). The exemplary gas turbine engine of FIG. 4 defines an ICLR and CDR within the area 410.

Notably, the areas 406, 408, and 410 may more specifically be directed to narrow-body engines. In such a manner, the gas turbine engines within these ranges may be configured to generate at least 18,000 pounds of thrust and less than 80,000 pounds of thrust during operation at a rated speed during standard day operating conditions, such as between 25,000 and 60,000 pounds of thrust during operation at a rated speed during standard day operating conditions, such as between 25,000 and 50,000 pounds of thrust during operation at a rated speed during standard day operating conditions. As will be appreciated, as an engine extends outside of this thrust class, a relationship of fan diameter, fan speed, high-pressure compressor size, and/or low-pressure turbine size may interact differently, such that the areas of ICLR values may not as readily capture desired gas turbine engines.

As mentioned above, a fuel system provides fuel to the combustor for mixing with the compressed air, igniting in the combustor, and forming combustion gases. The fuel system can be any of the fuel systems detailed herein with respect to FIGS. 17 to 22. The fuel system includes a variable displacement pump that fits between the core cowl and the combustor casing (e.g., between the maximum combustor casing diameter (d) and the peak cowl diameter (D)). While the variable displacement pump has a greater size than a fixed displacement pump, use of a variable displacement pump allows other components of the gas turbine engine, such as, for example, heat exchangers, actuators, or related components, to have a lesser size. Accordingly, the variable displacement pump allows a lesser combustor casing diameter, and, thus, a greater engine efficiency due to less horsepower extraction needed from the variable displacement pump, as compared to fuel systems for such gas turbine engines that utilize fixed displacement pumps.

Figure 17:
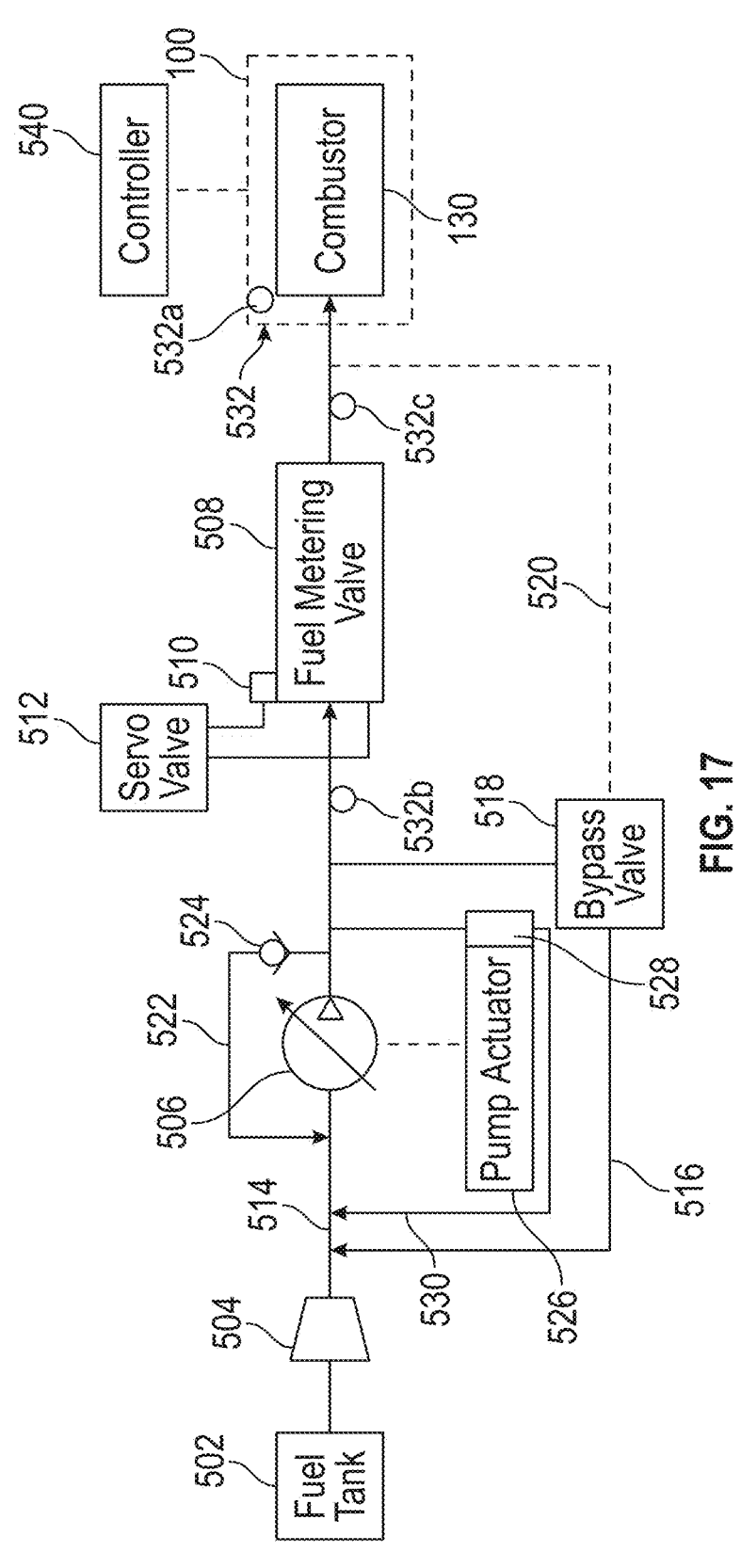
FIG. 17 is a schematic diagram of a fuel system for a gas turbine engine, according to the present disclosure.

FIG. 17 is a schematic diagram of a fuel system 500 for the gas turbine engine 100 of FIG. 4, according to the present disclosure. The fuel system 500 supplies fuel to the combustor 130 (FIG. 4) of the gas turbine engine 100. In some embodiments, the fuel system 500 can supply the fuel to other components of the gas turbine engine 100.

The fuel system 500 includes a fuel tank 502, a boost pump 504, and a variable displacement pump 506. The fuel tank 502 stores the fuel therein. The fuel can include any type of fuel for gas turbine engines, such as, for example, Jet A, Jet A1, kerosene, or the like. The fuel tank 502 can be positioned on the aircraft 10 (FIG. 1), such as, for example, in at least one of the fuselage 12 or the wings 14.

The boost pump 504 and the variable displacement pump 506 are arranged in series. The boost pump 504 and the variable displacement pump 506 pump the fuel (e.g., progressively increase the pressure of the fuel) from the fuel tank 502 to the combustor 130. The boost pump 504 and the variable displacement pump 506 can be driven or powered by the gas turbine engine 100 (e.g., through the HP shaft 136, the LP shaft 138, or an accessory gearbox), or can be powered by an external power source, such as a battery, or the like. While a boost pump is disclosed herein, the fuel system 500 can exclude the boost pump 502 such that the fuel system 500 includes only the variable displacement pump 506.

The boost pump 504 is driven at a fixed speed ratio with the gas turbine engine 100 such that the flow rate and the pressure of the fuel that the boost pump 504 provides is proportional to the speed of the gas turbine engine 100 (e.g., the rotational speed of the HP shaft 136, the LP shaft 138, or the accessory gearbox). In contrast, the variable displacement pump 506 provides a variable flow rate and a variable pressure of the fuel by changing a displacement of a piston or other member of the variable displacement pump 506. For example, the variable displacement pump 506 can provide a pressure of the fuel in a range of one hundred pounds per square inch (100 psi) to two thousand five hundred pounds per square inch (2,500 psi). The speed of the variable displacement pump 506 can be in a range of five hundred rotations per minute (500 RPM) to twelve thousand rotations per minute (12,000 RPM). The variable displacement pump 506 can include an actuator to adjust the flow rate or the pressure from the variable displacement pump, as detailed further below. The variable displacement pump 506 can include any type of variable displacement pump, such as, for example, a vane pump, a piston pump, or the like.

The fuel system 500 includes a fuel metering valve 508 downstream of the variable displacement pump 506 and upstream of the combustor 130. The fuel metering valve 508 controls a flow rate of (e.g., meters) the fuel from the variable displacement pump 506 to the combustor 130. The fuel system 500 includes a linear variable differential transformer 510 and a servo valve 512 for monitoring and controlling the fuel metering valve 508. The servo valve 512 is fluidly coupled to the fuel metering valve 508 and controls a flow of fluid to hydraulically operate the fuel metering valve 508. In this way, the servo valve 512 controls a position of the fuel metering valve 508 by controlling the flow fluid into or out of the fuel metering valve 508. The linear variable differential transformer 510 measures the position of the fuel metering valve 508 and sends an indication of the position to a controller 540.

The fuel system 500 includes one or more fuel supply lines 514 that fluidly couples the fuel tank 502 to the combustor 130 and that direct the fuel from the fuel tank 502 to the combustor 130. The boost pump 504 and the variable displacement pump 506 are fluidly coupled to the one or more fuel supply lines 514 to pump the fuel from the fuel tank 502 into the one or more fuel supply lines 514 and to the combustor 130.

In operation, the boost pump 504 pumps the fuel from the fuel tank 502 into the one or more fuel supply lines 514 by increasing the pressure to a first pressure, also referred to as a priming pressure. The variable displacement pump 506 further increases the pressure of the fuel in the one or more fuel supply lines 514 to a second pressure, also referred to as a desired pressure or a set pressure. In this way, the variable displacement pump 506 pumps the fuel to the combustor 130. The desired pressure or the set pressure is greater than the pressure demanded by the gas turbine engine 100 to ensure an adequate flow of fuel is provided to the gas turbine engine 100. The fuel metering valve 508 reduces at least one of the flow rate or the pressure of the fuel from the variable displacement pump 506 to the combustor 130 such that the gas turbine engine 100 achieves a desired speed or a set speed.

The fuel system 500 further includes a bypass line 516 that fluidly couples at an upstream end to the one or more fuel supply lines 514 downstream of the variable displacement pump 506 and at a downstream end to the one or more fuel supply lines 514 upstream of the variable displacement pump 506. The bypass line 516 includes a bypass valve 518 fluidly coupled to the bypass line 516. The bypass valve 518 directs an excess portion of the fuel at an outlet side (downstream) of the variable displacement pump 506 through the bypass line 516 and into the one or more fuel supply lines 514 to the inlet (upstream) of the variable displacement pump 506. In this way, the bypass valve 518 controls an amount of the fuel to the combustor 130. In some embodiments, the bypass valve 518 operates based on a pressure differential across the fuel metering valve 508. In particular, the fuel system 500 includes a hydraulic pressure line 520 that is fluidly coupled to the bypass valve 518 and the one or more fuel supply lines 514 downstream of the fuel metering valve 508. In this way, the bypass valve 518 receives a pressure signal of the pressure of the fuel in the one or more fuel supply lines 514 downstream of the fuel metering valve 508. The bypass valve 518 maintains a fixed pressure drop of the fuel across the fuel metering valve 508. In this way, as the fuel metering valve 508 changes the flow rate or the pressure of the fuel, the bypass valve 518 operates (e.g., opens or closes) to adjust the flow rate of the fuel to the fuel metering valve 508.

In some embodiments, the bypass valve 518 does not require any electrical actuation. Instead, the bypass valve 518 is hydromechanically controlled and the position of the bypass valve 518 is automatically adjusted based on the pressure drop across the fuel metering valve 508. For example, the bypass valve 518 is fluidly coupled to pressures upstream and downstream of the fuel metering valve 508. These pressures acting on areas of the fuel metering valve 508, as well as a spring force in the bypass valve 518, resolve as a force balance on a valve member (e.g., a sliding spool) in the bypass valve 518. The bypass valve 518 is configured to be in equilibrium at a fixed pressure differential (dP) across the fuel metering valve 508 (e.g., 30 psi drop/differential to 100 psi drop/differential (psid)). Therefore, as the fuel metering valve 508 is stroked open or stroked closed, the dP across the fuel metering valve 508 begins to change and the stroke position of the bypass valve 518 automatically changes to achieve equilibrium. Accordingly, the bypass flow rate changes through the bypass line 516, which in turn achieves the setpoint flow through the fuel metering valve 508. However, in other examples, the bypass valve 518 may be an electronically controlled valve.

The fuel system 500 also includes a relief line 522 that fluidly couples at an upstream end to the one or more fuel supply lines 514 downstream of the variable displacement pump 506 and at a downstream end to the one or more fuel supply lines 514 upstream of the variable displacement pump 506. The relief line 522 includes a relief valve 524 fluidly coupled to the relief line 522. The relief valve 524 is a one way valve or a check valve. The relief valve 524 is used as a back-up or a redundant relief valve device. For instance, the relief valve 524 may be set to a high pressure threshold (e.g., 2500 psi). Should the pressure at the outlet (downstream) of the variable displacement pump 506 reach the high pressure threshold, the relief valve 524 opens to vent high pressure fuel back to the inlet (upstream) of the variable displacement pump 506.

As mentioned above, the variable displacement pump 506 includes a pump actuator 526 that adjusts the flow rate or the pressure of the fuel from the variable displacement pump 506. In particular, the pump actuator 526 changes the displacement of the piston or the other member in the variable displacement pump 506. In this way, the pump actuator 526 changes the flow rate or the pressure of the fuel from the variable displacement pump 506 independently of an input speed of the variable displacement pump 506 (e.g., a speed of the gas turbine engine 100). The pump actuator 526 can control the variable displacement pump 506 based on or more parameters or commands. For example, the pump actuator 526 can control the variable displacement pump based on an outlet pressure of the fuel metering valve 508. In some embodiments, the pump actuator 526 can control the variable displacement pump 506 based on one or more other parameters, such as, for example, temperature of the fuel, pressure of the fuel, flow rate of the fuel, speed of the gas turbine engine 100, or the like.

In some embodiments, the pump actuator 526 can be powered by pressurized fuel from the one or more fuel supply lines 514. In particular, the fuel system 500 includes a pump actuator servo valve 528 fluidly coupled to a pump actuator fuel line 530. The pump actuator fuel line 530 is fluidly coupled at an upstream end to the one or more fuel supply lines 514 at an outlet (downstream) of the variable displacement pump 506 and at a downstream end to the one or more fuel supply lines 514 at an inlet (upstream) of the variable displacement pump 506. In this way, the pump actuator servo valve 528 controls a flow of the fuel into the pump actuator 526 to control a position of the pump actuator 526, and, thus, the pump actuator 526 controls the displacement of the piston or the other member of the variable displacement pump 506. The pump actuator servo valve 528 can operate based on a pressure differential between the inlet and the outlet of the variable displacement pump 506. In some embodiments, the pump actuator servo valve 528 can operate based on a voltage applied to the pump actuator 526.

The fuel system 500 also includes one or more sensors 532 to measure or to monitor one or more parameters of the fuel system 500 or the gas turbine engine 100. The one or more sensors 532 can include pressure sensors, flow sensors, temperature sensors, speed sensors, or the like. In FIG. 17, the one or more sensors 532 include an engine sensor 532a, a first fuel system sensor 532b, and a second fuel system sensor 532c. The engine sensor 532a is a speed sensor for measuring the speed of the gas turbine engine 100. In particular, the engine sensor 532a measures the speed of the HP shaft 136 (FIG. 1) or the LP shaft 138 (FIG. 1).

The first fuel system sensor 532b is positioned to sense a parameter of the fuel in the fuel supply lines 514 at an inlet (upstream) of the fuel metering valve 508. The second fuel system sensor 532c is positioned to sense the parameter of the fuel in the fuel supply lines 514 at an outlet (downstream) of the fuel metering valve 508. The sensors 532b, 532c are pressure sensors for measuring the pressure of the fuel in the fuel supply lines 514. In some embodiments, the sensors 532b, 532c are temperature sensors for measuring the temperature of the fuel in the fuel supply lines 514. The fuel system 500 can include any number of fuel system sensors for measuring one or more parameters of the fuel in the fuel system 500.

As mentioned above, the fuel system 500 includes a controller 540. The controller 540 is in two-way communication with the fuel system 500 to control aspects of the fuel system 500. In some embodiments, the controller 540 can include an input/output module, a comparator, a fuel metering valve controller, a pump actuator controller, and a bypass valve controller. These components can be implemented as separate controllers, as virtual controllers, or in a single controller. The controller 540 is communicatively coupled to the variable displacement pump 506 (e.g., the pump actuator 526 or the pump actuator servo valve 528), the servo valve 512, the bypass valve 518, or any other component of the fuel system 500.

The controller 540, or components thereof, may be located onboard the gas turbine engine 100, onboard the aircraft, or can be located remote from each of the gas turbine engine 100 and the aircraft (e.g., on the ground or on a remote propulsor).

The controller 540 may include a standalone controller or may include a plurality of controllers to operate the fuel system 500. In this embodiment, the controller 540 is a computing device having one or more processors and a memory. The one or more processors can be any suitable processing device, including, but not limited to, a microprocessor, a microcontroller, an integrated circuit, a logic device, a programmable logic controller (PLC), an application specific integrated circuit (ASIC), or a Field Programmable Gate Array (FPGA). The memory can include one or more computer-readable media, including, but not limited to, non-transitory computer-readable media, a computer readable non-volatile medium (e.g., a flash memory), a RAM, a ROM, hard drives, flash drives, or other memory devices.

The memory can store information accessible by the one or more processors, including computer-readable instructions that can be executed by the one or more processors. The instructions can be any set of instructions or a sequence of instructions that, when executed by the one or more processors, cause the one or more processors and the controller 540 to perform operations. The controller 540 and, more specifically, the one or more processors are programmed or configured to perform these operations, such as the operations discussed further below. In some embodiments, the instructions can be executed by the one or more processors to cause the one or more processors to complete any of the operations and functions for which the controller 540 is configured, as will be described further below. The instructions can be software written in any suitable programming language or can be implemented in hardware. Additionally, or alternatively, the instructions can be executed in logically or virtually separate threads on the processors. The memory can further store data that can be accessed by the one or more processors.

The technology discussed herein makes reference to computer-based systems and actions taken by, and information sent to and from, computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

The controller 540 (e.g., the input/output module) receives signals from the sensors 532 indicative of measured values of the one or more parameters (e.g., pressure, temperature, flow rate, speed, etc.). The controller 540 (e.g., the comparator) compares the measured values of the one or more parameters to one or more thresholds or one or more threshold ranges. The controller 540 (e.g., the fuel metering valve controller, the pump actuator controller, the bypass valve controller, etc.) operates one or more components of the fuel system 500 to control at least one of the pressure or the flow rate of the fuel to the combustor 130 or to other components of the gas turbine engine 100. The controller 540 can also receive other signals or commands from other devices, such as pilot commands.

In some embodiments, the controller 540 can receive speed measurements from the engine sensor 532a and compare the speed to one or more speed thresholds or one or more speed threshold ranges. The controller 540 can control the output (e.g., at least one of the flow rate or the pressure of the fuel) of the variable displacement pump 506 based on the speed of the gas turbine engine 100.

In some embodiments, the controller 540 can receive pressure measurements from the fuel system sensors 532b, 532c and compare the pressure or a pressure differential between the outlet and the inlet of the fuel metering valve 508 to one or more pressure thresholds or one or more pressure threshold ranges. The controller 540 can control the output of the variable displacement pump 506 based on the comparison. In some embodiments, the controller 540 can receive temperature measurements from the fuel system sensors 532b, 532c and compare the temperature or a temperature differential between the outlet and the inlet of the fuel metering valve 508 to one or more temperature thresholds or one or more temperature threshold ranges. The controller 540 can control the output of the variable displacement pump 506 based on the comparison.

The controller 540 (e.g., the fuel metering valve controller) controls the fuel metering valve 508. In particular, the controller 540 controls the servo valve 512 to control the position of the fuel metering valve 508 to control the flow rate of the fuel to the combustor 130. The controller 540 receives feedback measurements from the linear variable differential transformer 510 and controls the fuel metering valve 508 based on the feedback measurements. The controller 540 can also the fuel metering valve 508 (e.g., the servo valve 512) based on one or more signals from the pilot, such as, for example, a thrust lever or a throttle lever in the cockpit. For example, the controller 540 controls the fuel metering valve 508 to supply more fuel or less fuel to the combustor 130 to achieve a desired level of thrust based on a position of the throttle lever.

The controller 540 (e.g., the pump actuator controller) controls the pump actuator 526 (e.g., the pump actuator servo valve 528) to control the stroke of the variable displacement pump 506, and, thus, control at least one of the flow rate or the pressure of the fuel from the variable displacement pump 506. In some embodiments, the controller 540 controls the pump actuator servo valve 528 to control a flow of the fuel into the pump actuator 526. In some embodiments, the pump actuator 526 is electrically powered and includes an electric motor or a solenoid that operates to control the position of the pump actuator 526. In such embodiments, the controller 540 controls a voltage applied to the pump actuator 526 to control the output of the variable displacement pump 506.

In some embodiments, the bypass valve 518 is an electronically controlled valve and the controller 540 controls the position of the bypass valve 518. For example, the controller 540 can open or close the bypass valve 518 based on one or more parameters from the sensors 532.

Figure 18:
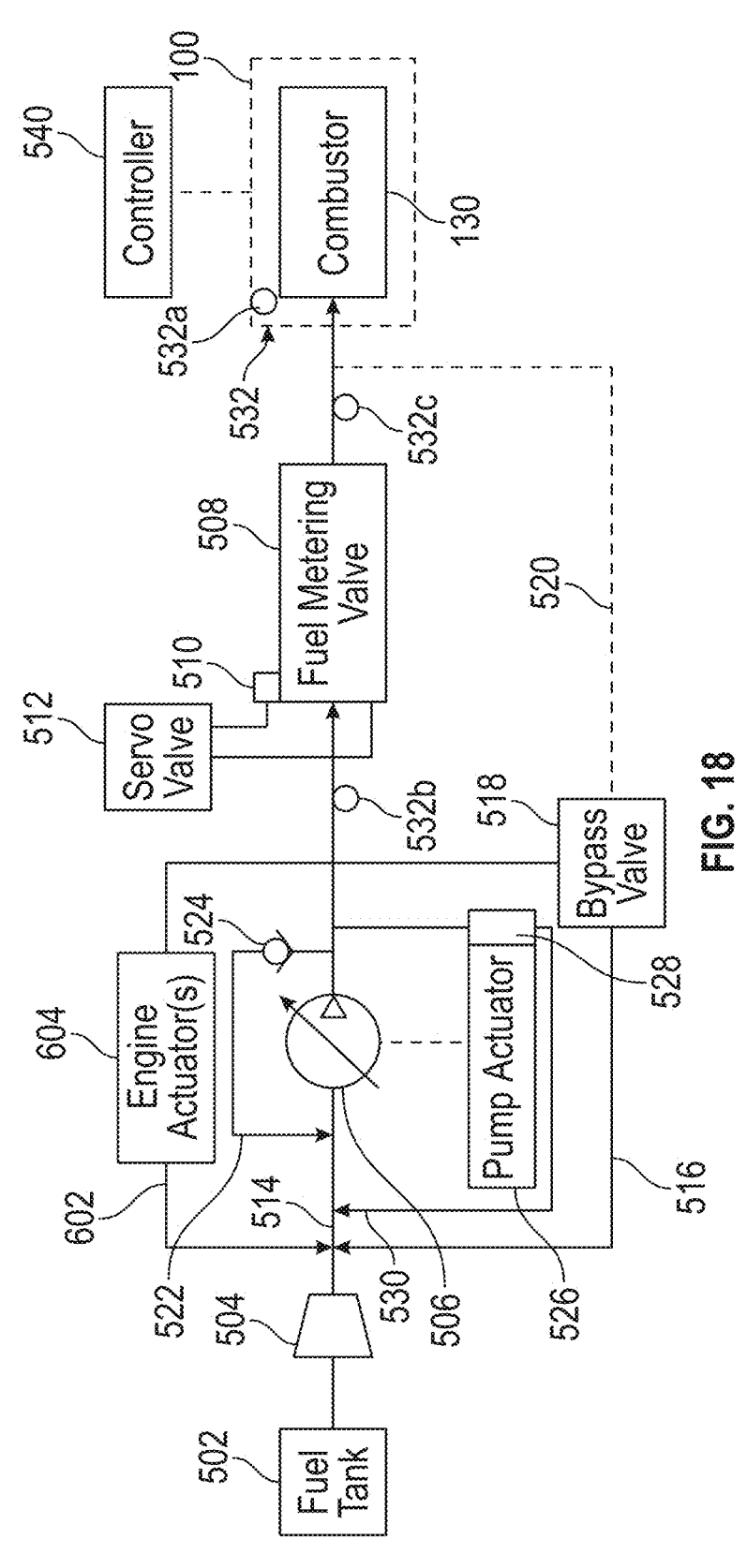
FIG. 18 is a schematic diagram of a fuel system for a gas turbine engine, according to another embodiment.

FIG. 18 is a schematic diagram of a fuel system 600 for the gas turbine engine 100 of FIG. 4, according to another embodiment. The fuel system 600 may be the same as or similar to the fuel system 500. Accordingly, like numbers represent like components. The difference between the fuel system 600 and the fuel system 500 will be described in more detail to follow. The remaining structure and function are the same as described with respect to the fuel system 500 of FIG. 17 and will not be described herein. Additionally, any of the alternatives to the fuel system 500 apply equally to the fuel system 600 of FIG. 18.

As shown in FIG. 18, the fuel system 600 further includes one or more engine actuator lines 602 and one or more engine actuator 604. The engine actuator lines 602 are fluidly coupled at an upstream end to the one or more fuel supply lines 514 at an outlet (downstream) of the variable displacement pump 506 and at a downstream end to the one or more fuel supply lines 514 at an inlet (upstream) of the variable displacement pump 506. The engine actuators 604 can control one or more components of the gas turbine engine 100. The one or more engine actuators 604 can include, for example, an actuator for the fan guide vanes 162 (FIG. 4), an actuator for a variable area exhaust on the gas turbine engine 100, the actuators 158 (FIG. 4) for controlling the pitch of the fan blades 154 (FIG. 4), or actuators for controlling any other components of the gas turbine engine 100. The fuel through the engine actuator lines 602 acts as a hydraulic power source for operating the engine actuators 604. In particular, the engine actuator lines 602 direct the fuel from the outlet of the variable displacement pump 506 to the engine actuators 604 for controlling a position of the engine actuators 604, and back into the fuel supply lines 514 at the inlet of the variable displacement pump 506 such that the fuel is recirculated back through the variable displacement pump 506.

Figure 19:
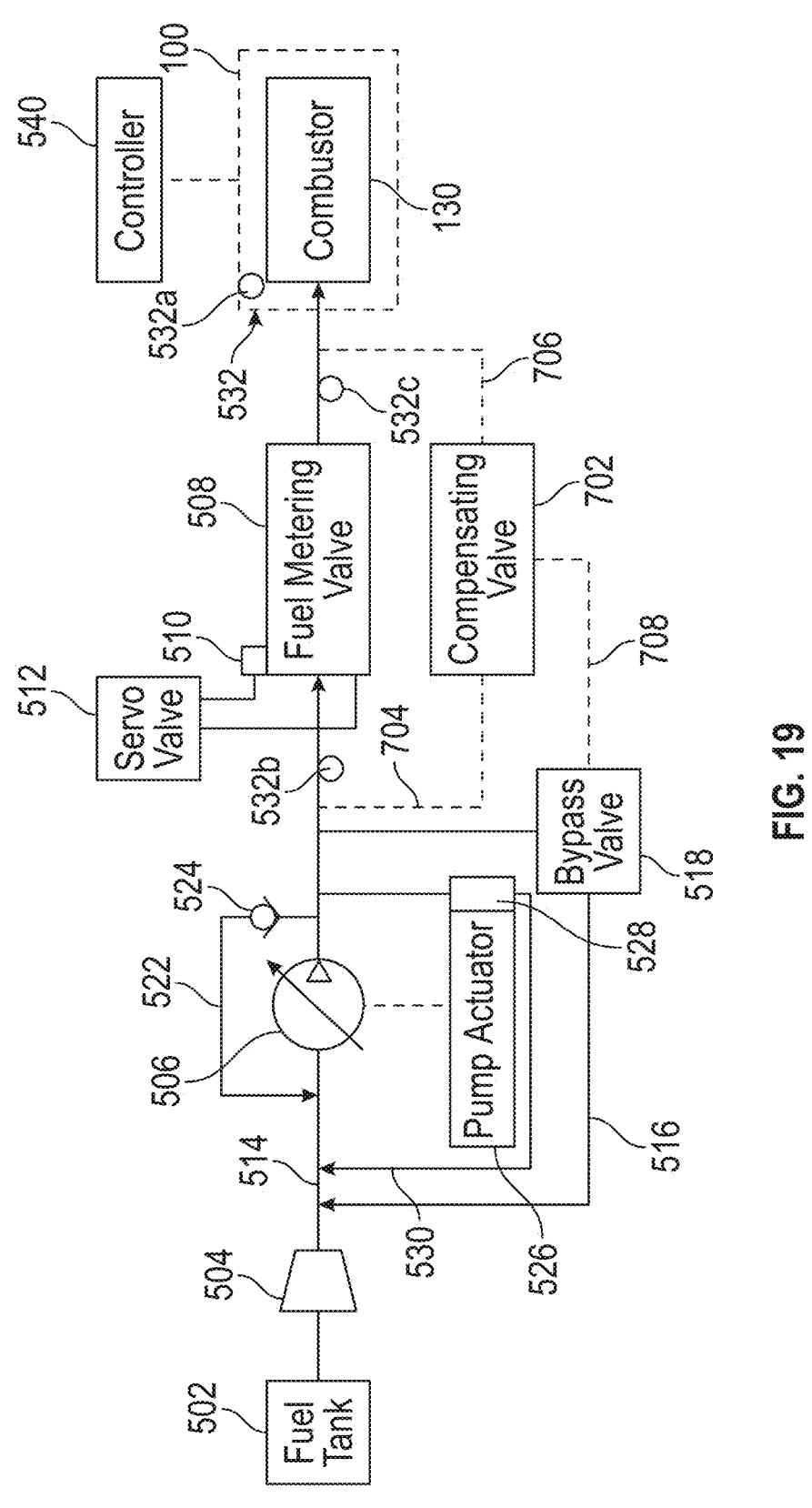
FIG. 19 is a schematic diagram of a fuel system for a gas turbine engine, according to another embodiment.

FIG. 19 is a schematic diagram of a fuel system 700 for the gas turbine engine 100 of FIG. 4, according to another embodiment. The fuel system 700 may be the same as or similar to the fuel system 500. Accordingly, like numbers represent like components. The difference between the fuel system 700 and the fuel system 500 will be described in more detail to follow. The remaining structure and function are the same as described with respect to the fuel system 500 of FIG. 17 and will not be described herein. Additionally, any of the alternatives to the fuel system 500 apply equally to the fuel system 700 of FIG. 19.

As shown in FIG. 19, the fuel system 700 further includes a compensating valve 702 to help improve the accuracy of the position of the bypass valve 518, and, thus, the accuracy of the fuel metering valve 508. The bypass valve 518 includes a flow control member (e.g., a plug, a piston, a rotary sleeve, a plate, or the like) that is movable to various positions to adjust the flow through the bypass valve 518, and, thus, adjusts a pressure drop across the fuel metering valve 508. The movement of the flow control member is imperfect and the accuracy of the position of the flow control member can be affected by the size of the bypass valve 518 or a spring rate of the bypass valve 518. The compensating valve 702 helps to fine tune the position of the flow control member of the bypass valve 518 to improve the steady state accuracy of the fuel metering valve 508.

In particular, the fuel system 700 includes a first hydraulic pressure line 704, a second hydraulic pressure line 706, and a third hydraulic pressure line 708 fluidly coupled to the compensator valve 702. The first hydraulic pressure line 704 is fluidly coupled to the fuel supply lines 514 downstream of the variable displacement pump 506 and upstream of the fuel metering valve 508. The second hydraulic pressure line 706 is fluidly coupled to the fuel supply lines 514 downstream of the fuel metering valve 508 and upstream of the combustor 130. The third hydraulic pressure line 708 is fluidly coupled to the bypass valve 518.

The compensating valve 702 senses or measures a pressure differential across the fuel metering valve 508 based on the pressures in the first hydraulic pressure line 704 and the second hydraulic pressure line 706. The compensating valve 702 can adjust the pressure in the third hydraulic pressure line 708 to adjust a force margin on the bypass valve 518 based on the pressure differential across the fuel metering valve 508. In this way, the compensating valve 702 improves the accuracy of the metering system by compensating for pressure droop across the bypass valve 518. In particular, the ability of the bypass valve 518 to maintain a fixed dP across the fuel metering valve 508 is influenced by factors such as fluid temperature, spring linearity, and manufacturing tolerance. Therefore, the compensating valve 702 improves the variation around the nominal pressure value, by accounting for these factors, so that the metered fuel out to the combustor 130 is more accurate.

Figure 20:
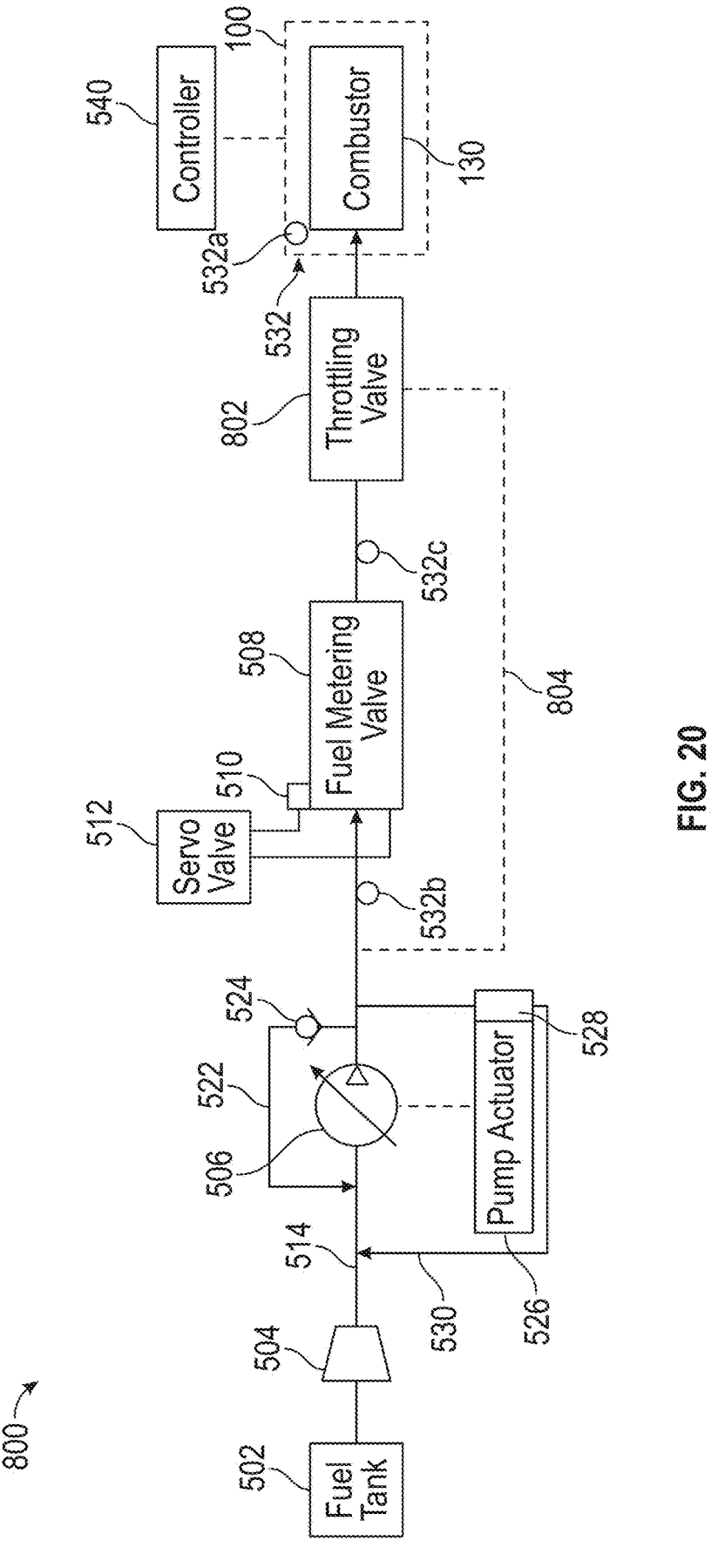
FIG. 20 is a schematic diagram of a fuel system for a gas turbine engine, according to another embodiment.

FIG. 20 is a schematic diagram of a fuel system 800 for the gas turbine engine 100 of FIG. 4, according to another embodiment. The fuel system 800 may be the same as or similar to the fuel system 500. Accordingly, like numbers represent like components. The difference between the fuel system 800 and the fuel system 500 will be described in more detail to follow. The remaining structure and function are the same as described with respect to the fuel system 500 of FIG. 17 and will not be described herein. Additionally, any of the alternatives to the fuel system 500 apply equally to the fuel system 800 of FIG. 20.

As shown in FIG. 20, the fuel system 800 does not include the bypass valve 518 (FIG. 17). Instead, the fuel system 800 includes a throttling valve 802 that is fluidly coupled to the fuel supply lines 514 downstream of the fuel metering valve 508 and upstream of the combustor 130. The throttling valve 802 reduces the pressure of the fuel prior to flowing to the combustor 130 and maintains a fixed pressure drop across the fuel metering valve 508. The fuel system 800 includes a throttling valve line 804 that fluidly couples the throttling valve 802 to the fuel supply lines 514 to an inlet (upstream) of the fuel metering valve 508 and downstream of the variable displacement pump 506. In this way, the throttling valve 802 can sense or measure the pressure differential across the fuel metering valve 508. The throttling valve 802 operates (e.g., opens, closes, moves to a position between open and closed) based on the pressure differential across the fuel metering valve 508 to maintain a fixed pressure drop across the fuel metering valve 508. In other words, the throttling valve 802 can be adjusted to absorb whatever pressure difference is left over from the system. In some embodiments, the throttling valve 802 is implemented as a sliding spool valve. The throttling valve 802 can be implemented by other types of valves. In some embodiments, similar to the bypass valve 518 (FIG. 17), the throttling valve 802 is hydraulically operated and automatically adjusts its position based on the dP across the fuel metering valve 508. In some embodiments, the throttling valve 802 is electrically operated, such as by the controller 540. In some embodiments, the controller 540 can control the throttling valve 802 based on one or more parameters (e.g., measured dP across the fuel metering valve 508).

Figure 21:
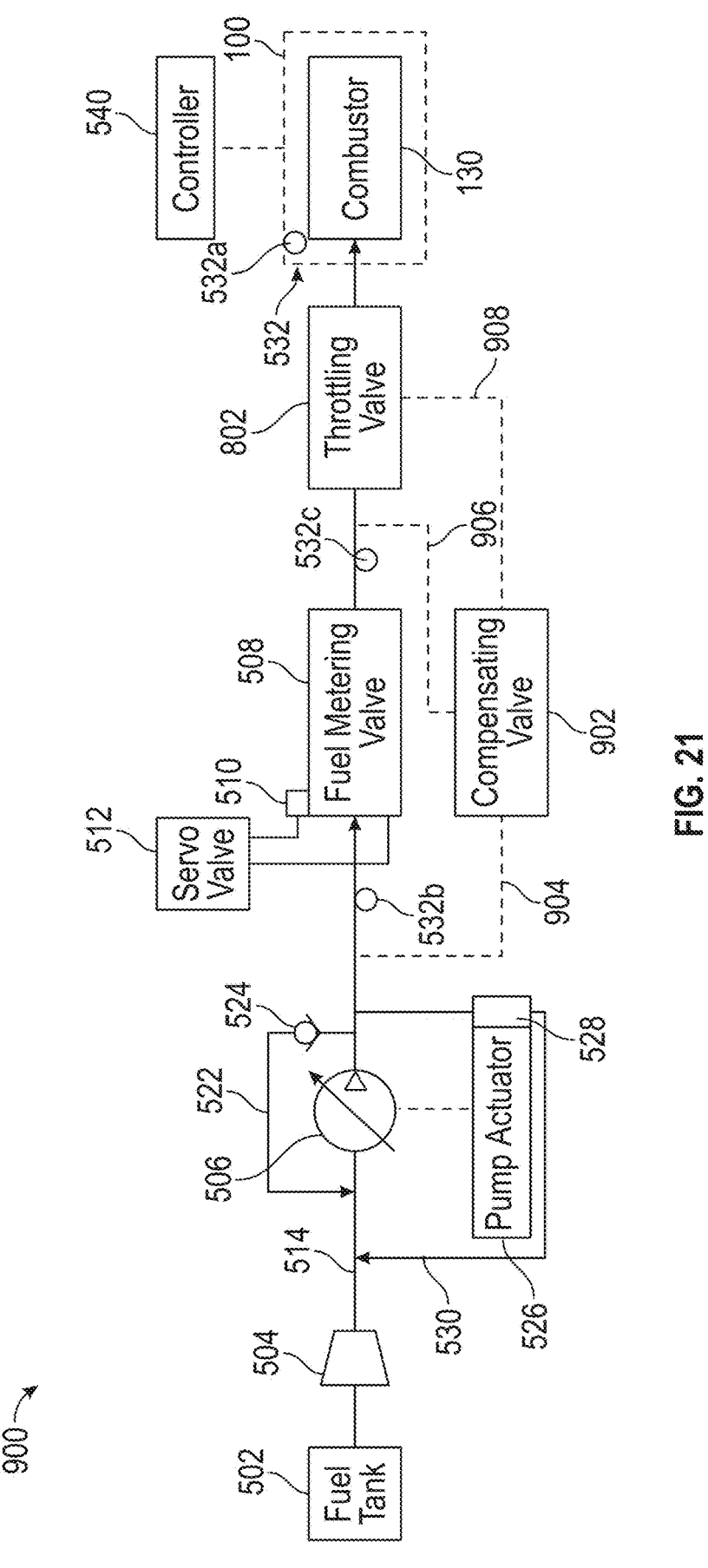
FIG. 21 is a schematic diagram of a fuel system for a gas turbine engine, according to another embodiment.

FIG. 21 is a schematic diagram of a fuel system 900 for the gas turbine engine 100 of FIG. 4, according to another embodiment. The fuel system 900 may be the same as or similar to the fuel system 500. Accordingly, like numbers represent like components. The difference between the fuel system 900 and the fuel system 500 will be described in more detail to follow. The remaining structure and function are the same as described with respect to the fuel system 500 of FIG. 17 and will not be described herein. Additionally, any of the alternatives to the fuel system 500 apply equally to the fuel system 900 of FIG. 21.

As shown in FIG. 21, the fuel system 900 includes the throttling valve 802, a compensating valve 902, a first hydraulic pressure line 904, a second hydraulic pressure line 906, and a third hydraulic pressure line 908. The first hydraulic pressure line 904 is fluidly coupled to the fuel supply lines 514 at the outlet (downstream) of the fuel metering valve 508 and upstream of the throttling valve 802. The second hydraulic pressure line 906 is fluidly coupled to the fuel supply lines 514 at an inlet (upstream) of the fuel metering valve 508. The third hydraulic pressure line 908 is fluidly coupled to the throttling valve 802. The compensating valve 902 can sense or measure the pressure differential across the fuel metering valve 508 based on the pressure in the first hydraulic pressure line 904 and the second hydraulic pressure line 906. The compensating valve 902 adjusts the pressure in the third hydraulic pressure line 908 to adjust a force margin on the throttling valve 802 based on pressure differential across the fuel metering valve 508. This compensation based on the pressure differential improves the accuracy of the metering system by compensating for pressure droop across the throttling valve 802. Therefore, the compensating valve 902 improves the variation around the nominal pressure value so that the metered fuel out to the combustor 130 is more accurate.

Figure 22:
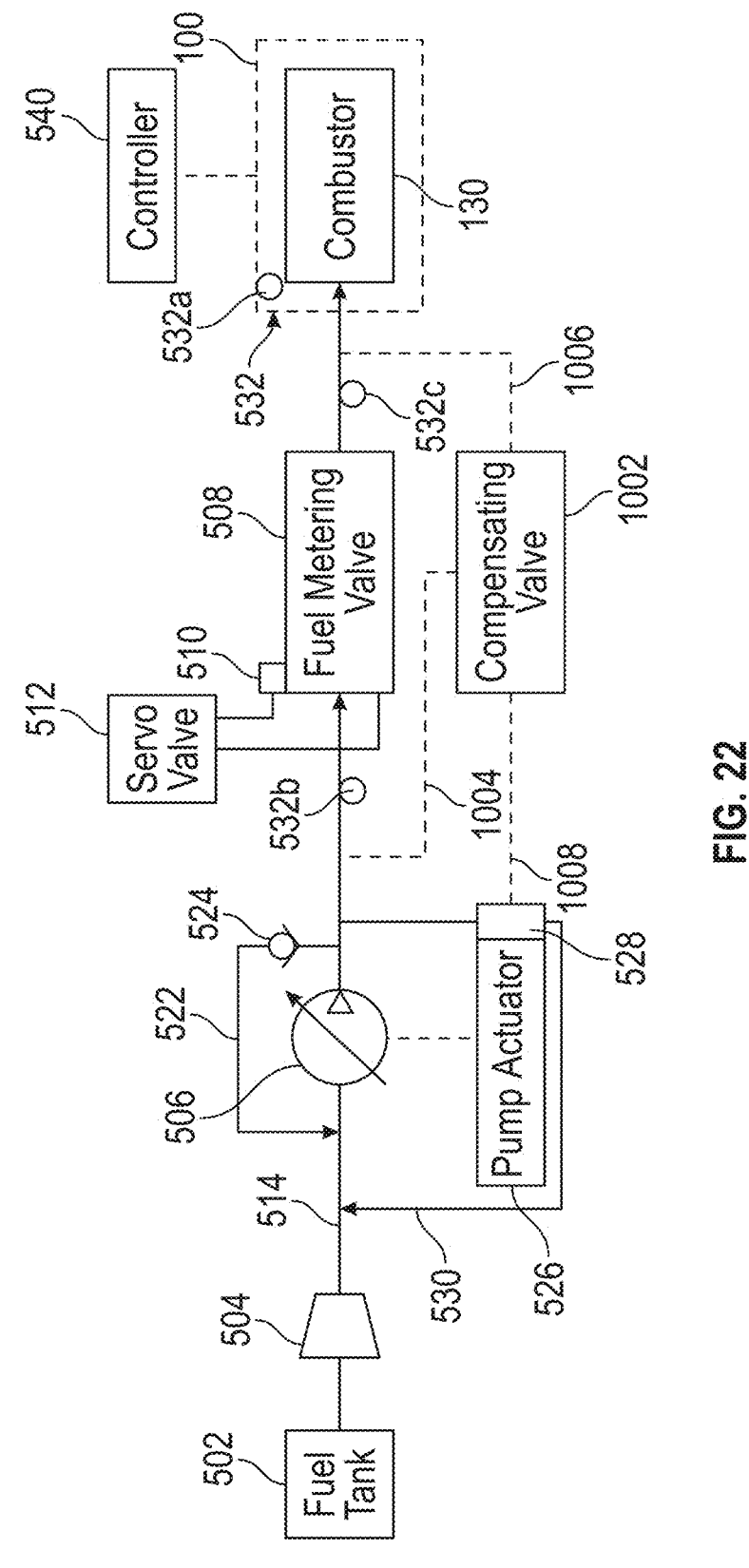
FIG. 22 is a schematic diagram of a fuel system for a gas turbine engine, according to another embodiment.

FIG. 22 is a schematic diagram of a fuel system 1000 for the gas turbine engine 100 of FIG. 4, according to another embodiment. The fuel system 1000 may be the same as or similar to the fuel system 500. Accordingly, like numbers represent like components. The difference between the fuel system 1000 and the fuel system 500 will be described in more detail to follow. The remaining structure and function are the same as described with respect to the fuel system 500 of FIG. 17 and will not be described herein. Additionally, any of the alternatives to the fuel system 500 apply equally to the fuel system 1000 of FIG. 22.

As shown in FIG. 22, the fuel system 1000 does not include a bypass valve or a throttling valve. Instead, the fuel system 1000 include a compensating valve 1002, a first hydraulic pressure line 1004, a second hydraulic pressure line 1006, and a third hydraulic pressure line 1008. The first hydraulic pressure line 1004 is fluidly coupled to the fuel supply lines 514 at the inlet (upstream) of the fuel metering valve 508. The second hydraulic pressure line 1006 is fluidly coupled to the fuel supply lines 514 at the outlet (downstream) of the fuel metering valve 508. The third hydraulic pressure line 1008 is fluidly coupled to the pump actuator 526 (e.g., the pump actuator servo valve 528). The compensating valve 1002 can sense or measure the pressure differential across the fuel metering valve 508 based on the pressure in the first hydraulic pressure line 1004 and the second hydraulic pressure line 1006. The compensating valve 1002 adjusts the pressure in the third hydraulic pressure line 1008 to adjust a force margin on the pump actuator 526 (e.g., the servo valve 528) based on the pressure differential across the fuel metering valve 508. This compensation based on the pressure differential improves the accuracy of the metering system by compensating for pressure droop across the pump actuator 526 (e.g., the servo valve 528). Therefore, the compensating valve 1002 improves the variation around the nominal pressure value so that the metered fuel out to the combustor 130 is more accurate.

Figure 23:
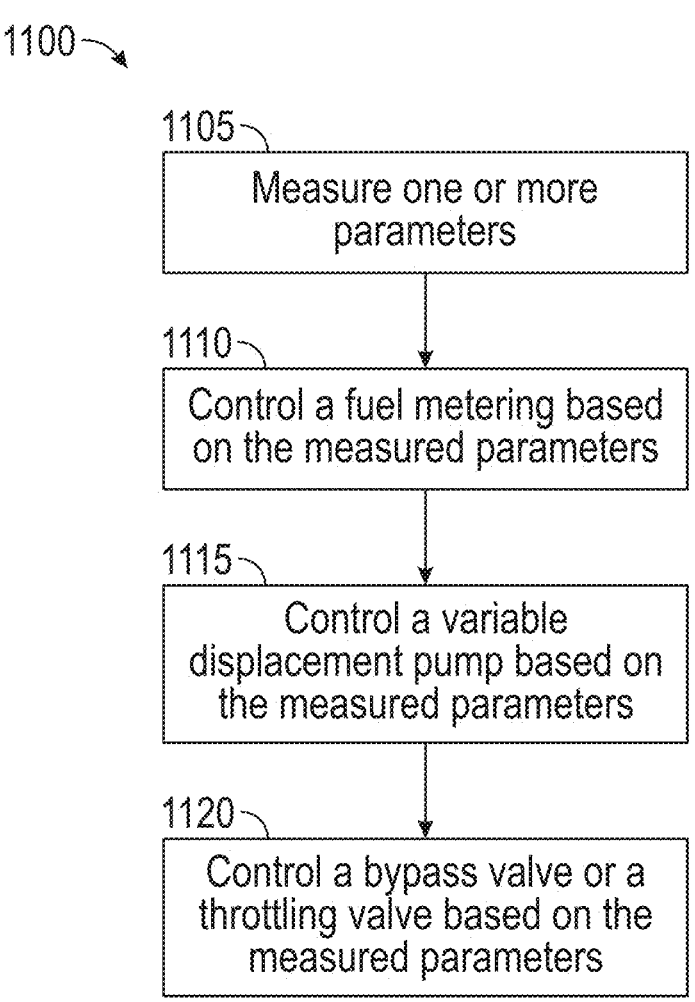
FIG. 23 is a flowchart of a method of operating a fuel system, according to the present disclosure.

FIG. 23 is a flowchart of a method 1100 of operating a fuel system, according to the present disclosure. The method 1100 can be implemented for any of the fuel systems disclosed herein.

In step 1105, the method 1100 includes measuring one or more parameters of the fuel system of the gas turbine engine. The one or more parameters can include temperature, pressure, speed, etc. For example, the controller 540 (FIG. 17) measures the one or more parameters. In particular, the controller 540 can receive signals from the sensors 532. In some embodiments, the controller 540 compares the measured parameters to one or more thresholds or threshold ranges.

In step 1110, the method 1100 includes controlling the fuel metering valve 508 (FIG. 17) based on the measured parameters. For example, the controller 540 can control the fuel metering valve 508, as detailed above.

In step 1115, the method 1100 includes controlling the variable displacement pump 506 (FIG. 17) based on the measured parameters. For example. the controller 540 can control the variable displacement pump 506, as detailed above.

In step 1120, the method 1100 includes controlling the bypass valve 518 (FIG. 17) or the throttling valve 802 (FIG. 20) based on the measured parameter. For example, the controller 540 can control the bypass valve 518 or the throttling valve 802 based on the outlet pressure of the fuel metering valve 508 or the pressure differential across the fuel metering valve 508, as detailed above.

Using a variable displacement pump has many advantages. For example, the discharge flow rate and/or pressure of the variable displacement pump 506 can be controlled to reduce (e.g., minimize) excess fuel flow through the bypass valve 518. Therefore, the variable displacement pump 506 is not constantly overproducing fuel flow as seen in known fuel systems with fixed displacement pumps. This also reduces (e.g., minimizes) power draw off the gas turbine engine 100 and, thus, improves efficiency of the gas turbine engine 100. This also reduces (e.g., minimizes) temperature increases of the fuel and helps improve heat sync capability. As such, use of the fuel system 500 eliminates or reduces the need for chillers or coolers as seen in known systems. For example, smaller air/oil heat exchangers can be used, which reduces weight of the overall system.

Another example of an unducted turbofan engine can be found in U.S. patent application Ser. No. 16/811,368 (Published as U.S. Patent Application Publication No. 2021/0108597), filed Mar. 6, 2020 (FIG. 10, Paragraph [0062], et al.; including an annular fan case 13 surrounding the airfoil blades 21 of rotating element 20 and surrounding vanes 31 of stationary element 30; and including a third stream/fan duct 73 (shown in FIG. 10, described extensively throughout the application)). Various additional aspects of one or more of these embodiments are discussed below. These exemplary aspects may be combined with one or more of the exemplary gas turbine engine(s) discussed above with respect to the figures.

For example, in some embodiments of the present disclosure, the engine may include a heat exchanger located in an annular duct, such as in a third stream. The heat exchanger may extend substantially continuously in a circumferential direction of the gas turbine engine (e.g., at least 300 degrees, such as at least 330 degrees).

In one or more of these embodiments, a threshold power or disk loading for a fan (e.g., an unducted single rotor or primary forward fan) may range from 25 horsepower per square foot (hp/ft$^2$) or greater at cruise altitude during a cruise operating mode. In particular embodiments of the engine, structures and methods provided herein generate power loading between 80 hp/ft$^2$ and 160 hp/ft$^2$ or higher at cruise altitude during a cruise operating mode, depending on whether the engine is an open rotor or ducted engine.

In various embodiments, an engine of the present disclosure is applied to a vehicle with a cruise altitude up to approximately 65,000 ft. In certain embodiments, cruise altitude is between approximately 28,000 ft and approximately 45,000 ft. In still certain embodiments, cruise altitude is expressed in flight levels based on a standard air pressure at sea level, in which a cruise flight condition is between FL280 and FL650. In another embodiment, cruise flight condition is between FL280 and FL450. In still certain embodiments, cruise altitude is defined based at least on a barometric pressure, in which cruise altitude is between approximately 4.85 psia and approximately 0.82 psia based on a sea level pressure of approximately 14.70 psia and sea level temperature at approximately 59 degrees Fahrenheit. In another embodiment, cruise altitude is between approximately 4.85 psia and approximately 2.14 psia. It should be appreciated that in certain embodiments, the ranges of cruise altitude defined by pressure may be adjusted based on a different reference sea level pressure and/or sea level temperature.

As such, an engine of such a configuration may be configured to generate at least 25,000 pounds and less than 80,000 of thrust during operation at a rated speed, such as between 25,000 and 50,000 pounds of thrust during operation at a rated speed, such as between 25,000 and 40,000 pounds of thrust during operation at a rated speed. Alternatively, in other exemplary aspects, an engine of the present disclosure may be configured to generate much less power, such as at least 2,000 pounds of thrust during operation at a rated speed.

In various exemplary embodiments, the fan (or rotor) may include twelve (12) fan blades. From a loading standpoint, such a blade count may allow a span of each blade to be reduced such that the overall diameter of the primary fan may also be reduced (e.g., to twelve feet in one exemplary embodiment). That said, in other embodiments, the fan may have any suitable blade count and any suitable diameter. In certain suitable embodiments, the fan includes at least eight (8) blades. In yet another suitable embodiment, the fan may have at least fifteen (15) blades. In yet another suitable embodiment, the fan may have at least eighteen (18) blades. In one or more of these embodiments, the fan includes twenty-six (26) or fewer blades, such as twenty (20) or fewer blades.

Further, in certain exemplary embodiments, the rotor assembly may define a rotor diameter (or fan diameter) of at least 10 feet, such as at least 11 feet, such as at least 12 feet, such as at least 13 feet, such as at least 15 feet, such as at least 17 feet, such as up to 28 feet, such as up to 26 feet, such as up to 24 feet, such as up to 18 feet.

In various embodiments, the gas turbine engine includes a ratio of a quantity of vanes to a quantity of blades that could be less than, equal to, or greater than 1:1. For example, in particular embodiments, the engine includes twelve (12) fan blades and ten (10) vanes. In other embodiments, the vane assembly includes a greater quantity of vanes to fan blades. For example, in particular embodiments, the engine includes ten (10) fan blades and twenty-three (23) vanes. For example, in certain embodiments, the engine may include a ratio of a quantity of vanes to a quantity of blades between 1:2 and 5:2. The ratio may be tuned based on a variety of factors including a size of the vanes to ensure a desired amount of swirl is removed for an airflow from the primary fan.

Additionally, in certain exemplary embodiments, where the engine includes the third stream and a mid-fan (a ducted fan aft of the primary, forward fan), a ratio R1/R2 may be between 1 and 10, or 2 and 7, or at least 3.3, at least 3.5, at least 4 and less than or equal to 7, where R1 is the radius of the primary fan and R2 is the radius of the mid-fan.

Various embodiments of the gas turbine engine, such as the single unducted rotor engine depicted and described herein, may allow for normal subsonic aircraft cruise altitude operation at or above Mach 0.5. In certain embodiments, the gas turbine engine allows for normal aircraft operation between Mach 0.55 and Mach 0.85 at cruise altitude. In still particular embodiments, the engine allows for normal aircraft operation between Mach 0.75 and Mach 0.85. In certain embodiments, the engine allows for rotor blade tip speeds at or less than 750 feet per second (fps). In other embodiments, the rotor blade tip speed at a cruise flight condition can be 650 to 900 fps, or 700 to 800 fps. A fan pressure ratio (FPR) for the primary fan of the fan assembly can be 1.04 to 2.20, or in some embodiments 1.05 to 1.2, or in some embodiments less than 1.08, as measured across the fan blades of the primary fan at a cruise flight condition.

In order for the gas turbine engine to operate with a fan having the above characteristics to define the above FPR, a gear assembly may be provided to reduce a rotational speed of the fan assembly relative to a driving shaft (such as a low-pressure shaft coupled to a low-pressure turbine). In some embodiments, a gear ratio of the input rotational speed to the output rotational speed is between 3.0 and 4.0, between 3.2 and 3.5, or between 3.5 and 4.5 (inclusive of the endpoints). In some embodiments, a gear ratio of the input rotational speed to the output rotational speed is greater than 4.1. For example, in particular embodiments, the gear ratio is within a range of 4.1 to 14.0, within a range of 4.5 to 14.0, or within a range of 6.0 to 14.0. In certain embodiments, the gear ratio is within a range of 4.5 to 12 or within a range of 6.0 to 11.0.

With respect to a turbomachine of the gas turbine engine, the compressors and/or turbines can include various stage counts. As disclosed herein, the stage count includes the number of rotors or blade stages in a particular component (e.g., a compressor or turbine). For example, in some embodiments, a low-pressure compressor may include 1 to 8 stages, a high-pressure compressor may include 4 to 15 stages, a high-pressure turbine may include 1 to 2 stages, and/or a low-pressure turbine (LPT) may include 1 to 7 stages. In particular, the LPT may have 4 stages, or between 4 and 7 stages. For example, in certain embodiments, an engine may include a one stage low-pressure compressor, an 11-stage high-pressure compressor, a two-stage high-pressure turbine, and 4 stages, or between 4 and 7 stages for the LPT. As another example, an engine can include a three-stage low-pressure compressor, a 10-stage high-pressure compressor, a two stage high-pressure turbine, and a 7-stage low-pressure turbine.

The reduced installed drag may further provide for improved efficiency, such as improved specific fuel consumption. Additionally, or alternatively, the reduced installed drag may provide for cruise altitude engine and aircraft operation at the above describe Mach numbers at cruise altitude. Still particular embodiments may provide such benefits with reduced interaction noise between the blade assembly and the vane assembly or decreased overall noise generated by the engine by virtue of structures located in an annular duct of the engine.

Additionally, ranges of power loading and/or rotor blade tip speed may correspond to certain structures, core sizes, thrust outputs, etc., or other structures of the core engine. However, as previously stated, to the extent one or more structures provided herein may be known in the art, it should be appreciated that the present disclosure may include combinations of structures not previously known to combine, at least for reasons based in part on conflicting benefits versus losses, desired modes of operation, or other forms of teaching away in the art.

Although depicted above as an unshrouded or open rotor engine in the embodiments depicted above, aspects of the disclosure provided herein may be applied to shrouded or ducted engines, partially ducted engines, aft-fan engines, or other gas turbine engine configurations, including those for marine, industrial, or aero-propulsion systems. Certain aspects of the disclosure may be applicable to turbofan, turboprop, or turboshaft engines. However, certain aspects of the disclosure may address issues that may be particular to unshrouded or open rotor engines, such as, but not limited to, issues related to gear ratios, fan diameter, fan speed, length (L) of the engine, maximum diameter of the core engine (D) of the engine, L/D of the engine, desired cruise altitude, and/or desired operating cruise speed, or combinations thereof.

Figure 24:
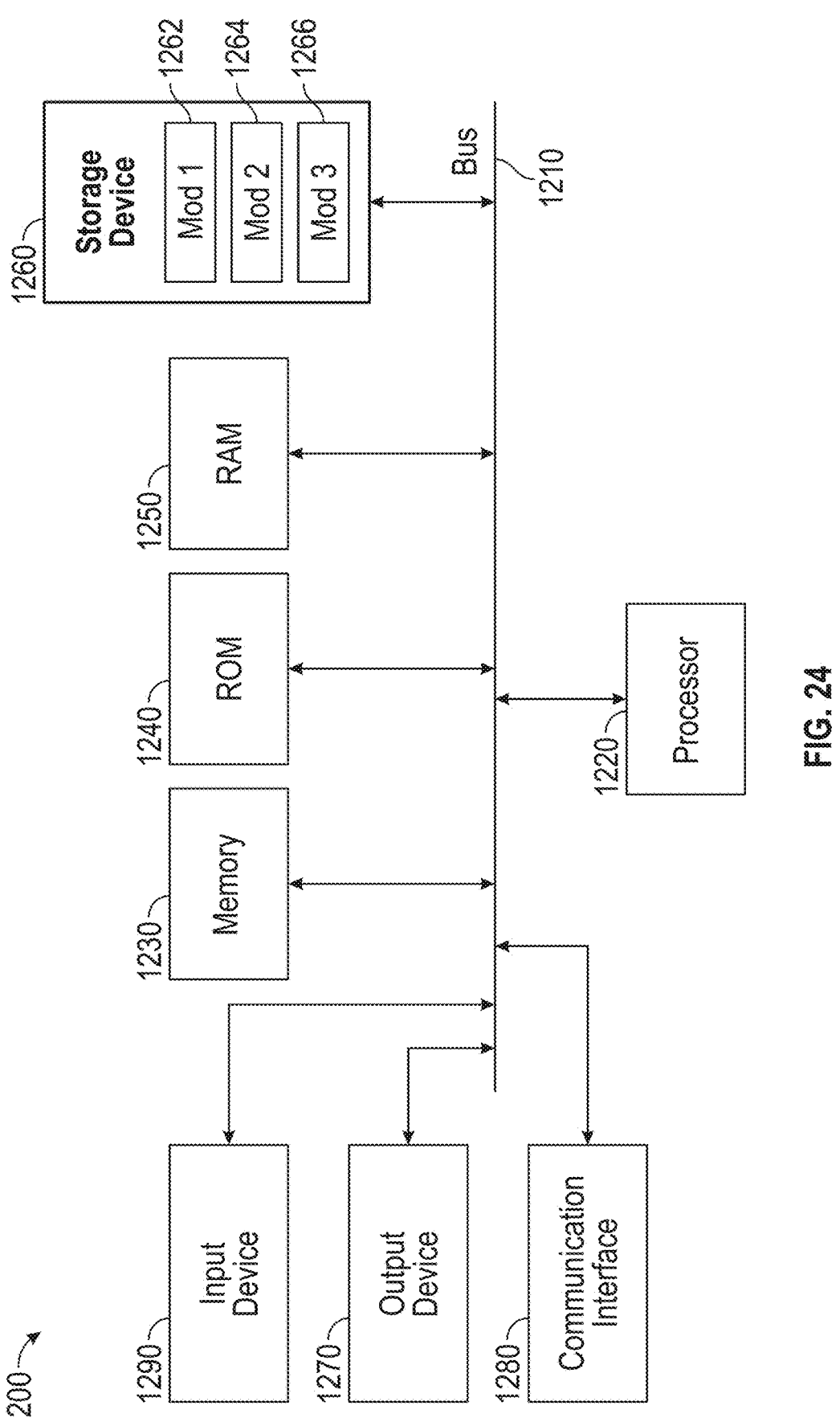
FIG. 24 is an exemplary computing system, according to the present disclosure.

FIG. 24 shows a computing system 1200, according to the present disclosure. The computing system 1200 may carry out any of the methods or the systems described herein. The controllers described previously herein may be operated according to the computing system 1200. The computing system 1200 includes a general-purpose computing device, including a central processing unit (CPU), or a processor 1220, and a system bus 1210 that couples various system components, including a system memory 1230 such as a read-only memory (ROM) 1240 and a random-access memory (RAM) 1250, to the processor 1220. The computing system 1200 can include a cache of high-speed memory connected directly with, in close proximity to, or integrated as part of the processor 1220. The computing system 1200 copies data from the system memory 1230 or the storage device 1260 to the cache for quick access by the processor 1220. In this way, the cache provides a performance boost that avoids the processor 1220 delays while waiting for data. These and other modules can control or be configured to control the processor 1220 to perform various actions. Other system memory 1230 may be available for use as well. The system memory 1230 can include multiple different types of memory with different performance characteristics. The disclosure may operate on a computing system 1200 with more than one processor 1220 or on a group or a cluster of computing devices networked together to provide greater processing capability. The processor 1220 can include any general-purpose processor and a hardware module or a software module, such as module 1 1262, module 2 1264, and module 3 1266 stored in the storage device 1260, configured to control the processor 1220, as well as a special-purpose processor where software instructions are incorporated into the actual processor design. The processor 1220 may essentially be a completely self-contained computing system, containing multiple cores or processors, a bus, memory controller, cache, etc. A multi-core processor may be symmetric or asymmetric.

The system bus 1210 may be any of several types of bus structures, including a memory bus or a memory controller, a peripheral bus, and a local bus using any of a variety of bus architectures. A basic input/output system (BIOS) stored in the ROM 1240, or the like, may provide the basic routine that helps to transfer information between elements within the computing system 1200, such as during start-up. The computing system 1200 further includes one or more storage devices 1260 such as a hard disk drive, a magnetic disk drive, an optical disk drive, a tape drive, or the like. The storage devices 1260 can include software modules 1262, 1264, and 1266 for controlling the processor 1220. Other hardware or software modules are contemplated. The storage device 1260 is connected to the system bus 1210 by a drive interface. The drives and the associated computer-readable storage media provide nonvolatile storage of computer-readable instructions, data structures, program modules, and other data for the computing system 1200. In one aspect, a hardware module that performs a particular function includes the software component stored in a tangible computer-readable storage medium in connection with the necessary hardware components, such as the processor 1220, the system bus 1210, the output device 1270, and so forth, to carry out the function. In another aspect, the computing system 1200 can use a processor and a computer-readable storage medium to store instructions that, when executed by a processor (e.g., one or more processors), cause the processor to perform a method or other specific actions. The basic components and appropriate variations are contemplated depending on the type of device, such as whether the computing system 1200 is a small, handheld computing device, a desktop computer, or a computer server.

Although the exemplary embodiment described herein employs the storage device 1260, other types of computer-readable media that can store data that are accessible by a computer, such as magnetic cassettes, flash memory cards, digital versatile disks, cartridges, random-access memories (RAMs) 1250, and a read-only memory (ROM) 1240, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing system 1200, an input device 1290 represents any number of input mechanisms, such as a microphone for speech, a touch-sensitive screen for a gesture, or a graphical input, a keyboard, a mouse, a motion input, speech, and so forth. An output device 1270 can also be one or more of a number of output mechanisms known to those of skill in the art. In some instances, multimodal systems enable a user to provide multiple types of input to communicate with the computing system 1200. The communications interface 1280 generally governs and manages the user input and the system output. There is no restriction on operating on any particular hardware arrangement and, therefore, the basic features here may easily be substituted for improved hardware or firmware arrangements as they are developed.

The technology discussed herein refers to computer-based systems and actions taken by, and information sent to and from, computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

This written description uses examples to disclose the present disclosure, including the best mode, and to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects are provided by the subject matter of the following clauses:

A gas turbine engine defining an axial direction and a radial direction, the gas turbine engine comprising a turbomachine having an unducted primary fan, a core engine including a combustor and a combustor casing enclosing the combustor and defining an outer surface, and a core cowl surrounding at least a portion of the core engine and defining an inner surface and an outer surface. Wherein the outer surface of the core cowl defines a peak cowl diameter (D) in the radial direction, the outer surface of the combustor casing defines a maximum combustor casing diameter (d) along the radial direction, the core engine defines an overall core axial length (L) along the axial direction and an under-core cowl axial length (L1) along the axial direction, wherein the gas turbine engine defines a core cowl diameter ratio (CDR) equal to the peak cowl diameter (D) divided by the maximum combustor casing diameter (d) and a core cowl length ratio (CLR) equal to the under-core cowl axial length (L1) divided by the overall core axial length (L), and wherein the CDR is between 2.7 and 3.5 and wherein the CLR is between 0.25 and 0.50.

The gas turbine engine of the preceding clause, wherein the CDR is between 2.8 and 3.3.

The gas turbine engine of any preceding clause, wherein the CLR is between 0.3 and 0.45.

The gas turbine engine of any preceding clause, wherein the CLR is between 0.40 and 0.45.

The gas turbine engine of any preceding clause, wherein a void is defined between the outer surface of the combustor casing and the inner surface of the core cowl.

The gas turbine engine of any preceding clause, further comprising at least one engine accessory coupled to the inner surface of the core cowl.

The gas turbine engine of any preceding clause, further comprising a rear frame including a strut having a trailing edge, wherein the primary fan includes a primary fan blade having a leading edge, and wherein the overall core axial length (L) along the axial direction is measured from the leading edge of the primary fan blade to the trailing edge of the strut.

The gas turbine engine of any preceding clause, further comprising a high-pressure compressor inlet guide vane having a leading edge, and a rear frame including a strut having a trailing edge, wherein the under-core cowl axial length (L1) along the axial direction is measured from the leading edge of the inlet guide vane to the trailing edge of the strut.

The gas turbine engine of any preceding clause, further comprising a ducted secondary fan disposed downstream from the primary fan.

The gas turbine engine of any preceding clause, wherein the ducted secondary fan is a single stage secondary fan.

The gas turbine engine of any preceding clause, wherein the gas turbine engine is a three-stream gas turbine engine.

An aircraft comprising a wing and a gas turbine engine mounted to the wing, the gas turbine engine defining an axial direction and a radial direction, the gas turbine engine comprising: a turbomachine having an unducted primary fan, a core engine including a combustor and a combustor casing enclosing the combustor and defining an outer surface, a core cowl surrounding at least a portion of the core engine and defining an inner surface and an outer surface. Wherein the outer surface of the core cowl defines a peak cowl diameter (D) in the radial direction, the outer surface of the combustor casing defines a maximum combustor casing diameter (d) along the radial direction, the core engine defines an overall core axial length (L) along the axial direction and an under-core cowl axial length (L1) along the axial direction. Wherein the gas turbine engine defines a core cowl diameter ratio (CDR) equal to the peak cowl diameter (D) divided by the maximum combustor casing diameter (d) and a core cowl length ratio (CLR) equal to the under-core cowl axial length (L1) divided by the overall core axial length (L). Wherein the CDR is between 2.7 and 3.5 and wherein the CLR is between 0.25 and 0.50.

The aircraft as in the preceding clause, wherein the CDR is between 2.8 and 3.3.

The aircraft of any preceding clause, wherein the CLR is between 0.3 and 0.45.

The aircraft of any preceding clause, wherein the CLR is between 0.40 and 0.45.

The aircraft of any preceding clause, wherein a void is defined between the outer surface of the combustor casing and the inner surface of the core cowl of the gas turbine engine, and wherein at least one engine accessory is coupled to the inner surface of the core cowl.

The aircraft of any preceding clause, wherein the gas turbine engine further comprises a rear frame including a strut having a trailing edge, wherein the primary fan includes a plurality of primary fan blades where each primary fan blade has a leading edge, and wherein the overall core axial length (L) along the axial direction is measured from a leading edge of a respective primary fan blade of the plurality of primary fan blades to the trailing edge of the strut.

The aircraft of any preceding clause, wherein the gas turbine engine further comprises a high-pressure compressor inlet guide vane having a leading edge, and a rear frame including a strut having a trailing edge, wherein the under-core cowl axial length (L1) along the axial direction is measured from the leading edge of the inlet guide vane to the trailing edge of the strut.

The aircraft of any preceding clause, the gas turbine engine further comprising a ducted secondary fan disposed downstream from the unducted primary fan.

A gas turbine engine, comprising: a core engine; a core cowl at least partially encasing a portion of the core engine, the core cowl having an inner surface and defining in part a void is between the inner surface and the core engine, the core cowl moveable relative to the core engine; and an engine component selectively coupled to the core engine or the core cowl.

The gas turbine engine of the preceding clause, wherein the core cowl is pivotable relative to the core engine.

A gas turbine engine comprising a turbomachine and a housing at least partially encasing a portion of the turbomachine, the housing having an inner surface and defining in part a void between the inner surface and the portion of the turbomachine, the housing moveable relative to the portion of the turbomachine; and an engine component selectively coupled to the portion of the turbomachine or to the housing.

The gas turbine engine of the preceding clause, wherein the turbomachinery comprises a core engine, the housing comprises a core cowl at least partially encasing a portion of the core engine, the core cowl having an inner surface and defining in part a void between the inner surface and the core engine, wherein the core cowl is moveable relative to the core engine, and an engine component selectively coupled to the core engine or the core cowl, and wherein the core cowl is pivotable relative to the core engine.

The gas turbine engine of any preceding clause, wherein when the engine component is selectively coupled to the core cowl, the engine component travels with the core cowl when the core cowl is moved away from the core engine.

The gas turbine engine of any preceding clause, wherein the engine component is one of a heat exchanger, a sensor, a controller, a pump, a duct, a fire and overheat component, a generator, or a valve.

The gas turbine engine of any preceding clause, further comprising: a fastener, wherein the engine component is selectively connected to the core engine or the core cowl via the fastener.

The gas turbine engine of any preceding clause, wherein the core cowl defines an access opening, wherein the fastener is accessible through the access opening.

The gas turbine engine of any preceding clause, wherein the fastener includes a plurality of articulating tabs, wherein in a first position the plurality of articulating tabs engages with the core engine and the engine component and in a second position the plurality of tabs engages with the core cowl and the engine component.

The gas turbine engine of any preceding clause, further comprising a push-pull mechanism including a first pin, wherein the engine component is selectively coupled to the core engine or the core cowl via the push-pull mechanism, wherein the first pin engages with the core engine and the engine component when the push-pull mechanism is in a first position, and the first pin engages with the engine component and the core cowl when the push-pull mechanism is in a second position.

The gas turbine engine of any preceding clause, wherein the push-pull mechanism is manually actuated between the first position and the second position.

The gas turbine engine of any preceding clause, wherein the push-pull mechanism is electrically actuated between the first position and the second position.

The gas turbine engine of any preceding clause, wherein the push-pull mechanism includes a second pin, wherein the second pin engages with a door counterbalance mechanism when the first pin is engaged with the engine component and the core cowl.

The gas turbine engine of any preceding clause, wherein the gas turbine engine includes an unducted primary fan.

The gas turbine engine of any preceding clause, further comprising a ducted secondary fan disposed downstream from the primary fan, wherein the ducted secondary fan is a single stage secondary fan or a multi-stage secondary fan.

An aircraft comprising a core engine and a core cowl at least partially encasing a portion of the core engine. The core cowl having an inner surface, wherein a void is defined between the inner surface and the core engine, wherein the core cowl is pivotally mounted to the gas turbine engine, and an engine component selectively coupled to the core engine or the core cowl.

The aircraft as in the preceding clause, wherein the engine component is selectively coupled to the core cowl, and wherein the engine component travels with the core cowl when the core cowl is pivoted away from the core engine.

The aircraft of any preceding clause, wherein the engine component is one of a heat exchanger, a sensor, a controller, a pump, a duct, a fire and overheat component, a generator, or a valve.

The aircraft of any preceding clause, wherein the engine component is selectively coupled to the core engine or the core cowl via a fastener, wherein the fastener is accessible from outside of the core cowl, wherein the fastener includes a plurality of articulating tabs, and wherein in a first position the plurality of articulating tabs engages with the core engine and the engine component, and in a second position the plurality of articulating tabs engages with the core cowl and the engine component.

The aircraft of any preceding clause, wherein the engine component is selectively coupled to the core engine or the core cowl via a push-pull mechanism including a first pin, wherein the first pin engages with the core engine and the engine component when the push-pull mechanism is in a first position, and the first pin engages with the engine component and the core cowl when the push-pull mechanism is in a second position.

The aircraft of any preceding clause, wherein the push-pull mechanism is manually actuated between the first position and the second position.

The aircraft of any preceding clause, wherein the push-pull mechanism includes a second pin, wherein the second pin engages with a door counterbalance mechanism when the first pin is engaged with the core cowl and the engine component.

The aircraft of any preceding clause, wherein the engine component is selectively connected to the core engine or the core cowl via a push-pull mechanism including a first pin, wherein the first pin engages with the core engine and the engine component when the push-pull mechanism is in a first position, and the first pin engages with the engine component and the core cowl when the push-pull mechanism is in a second position, wherein the push-pull mechanism is manually actuatable between the first position and the second position.

The aircraft of any preceding clause, wherein the gas turbine engine includes a ducted primary fan.

The gas turbine engine of any preceding clause, wherein the engine component is positioned within the core cowl.

The gas turbine engine of any preceding clause, wherein the engine component is one of a heat exchanger, a sensor, a controller, a pump, a duct, a fire and overheat component, a generator, or a valve.

The gas turbine engine of any preceding clause, wherein the engine component is an engine controller.

The gas turbine engine of any preceding clause, wherein the engine component is power electronics, a lubrication oil tank, a lubrication oil pump, an electric machine, or a combination thereof.

The gas turbine engine of any preceding clause, wherein the gas turbine engine is incorporated into an aircraft configured to cruise at an altitude between 28,000 feet and 65,000 feet.

The gas turbine engine of any preceding clause, wherein the gas turbine engine is configured to generate at least 18,000 pounds of thrust and less than 80,000 pounds of thrust when operated at a rated speed during standard day operating conditions.

A gas turbine engine defining an axial direction, the gas turbine engine comprising: a turbomachine having a primary fan, a core engine, and a core cowl surrounding at least a portion of the core engine, the turbomachine defining an under-core cowl axial length (L1) along the axial direction and an initial compression axial length (L2), the core engine comprising a gearbox, the primary fan being drivingly coupled to the core engine across the gearbox; wherein the gas turbine engine is configured to generate at least 18,000 pounds of thrust and less than 80,000 pounds of thrust when operated at a rated speed during standard day operating conditions, wherein the turbomachine defines an initial compression length ratio (ICLR) equal to the initial compression axial length (L2) divided by the under-core cowl axial length (L1), wherein the ICLR is greater than or equal to 0.55 and less than or equal to 0.9.

A gas turbine engine defining an axial direction, the gas turbine engine comprising: a turbomachine having a primary fan, a core engine, and a core cowl surrounding at least a portion of the core engine, the turbomachine defining an under-core cowl axial length (L1) along the axial direction and an initial compression axial length (L2), the core engine comprising a gearbox and a turbine section having a low-pressure turbine, the primary fan being drivingly coupled to the low-pressure turbine across the gearbox; wherein the low-pressure turbine comprises at least a total of four stages of low-pressure turbine rotor blades and up to six stages of low-pressure turbine rotor blades; wherein the turbomachine defines an initial compression length ratio (ICLR) equal to the initial compression axial length (L2) divided by the under-core cowl axial length (L1), wherein the ICLR is greater than or equal to 0.3 and less than or equal to 0.9.

A gas turbine engine defining an axial direction, the gas turbine engine comprising: a turbomachine having a primary fan, a core engine, and a core cowl surrounding at least a portion of the core engine, the turbomachine defining an under-core cowl axial length (L1) along the axial direction and an initial compression axial length (L2), the core engine comprising a gearbox having a gear ratio greater than or equal to 3.2:1 and less than or equal to 14:1, the primary fan being drivingly coupled to the core engine across the gearbox; wherein the turbomachine defines an initial compression length ratio (ICLR) equal to the initial compression axial length (L2) divided by the under-core cowl axial length (L1), wherein the ICLR is greater than or equal to 0.3 and less than or equal to 0.9.

A gas turbine engine defining an axial direction, the gas turbine engine comprising: a turbomachine having a primary fan, a core engine, and a core cowl surrounding at least a portion of the core engine, the core engine comprising a high-pressure compressor comprising at least a total of eight stages of high-pressure compressor rotor blades and up to a total of 11 stages of high-pressure compressor rotor blades, the core engine further comprising a gearbox, the primary fan being drivingly coupled to the core engine across the gearbox; wherein the turbomachine defines an under-core cowl axial length (L1) along the axial direction and an initial compression axial length (L2), wherein the turbomachine defines an initial compression length ratio (ICLR) equal to the initial compression axial length (L2) divided by the under-core cowl axial length (L1), wherein the ICLR is greater than or equal to 0.3 and less than or equal to 0.9.

The gas turbine engine of any preceding clause, wherein the ICLR is greater than or equal to 0.55 and less than or equal to 0.9.

The gas turbine engine of any preceding clause, wherein the ICLR is greater than or equal to 0.6 and less than or equal to 0.89.

The gas turbine engine of any preceding clause, wherein the primary fan is an unducted primary fan, and wherein the ICLR is greater than or equal to 0.7.

The gas turbine engine of any preceding clause, wherein the turbomachine further includes a fan cowl and defines a fan duct between the fan cowl and the core cowl configured as a third stream, and wherein the ICLR is greater than or equal to 0.7.

The gas turbine engine of any preceding clause, further comprising a nacelle surrounding at least in part the primary fan, and wherein the ICLR is greater than or equal to 0.6 and less than or equal to 0.75.

The gas turbine engine of any preceding clause, wherein the gas turbine engine is a two stream engine, and wherein the ICLR is greater than or equal to 0.6 and less than or equal to 0.75.

The gas turbine engine of any preceding clause, wherein the core engine comprises a compressor section and a turbine section, wherein the compressor section has a high-pressure compressor comprising a total of eight to ten stages of high-pressure compressor rotor blades, and wherein the turbine section has a low-pressure turbine comprising a total of three to five stages of low-pressure turbine rotor blades.

The gas turbine engine of any preceding clause, wherein the gas turbine engine is configured to generate at least 18,000 pounds of thrust and less than 80,000 pounds of thrust when operated at a rated speed during standard day operating conditions.

The gas turbine engine of any preceding clause, wherein the gas turbine engine is configured to generate between 25,000 and 60,000 pounds of thrust during operation at the rated speed during standard day operating conditions.

The gas turbine engine of any preceding clause, wherein the high-pressure compressor comprises a total of nine stages.

The gas turbine engine of any preceding clause, wherein the low-pressure turbine comprises a total of four stages.

A gas turbine engine defining an axial direction and a radial direction, the gas turbine engine including a turbomachine having an unducted primary fan, a core engine including a combustor and a combustor casing enclosing the combustor and defining an outer surface, a core cowl surrounding at least a portion of the core engine and defining an inner surface and an outer surface, wherein the outer surface of the core cowl defines a peak cowl diameter (D) in the radial direction, the outer surface of the combustor casing defines a maximum combustor casing diameter (d) along the radial direction, the core engine defines an overall core axial length (L) along the axial direction and an under-core cowl axial length (L1) along the axial direction, wherein the gas turbine engine defines a core cowl diameter ratio (CDR) equal to the peak cowl diameter (D) divided by the maximum combustor casing diameter (d) and a core cowl length ratio (CLR) equal to the under-core cowl axial length (L1) divided by the overall core axial length (L), and wherein the CDR is between 2.7 and 3.5 and wherein the CLR is between 0.25 and 0.50, and a fuel system that provides fuel to the combustor, the fuel system comprising a variable displacement pump that pumps the fuel to the combustor, the variable displacement pump including a pump actuator that adjusts at least one of a flow rate or a pressure of the fuel from the variable displacement pump.

The gas turbine engine of the preceding clause, further comprising a fuel metering valve that receives the fuel from the variable displacement pump and controls the at least one of the flow rate or the pressure of the fuel to the combustor, wherein the pump actuator adjusts the at least one of the flow rate or the pressure of the fuel from the variable displacement pump based on an outlet pressure of the fuel metering valve.

The gas turbine engine of any preceding clause, wherein the fuel system further includes a controller to operate the pump actuator to achieve a target flow rate or a target pressure of the fuel from the variable displacement pump.

The gas turbine engine of any preceding clause, wherein the pump actuator includes a servo valve that is fluidly coupled to an inlet and an outlet of the variable displacement pump.

The gas turbine engine of any preceding clause, wherein the fuel system further comprises one or more engine actuators that receive a portion of the fuel and control one or more components of the gas turbine engine.

The gas turbine engine of any preceding clause, wherein the fuel system further comprises a bypass valve that couples an outlet of the variable displacement pump to an inlet of the variable displacement pump to direct an excess portion of the fuel from the outlet to the inlet of the variable displacement pump.

The gas turbine engine of any preceding clause, further comprising a fuel metering valve that receives the fuel from the variable displacement pump and controls the at least one of the flow rate or the pressure of the fuel to the combustor, wherein the fuel system includes a controller that operates the bypass valve based on a pressure differential across the fuel metering valve.

The gas turbine engine of any preceding clause, further comprising a fuel metering valve that receives the fuel from the variable displacement pump and controls the at least one of the flow rate or the pressure of the fuel to the combustor, wherein the bypass valve controls an amount of the fuel directed from the outlet to the inlet based on a pressure differential across the fuel metering valve.

The gas turbine engine of any preceding clause, wherein the fuel system includes a hydraulic pressure line that fluidly couples the bypass valve and an outlet side of the fuel metering valve.

The gas turbine engine of any preceding clause, wherein the fuel system includes a compensating valve that adjusts a force margin on the bypass valve based on the pressure differential across the fuel metering valve.

The gas turbine engine of any preceding clause, wherein the variable displacement pump provides the fuel at a pressure in a range of one hundred pounds per square inch (100 psi) to two thousand five hundred pounds per square inch (2,500 psi).

The gas turbine engine of any preceding clause, wherein the variable displacement pump operates at a speed in a range of five hundred rotations per minute (500 RPM) to twelve thousand rotations per minute (12,000 RPM).

An aircraft including a wing, and a gas turbine engine mounted to the wing, the gas turbine engine defining an axial direction and a radial direction, the gas turbine engine including a turbomachine having an unducted primary fan, a core engine including a combustor and a combustor casing enclosing the combustor and defining an outer surface, a core cowl surrounding at least a portion of the core engine and defining an inner surface and an outer surface, wherein the outer surface of the core cowl defines a peak cowl diameter (D) in the radial direction, the outer surface of the combustor casing defines a maximum combustor casing diameter (d) along the radial direction, the core engine defines an overall core axial length (L) along the axial direction and an under-core cowl axial length (L1) along the axial direction, wherein the gas turbine engine defines a core cowl diameter ratio (CDR) equal to the peak cowl diameter (D) divided by the maximum combustor casing diameter (d) and a core cowl length ratio (CLR) equal to the under-core cowl axial length (L1) divided by the overall core axial length (L), and wherein the CDR is between 2.7 and 3.5 and wherein the CLR is between 0.25 and 0.50, and a fuel system that provides fuel to the combustor, the fuel system comprising: a variable displacement pump that pumps the fuel to the combustor, the variable displacement pump including a pump actuator that adjusts at least one of a flow rate or a pressure of the fuel from the variable displacement pump.

The aircraft of the preceding clause, further comprising a fuel metering valve that receives the fuel from the variable displacement pump and controls the at least one of the flow rate or the pressure of the fuel to the combustor, wherein the pump actuator adjusts the at least one of the flow rate or the pressure of the fuel from the variable displacement pump based on an outlet pressure of the fuel metering valve.

The aircraft of any preceding clause, wherein the fuel system further includes a controller to operate the pump actuator to achieve a target flow rate or a target pressure of the fuel from the variable displacement pump.

The aircraft of any preceding clause, wherein the pump actuator includes a servo valve that is fluidly coupled to an inlet and an outlet of the variable displacement pump.

The aircraft of any preceding clause, wherein the fuel system further comprises one or more engine actuators that receive a portion of the fuel and control one or more components of the gas turbine engine.

The aircraft of any preceding clause, wherein the fuel system further comprises a bypass valve that couples an outlet of the variable displacement pump to an inlet of the variable displacement pump to direct an excess portion of the fuel from the outlet to the inlet of the variable displacement pump.

The aircraft of any preceding clause, further comprising a fuel metering valve that receives the fuel from the variable displacement pump and controls the at least one of the flow rate or the pressure of the fuel to the combustor, wherein the fuel system includes a controller that operates the bypass valve based on a pressure differential across the fuel metering valve.

The aircraft of any preceding clause, further comprising a fuel metering valve that receives the fuel from the variable displacement pump and controls the at least one of the flow rate or the pressure of the fuel to the combustor, wherein the bypass valve controls an amount of the fuel directed from the outlet to the inlet based on a pressure differential across the fuel metering valve.

The aircraft of any preceding clause, wherein the fuel system includes a hydraulic pressure line that fluidly couples the bypass valve and an outlet side of the fuel metering valve.

The aircraft of any preceding clause, wherein the fuel system includes a compensating valve that adjusts a force margin on the bypass valve based on the pressure differential across the fuel metering valve.

The aircraft of any preceding clause, wherein the variable displacement pump provides the fuel at a pressure in a range of one hundred pounds per square inch (100 psi) to two thousand five hundred pounds per square inch (2,500 psi).

The aircraft of any preceding clause, wherein the variable displacement pump operates at a speed in a range of five hundred rotations per minute (500 RPM) to twelve thousand rotations per minute (12,000 RPM).

Although the foregoing description is directed to the preferred embodiments, other variations and modifications will be apparent to those skilled in the art and may be made without departing from the disclosure. Moreover, features described in connection with one embodiment may be used in conjunction with other embodiments, even if not explicitly stated above.

The invention claimed is:

1. A gas turbine engine defining an axial direction and a radial direction, the gas turbine engine comprising:
   a turbomachine having an unducted primary fan, a core engine including a combustor and a combustor casing enclosing the combustor and defining an outer surface, a core cowl surrounding at least a portion of the core engine and defining an inner surface and an outer surface,
   wherein the outer surface of the core cowl defines a peak cowl diameter (D) in the radial direction, the outer surface of the combustor casing defines a maximum combustor casing diameter (d) along the radial direction, the core engine defines an overall core axial length (L) along the axial direction and an under-core cowl axial length (L1) along the axial direction,
   wherein the gas turbine engine defines a core cowl diameter ratio (CDR) equal to the peak cowl diameter (D) divided by the maximum combustor casing diameter (d) and a core cowl length ratio (CLR) equal to the under-core cowl axial length (L1) divided by the overall core axial length (L), and
   wherein the CDR is between 2.7 and 3.5 and wherein the CLR is between 0.25 and 0.50; and
   a fuel system that provides fuel to the combustor, the fuel system comprising a variable displacement pump that pumps the fuel to the combustor, the variable displacement pump including a pump actuator that adjusts at least one of a flow rate or a pressure of the fuel from the variable displacement pump.

2. The gas turbine engine of claim 1, further comprising a fuel metering valve that receives the fuel from the variable displacement pump and controls the at least one of the flow rate or the pressure of the fuel to the combustor, wherein the pump actuator adjusts the at least one of the flow rate or the pressure of the fuel from the variable displacement pump based on an outlet pressure of the fuel metering valve.

3. The gas turbine engine of claim 1, wherein the fuel system further includes a controller to operate the pump actuator to achieve a target flow rate or a target pressure of the fuel from the variable displacement pump.

4. The gas turbine engine of claim 1, wherein the pump actuator includes a servo valve that is fluidly coupled to an inlet and an outlet of the variable displacement pump.

5. The gas turbine engine of claim 1, wherein the fuel system further comprises one or more engine actuators that receive a portion of the fuel and control one or more components of the gas turbine engine.

6. The gas turbine engine of claim 1, wherein the fuel system further comprises a bypass valve that couples an outlet of the variable displacement pump to an inlet of the variable displacement pump to direct an excess portion of the fuel from the outlet to the inlet of the variable displacement pump.

7. The gas turbine engine of claim 6, further comprising a fuel metering valve that receives the fuel from the variable displacement pump and controls the at least one of the flow rate or the pressure of the fuel to the combustor, wherein the fuel system includes a controller that operates the bypass valve based on a pressure differential across the fuel metering valve.

8. The gas turbine engine of claim 6, further comprising a fuel metering valve that receives the fuel from the variable displacement pump and controls the at least one of the flow rate or the pressure of the fuel to the combustor, wherein the bypass valve controls an amount of the fuel directed from the outlet to the inlet based on a pressure differential across the fuel metering valve.

9. The gas turbine engine of claim 8, wherein the fuel system includes a hydraulic pressure line that fluidly couples the bypass valve and an outlet side of the fuel metering valve.

10. The gas turbine engine of claim 9, wherein the fuel system includes a compensating valve that adjusts a force margin on the bypass valve based on the pressure differential across the fuel metering valve.

11. An aircraft comprising:
   a wing; and
   a gas turbine engine mounted to the wing, the gas turbine engine defining an axial direction and a radial direction, the gas turbine engine comprising:
      a turbomachine having an unducted primary fan, a core engine including a combustor and a combustor casing enclosing the combustor and defining an outer surface, a core cowl surrounding at least a portion of the core engine and defining an inner surface and an outer surface, wherein the outer surface of the core cowl defines a peak cowl diameter (D) in the radial direction, the outer surface of the combustor casing defines a maximum combustor casing diameter (d) along the radial direction, the core engine defines an overall core axial length (L) along the axial direction and an under-core cowl axial length (L1) along the axial direction, wherein the gas turbine engine defines a core cowl diameter ratio (CDR) equal to the peak cowl diameter (D) divided by the maximum combustor casing diameter (d) and a core cowl length ratio (CLR) equal to the under-core cowl axial length (L1) divided by the overall core axial length (L), and wherein the CDR is between 2.7 and 3.5 and wherein the CLR is between 0.25 and 0.50; and a fuel system that provides fuel to the combustor, the fuel system comprising:

a variable displacement pump that pumps the fuel to the combustor, the variable displacement pump including a pump actuator that adjusts at least one of a flow rate or a pressure of the fuel from the variable displacement pump.

12. The aircraft of claim 11, further comprising a fuel metering valve that receives the fuel from the variable displacement pump and controls the at least one of the flow rate or the pressure of the fuel to the combustor, wherein the pump actuator adjusts the at least one of the flow rate or the pressure of the fuel from the variable displacement pump based on an outlet pressure of the fuel metering valve.

13. The aircraft of claim 11, wherein the fuel system further includes a controller to operate the pump actuator to achieve a target flow rate or a target pressure of the fuel from the variable displacement pump.

14. The aircraft of claim 11, wherein the pump actuator includes a servo valve that is fluidly coupled to an inlet and an outlet of the variable displacement pump.

15. The aircraft of claim 11, wherein the fuel system further comprises one or more engine actuators that receive a portion of the fuel and control one or more components of the gas turbine engine.

16. The aircraft of claim 11, wherein the fuel system further comprises a bypass valve that couples an outlet of the variable displacement pump to an inlet of the variable displacement pump to direct an excess portion of the fuel from the outlet to the inlet of the variable displacement pump.

17. The aircraft of claim 16, further comprising a fuel metering valve that receives the fuel from the variable displacement pump and controls the at least one of the flow rate or the pressure of the fuel to the combustor, wherein the fuel system includes a controller that operates the bypass valve based on a pressure differential across the fuel metering valve.

18. The aircraft of claim 16, further comprising a fuel metering valve that receives the fuel from the variable displacement pump and controls the at least one of the flow rate or the pressure of the fuel to the combustor, wherein the bypass valve controls an amount of the fuel directed from the outlet to the inlet based on a pressure differential across the fuel metering valve.

19. The aircraft of claim 18, wherein the fuel system includes a hydraulic pressure line that fluidly couples the bypass valve and an outlet side of the fuel metering valve.

20. The aircraft of claim 19, wherein the fuel system includes a compensating valve that adjusts a force margin on the bypass valve based on the pressure differential across the fuel metering valve.

* * * * *